United States Patent
Alonso et al.

(10) Patent No.: US 11,620,042 B2
(45) Date of Patent: Apr. 4, 2023

(54) ACCELERATED SCROLLING AND SELECTION

(71) Applicant: Apple Inc., Cupertino, CA (US)

(72) Inventors: Marcos Alonso, Oakland, CA (US); James Magahern, San Francisco, CA (US); Toby C. Paterson, Los Altos Hills, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/573,849

(22) Filed: Sep. 17, 2019

(65) Prior Publication Data
US 2020/0326824 A1 Oct. 15, 2020

Related U.S. Application Data

(60) Provisional application No. 62/834,364, filed on Apr. 15, 2019, provisional application No. 62/844,015, filed on May 6, 2019.

(51) Int. Cl.
*G06F 3/0485* (2022.01)
*G06F 3/0482* (2013.01)
(Continued)

(52) U.S. Cl.
CPC .......... *G06F 3/0485* (2013.01); *G06F 3/0482* (2013.01); *G06F 3/0486* (2013.01); *G06F 3/04883* (2013.01)

(58) Field of Classification Search
None
See application file for complete search history.

(56) References Cited

U.S. PATENT DOCUMENTS 5,287,102 A * 2/1994 McKiel, Jr. ............. G06F 3/011
340/4.13
5,754,873 A * 5/1998 Nolan ....................... G06T 3/40
715/235
(Continued)

FOREIGN PATENT DOCUMENTS

CN 101046717 A 10/2007
CN 103135921 A 6/2013
(Continued)

OTHER PUBLICATIONS

Select All & Clear All vs. Invert available on available at http://ux.stackexchange.com/questions/1354/select-all-clear-all-vs-invert as of Sep. 8, 2010 (Stack Exchange) (Year: 2010).*
(Continued)

*Primary Examiner* — William L Bashore
*Assistant Examiner* — Nathan K Shrewsbury
(74) *Attorney, Agent, or Firm* — DLA Piper LLP (US)

(57) ABSTRACT

The present disclosure includes generally relates to scrolling and selecting items. An electronic device having a display and a touch-sensitive surface displays a user interface with a list of items. The items can be scrolled and selected using different techniques. Some embodiments include a technique for entering an edit mode to select and scroll items on the user interface. Some embodiments include a technique for scrolling to select items on the user interface. Some embodiments include a technique for displaying a scroll progress indicator for scrolling items on the user interface.

27 Claims, 71 Drawing Sheets

(51) Int. Cl.
  *G06F 3/04883* (2022.01)
  *G06F 3/0486* (2013.01)

(56) References Cited

U.S. PATENT DOCUMENTS

| | | | |
|---|---|---|---|
| 5,760,773 A * | 6/1998 | Berman | G06F 3/0482 |
| | | | 715/808 |
| 6,240,430 B1 | 5/2001 | Deike et al. | |
| 6,256,030 B1 | 7/2001 | Berry et al. | |
| 6,411,313 B1 | 6/2002 | Conlon et al. | |
| 6,421,072 B1 * | 7/2002 | Ku | G09G 5/14 |
| | | | 715/804 |
| 7,075,512 B1 | 7/2006 | Fabre et al. | |
| 7,278,105 B1 | 10/2007 | Kitts | |
| 7,365,738 B2 | 4/2008 | Molander et al. | |
| 8,239,784 B2 | 8/2012 | Hotelling et al. | |
| 8,255,827 B2 | 8/2012 | Malik | |
| 8,375,335 B2 * | 2/2013 | Wong | G06F 16/168 |
| | | | 715/713 |
| 9,081,498 B2 * | 7/2015 | Thorsander | G06F 3/0482 |
| 9,176,645 B1 * | 11/2015 | Masterman | G06F 3/0482 |
| 9,411,501 B2 * | 8/2016 | Yamamoto | G06F 3/0488 |
| 9,489,131 B2 | 11/2016 | Seymour et al. | |
| 2002/0097270 A1 | 7/2002 | Keely et al. | |
| 2003/0098803 A1 | 5/2003 | Gourgey et al. | |
| 2003/0185448 A1 | 10/2003 | Seeger et al. | |
| 2003/0199293 A1 | 10/2003 | Skripachev et al. | |
| 2003/0218619 A1 | 11/2003 | Ben-Tovim | |
| 2004/0070631 A1 | 4/2004 | Brown et al. | |
| 2004/0100479 A1 * | 5/2004 | Nakano | G06F 3/0485 |
| | | | 715/700 |
| 2004/0196316 A1 * | 10/2004 | Handy Bosma | G06F 3/04847 |
| | | | 715/853 |
| 2005/0102629 A1 * | 5/2005 | Chen | G06F 40/166 |
| | | | 715/250 |
| 2005/0134578 A1 * | 6/2005 | Chambers | G06F 3/0485 |
| | | | 345/157 |
| 2005/0268247 A1 | 12/2005 | Baneth | |
| 2006/0125803 A1 | 6/2006 | Westerman et al. | |
| 2006/0150114 A1 | 7/2006 | Wang et al. | |
| 2006/0184902 A1 | 8/2006 | Hayes et al. | |
| 2007/0028142 A1 | 2/2007 | Elsner et al. | |
| 2007/0061756 A1 | 3/2007 | Parrish et al. | |
| 2007/0100896 A1 * | 5/2007 | Peter | G06F 16/168 |
| 2007/0150830 A1 | 6/2007 | Ording et al. | |
| 2007/0157085 A1 | 7/2007 | Peters | |
| 2007/0229471 A1 | 10/2007 | Kim et al. | |
| 2008/0072152 A1 | 3/2008 | Crow et al. | |
| 2008/0165141 A1 | 7/2008 | Christie | |
| 2008/0172663 A1 | 7/2008 | Lee | |
| 2008/0225153 A1 | 9/2008 | Fagans | |
| 2008/0307311 A1 | 12/2008 | Eyal | |
| 2008/0309644 A1 | 12/2008 | Arimoto | |
| 2009/0064031 A1 * | 3/2009 | Bull | G06F 3/0481 |
| | | | 715/784 |
| 2009/0178007 A1 | 7/2009 | Matas et al. | |
| 2009/0244023 A1 | 10/2009 | Kim et al. | |
| 2009/0284479 A1 | 11/2009 | Dennis et al. | |
| 2009/0292743 A1 | 11/2009 | Bigus et al. | |
| 2009/0292989 A1 | 11/2009 | Matthews et al. | |
| 2009/0307589 A1 | 12/2009 | Inose et al. | |
| 2010/0070872 A1 | 3/2010 | Trujillo | |
| 2010/0083086 A1 | 4/2010 | Berger et al. | |
| 2010/0083091 A1 | 4/2010 | Berger et al. | |
| 2010/0083111 A1 | 4/2010 | de los Reyes | |
| 2010/0083184 A1 | 4/2010 | Trent et al. | |
| 2010/0134425 A1 | 6/2010 | Storrusten | |
| 2010/0137031 A1 | 6/2010 | Griffin et al. | |
| 2010/0169766 A1 | 7/2010 | Duarte et al. | |
| 2010/0169774 A1 | 7/2010 | Oda et al. | |
| 2010/0199215 A1 * | 8/2010 | Seymour | G06F 3/0485 |
| | | | 715/808 |
| 2010/0261526 A1 | 10/2010 | Anderson et al. | |
| 2010/0289752 A1 | 11/2010 | Birkler | |
| 2011/0010669 A1 * | 1/2011 | Basu | G06Q 10/10 |
| | | | 715/825 |
| 2011/0050593 A1 | 3/2011 | Kim et al. | |
| 2011/0055729 A1 | 3/2011 | Mason et al. | |
| 2011/0069016 A1 | 3/2011 | Victor | |
| 2011/0122078 A1 * | 5/2011 | Kasahara | G06F 3/0485 |
| | | | 345/173 |
| 2011/0122159 A1 * | 5/2011 | Bergsten | G06F 3/0482 |
| | | | 715/830 |
| 2011/0141031 A1 | 6/2011 | Mccullough et al. | |
| 2011/0141043 A1 | 6/2011 | Soubrie | |
| 2011/0164055 A1 | 7/2011 | McCullough et al. | |
| 2011/0167382 A1 | 7/2011 | Van Os | |
| 2011/0196864 A1 | 8/2011 | Mason et al. | |
| 2011/0227947 A1 | 9/2011 | Benko et al. | |
| 2011/0239166 A1 | 9/2011 | Choi | |
| 2011/0252380 A1 | 10/2011 | Chaudhri | |
| 2011/0252381 A1 | 10/2011 | Chaudhri | |
| 2011/0300910 A1 | 12/2011 | Choi | |
| 2011/0302532 A1 | 12/2011 | Missig | |
| 2011/0310026 A1 | 12/2011 | Davis et al. | |
| 2012/0030566 A1 | 2/2012 | Victor | |
| 2012/0030569 A1 | 2/2012 | Migos et al. | |
| 2012/0060117 A1 | 3/2012 | Bok et al. | |
| 2012/0192057 A1 | 7/2012 | Migos et al. | |
| 2012/0210214 A1 | 8/2012 | Yoo et al. | |
| 2012/0221978 A1 | 8/2012 | Matas et al. | |
| 2012/0254795 A1 | 10/2012 | Van Os et al. | |
| 2012/0311508 A1 | 12/2012 | Fleizach | |
| 2012/0327009 A1 | 12/2012 | Fleizach | |
| 2013/0002539 A1 | 1/2013 | Dennard et al. | |
| 2013/0127749 A1 | 5/2013 | Yamamoto et al. | |
| 2013/0154978 A1 | 6/2013 | Kim et al. | |
| 2013/0167082 A1 | 6/2013 | Joo et al. | |
| 2013/0227413 A1 * | 8/2013 | Thorsander | G06F 3/04886 |
| | | | 715/716 |
| 2013/0227454 A1 * | 8/2013 | Thorsander | G06F 3/0481 |
| | | | 715/767 |
| 2013/0227470 A1 * | 8/2013 | Thorsander | G06F 3/04886 |
| | | | 715/790 |
| 2013/0227482 A1 * | 8/2013 | Thorsander | G06F 3/04817 |
| | | | 715/821 |
| 2013/0227483 A1 * | 8/2013 | Thorsander | G06F 3/0482 |
| | | | 715/821 |
| 2013/0227490 A1 * | 8/2013 | Thorsander | G06F 3/04883 |
| | | | 715/841 |
| 2013/0246955 A1 | 9/2013 | Schwesig et al. | |
| 2013/0300710 A1 | 11/2013 | Cho et al. | |
| 2014/0229342 A1 * | 8/2014 | Marlowe | G06Q 30/0643 |
| | | | 705/27.2 |
| 2014/0304651 A1 | 10/2014 | Johansson et al. | |
| 2015/0121298 A1 | 4/2015 | Ma | |
| 2016/0011735 A1 | 1/2016 | Stoner et al. | |
| 2016/0048316 A1 | 2/2016 | Bae et al. | |
| 2016/0054887 A1 | 2/2016 | Tumwattana | |
| 2016/0088176 A1 * | 3/2016 | Maekawa | H04N 1/0097 |
| | | | 358/1.15 |
| 2016/0124589 A1 | 5/2016 | Chae et al. | |
| 2016/0139736 A1 | 5/2016 | Frank et al. | |
| 2016/0196043 A1 | 7/2016 | Kim | |
| 2016/0299657 A1 | 10/2016 | Howarth et al. | |
| 2016/0357381 A1 | 12/2016 | Coin-Perard et al. | |
| 2017/0038957 A1 * | 2/2017 | Feng | G06F 3/0484 |
| 2017/0131824 A1 | 5/2017 | Kamei | |
| 2017/0160884 A1 | 6/2017 | Son et al. | |
| 2017/0357393 A1 * | 12/2017 | Alonso-Ruiz | G06F 3/04883 |
| 2018/0136834 A1 | 5/2018 | Tumwattana | |
| 2019/0258373 A1 * | 8/2019 | Davydov | G06F 3/0488 |
| 2020/0174636 A1 * | 6/2020 | Milkovic | G06F 3/04842 |
| 2020/0326824 A1 * | 10/2020 | Alonso | G06F 3/04883 |

FOREIGN PATENT DOCUMENTS

| | | |
|---|---|---|
| CN | 103425426 A | 12/2013 |
| CN | 103577052 A | 2/2014 |
| CN | 106020640 A | 10/2016 |
| EP | 2447946 A2 | 5/2012 |
| EP | 2608007 A2 | 6/2013 |

(56) References Cited

FOREIGN PATENT DOCUMENTS

| | | | |
|---|---|---|---|
| EP | 2631760 A1 | 8/2013 |
| EP | 2738654 A2 | 6/2014 |
| EP | 2849047 A1 | 3/2015 |
| EP | 3015969 A1 | 5/2016 |
| JP | 2013-109666 A | 6/2013 |
| JP | 2017-10547 A | 1/2017 |
| KR | 10-2010-0137861 A | 12/2010 |
| KR | 10-2011-0133294 A | 12/2011 |
| KR | 10-2014-0067537 A | 6/2014 |
| KR | 10-2014-0092694 A | 7/2014 |
| KR | 10-2016-0050983 A | 5/2016 |
| KR | 10-2016-0083691 A | 7/2016 |
| WO | 2014/105278 A1 | 7/2014 |
| WO | 2014/168528 A1 | 10/2014 |

OTHER PUBLICATIONS

Office Action received for Danish Patent Application No. PA201970513, dated May 13, 2020, 4 pages.
Office Action received for Korean Patent Application No. 10-2020-7024954, dated Sep. 22, 2020, 11 pages (5 pages of English Translation and 6 pages of Official Copy).
Advisory Action received for U.S. Appl. No. 12/366,588, dated Sep. 16, 2013, 3 pages.
Advisory Action received for U.S. Appl. No. 12/366,588, dated Sep. 24, 2015, 3 pages.
Final Office Action received for U.S. Appl. No. 12/366,588, dated Jan. 22, 2016, 11 pages.
Final Office Action received for U.S. Appl. No. 12/366,588, dated Jul. 16, 2015, 11 pages.
Final Office Action received for U.S. Appl. No. 12/366,588, dated May 24, 2013, 11 pages.
Final Office Action received for U.S. Appl. No. 12/789,422, dated Nov. 29, 2013, 12 pages.
Final Office Action received for U.S. Appl. No. 12/789,422, dated Sep. 9, 2013, 11 pages.
Final Office Action received for U.S. Appl. No. 12/845,657, dated Jan. 18, 2013, 12 pages.
Final Office Action received for U.S. Appl. No. 14/932,815, dated Dec. 14, 2018, 18 pages.
International Preliminary Report on Patentability received for PCT Patent Application No. PCT/US2011/044457, dated Feb. 7, 2013, 11 pages.
International Preliminary Report on Patentability received for PCT Patent Application No. PCT/US2016/024311, dated Oct. 19, 2017, 10 pages.
International Search Report and Written Opinion received for PCT Patent Application No. PCT/US2011/044457, dated Mar. 6, 2012, 14 pages.
International Search Report and Written Opinion Received for PCT Patent Application No. PCT/US2016/024311, dated Jun. 22, 2016, 13 pages.
Non-Final Office Action received for U.S. Appl. No. 12/366,588, dated May 8, 2014, 11 pages.
Non-Final Office Action received for U.S. Appl. No. 12/366,588, dated Oct. 7, 2011, 11 pages.
Non-Final Office Action received for U.S. Appl. No. 12/789,422, dated Jan. 10, 2013, 11 pages.
Non-Final Office Action received for U.S. Appl. No. 12/845,657, dated Jun. 20, 2012, 22 pages.
Non-Final Office Action received for U.S. Appl. No. 14/932,815, dated Apr. 5, 2018, 16 pages.
Notice of Allowance received for U.S. Appl. No. 12/366,588, dated Jul. 11, 2016, 7 pages.
Notice of Allowance received for U.S. Appl. No. 12/789,422, dated Mar. 14, 2014, 7 pages.
Surdilovic, "Convenient intelligent cursor control web systems for Internet users with severe motor-impairments", International Journal of Medical Informatics, Available Online at: <https://www.sciencedirect.com/science/article/abs/pii/S1386505605001504>, vol. 75, Issue 1, Jan. 2006, pp. 86-100.
Office Action received for Danish Patent Application No. PA201970513, dated Jan. 17, 2020, 6 pages.
Invitation to Pay Additional Fees received for PCT Patent Application No. PCT/US2020/028118, mailed on Jul. 20, 2020, 14 pages.
Intention to Grant received for Danish Patent Application No. PA201970513, dated Jun. 30, 2020, 2 pages.
Decision to Grant received for Danish Patent Application No. PA201970513, dated Nov. 5, 2020, 2 pages.
International Search Report and Written Opinion received for PCT Patent Application No. PCT/US2020/028118, dated Sep. 14, 2020, 19 pages.
Office Action received for Australian Patent Application No. 2020223752, dated Sep. 15, 2020, 6 pages.
Search Report and Opinion received for Danish Patent Application No. PA201970513, dated Oct. 24, 2019, 10 pages.
Notice of Acceptance received for Australian Patent Application No. 2020223752, dated Jun. 10, 2021, 3 pages.
Office Action received for Chinese Patent Application No. 202011030989.2, dated May 27, 2021, 19 pages (10 pages of English Translation and 9 pages of Official Copy).
Office Action received for Australian Patent Application No. 2020223752, dated Mar. 19, 2021, 4 pages.
Notice of Allowance received for Korean Patent Application No. 10-2020-7024954, dated May 6, 2021, 4 pages (2 pages of English Translation and 2 pages of Official Copy).
Office Action received for Korean Patent Application No. 10-2021-7025087, dated Sep. 16, 2021, 13 pages (6 pages of English Translation and 7 pages of Official Copy).
International Preliminary Report on Patentability received for PCT Patent Application No. PCT/US2020/028118, dated Oct. 28, 2021, 16 pages.
Office Action received for Japanese Patent Application No. 2020-544920, dated Jul. 9, 2021, 7 pages (3 pages of English Translation and 4 pages of Official Copy).
Office Action received for Japanese Patent Application No. 2020-544920 dated Nov. 12, 2021, 6 pages (3 pages of English Translation and 3 pages of Official Copy).
Invitation to Pay Search Fees received for European Patent Application No. 20722961.8, mailed on Dec. 17, 2021, 4 pages.
Office Action received for Chinese Patent Application No. 202011030989.2, dated Jun. 14, 2022, 15 pages (9 pages of English Translation and 6 pages of Official Copy).
Office Action received for Korean Patent Application No. 10-2021-7025087, dated Jul. 8, 2022, 6 pages (3 pages of English Translation and 3 pages of Official Copy).
Office Action received for Australian Patent Application No. 2021215172, dated Jun. 20, 2022, 3 pages.
Notice of Allowance received for Japanese Patent Application No. 2020-544920, dated May 9, 2022, 4 pages (1 page of English Translation and 3 pages of Official Copy).
Office Action received for Chinese Patent Application No. 202011030989.2, dated Jan. 17, 2022, 13 pages (8 pages of English Translation and 5 pages of Official Copy).
Office Action received for European Patent Application No. 20722961.8, dated Feb. 23, 2022, 13 pages.
Notice of Allowance received for Korean Patent Application No. 10-2021-7025087, dated Oct. 5, 2022, 7 pages (2 pages of English Translation and 5 pages of Official Copy).
Notice of Acceptance received for Australian Patent Application No. 2021215172, dated Nov. 4, 2022, 3 pages.

* cited by examiner

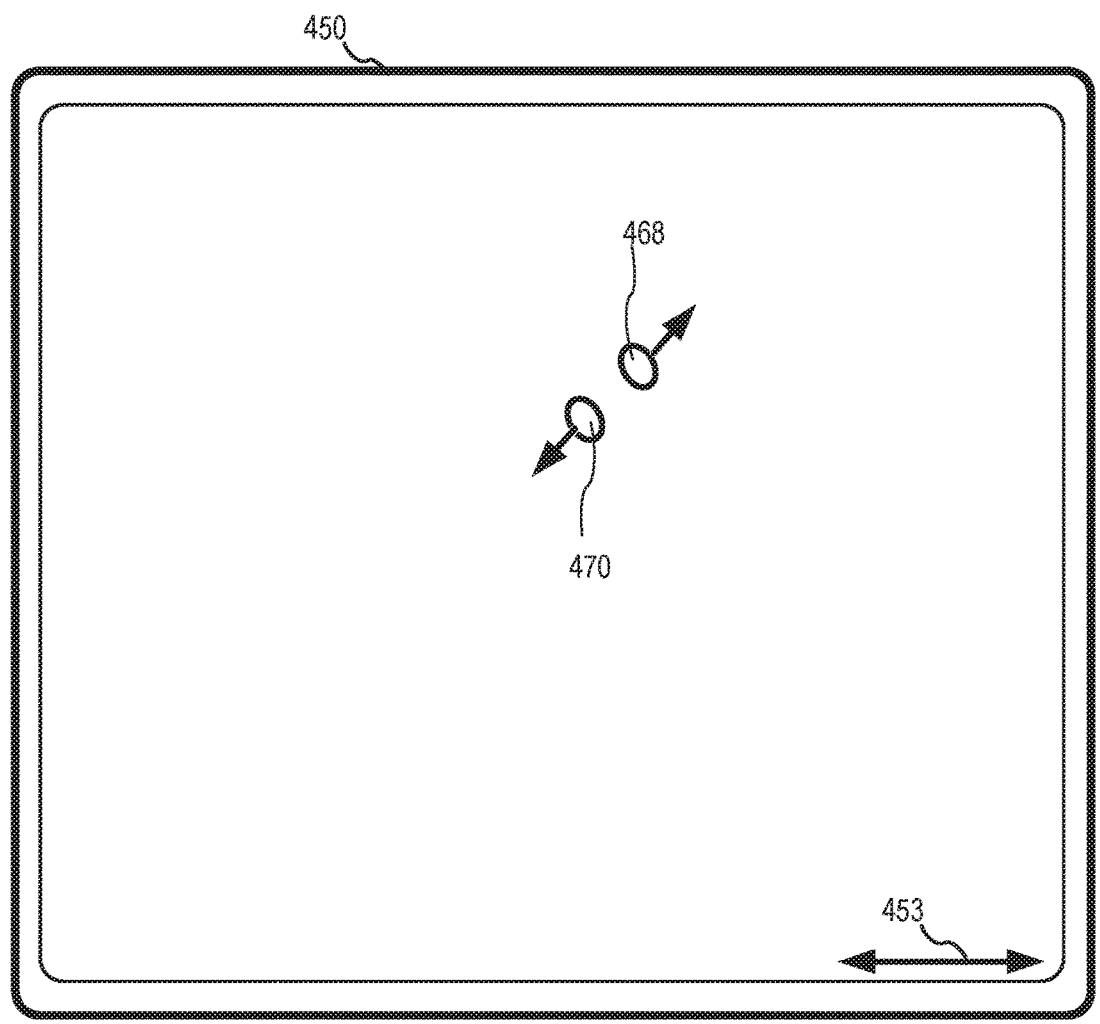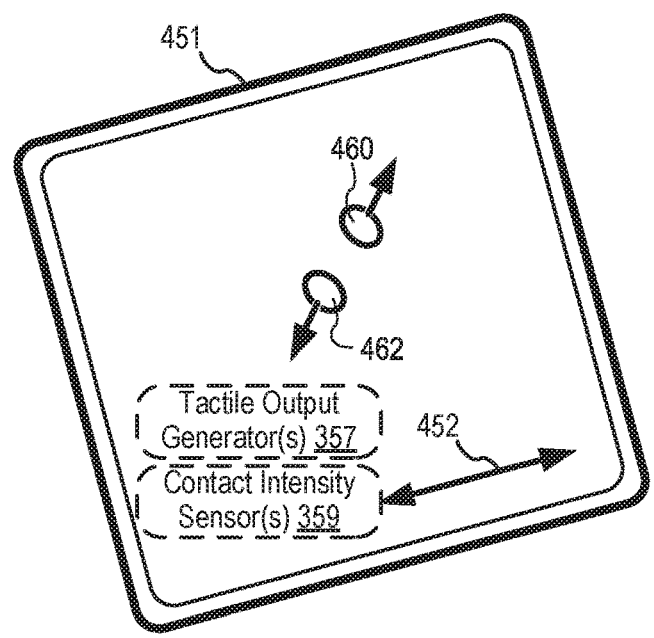
FIG. 4B

ACCELERATED SCROLLING AND SELECTION

CROSS-REFERENCE TO RELATED APPLICATIONS

This application claims the benefit of U.S. Provisional Application No. 62/834,364, entitled "Accelerated Scrolling and Selection," filed Apr. 15, 2019; and U.S. Provisional Application No. 62/844,015, entitled "Accelerated Scrolling and Selection," filed May 6, 2019, the contents of which are hereby incorporated by reference in their entirety.

FIELD

The present disclosure relates generally to computer user interfaces, and more specifically to techniques for selecting and scrolling items.

BACKGROUND

Techniques for selecting and scrolling items for display can be implemented on an electronic device.

BRIEF SUMMARY

Some techniques for selecting and scrolling items using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for selecting and scrolling items. Such methods and interfaces optionally complement or replace other methods for selecting and scrolling items. Such methods and interfaces reduce the cognitive burden on a user and produce a more efficient human-machine interface. For battery-operated computing devices, such methods and interfaces conserve power and increase the time between battery charges.

A method is described. The method is performed at an electronic device having a display and a touch-sensitive surface. The method comprises: at an electronic device with a display and a touch-sensitive surface: displaying, via the display, a user interface including a plurality of items; while the user interface is in a first mode of operation, detecting a first input including a respective number of contacts on the user interface at a location corresponding to a first item of the plurality of items; in response to detecting the first input: in accordance with a determination that the first input is a stationary input with a first number of contacts, performing an action associated with the first item; and in accordance with a determination that the first input is a stationary input with a second number of contacts that is different from the first number of contacts, switching the user interface from the first mode of operation to a second mode of operation without performing the action associated with the first item; while the electronic device is in the second mode of operation, detecting a second input including the first number of contacts at a location on the display corresponding to a second item of the plurality of items; and in response to detecting the second input, selecting the second item without performing an action associated with the second item.

A non-transitory computer-readable storage medium is described. The non-transitory computer-readable storage medium stores one or more programs configured to be executed by one or more processors of an electronic device with a display and a touch-sensitive surface, the one or more programs including instructions for: displaying, via the display, a user interface including a plurality of items; while the user interface is in a first mode of operation, detecting a first input including a respective number of contacts on the user interface at a location corresponding to a first item of the plurality of items; in response to detecting the first input: in accordance with a determination that the first input is a stationary input with a first number of contacts, performing an action associated with the first item; and in accordance with a determination that the first input is a stationary input with a second number of contacts that is different from the first number of contacts, switching the user interface from the first mode of operation to a second mode of operation without performing the action associated with the first item; while the electronic device is in the second mode of operation, detecting a second input including the first number of contacts at a location on the display corresponding to a second item of the plurality of items; and in response to detecting the second input, selecting the second item without performing an action associated with the second item.

A transitory computer-readable storage medium is described. The transitory computer-readable storage medium stores one or more programs configured to be executed by one or more processors of an electronic device with a display and a touch-sensitive surface, the one or more programs including instructions for: displaying, via the display, a user interface including a plurality of items; while the user interface is in a first mode of operation, detecting a first input including a respective number of contacts on the user interface at a location corresponding to a first item of the plurality of items; in response to detecting the first input: in accordance with a determination that the first input is a stationary input with a first number of contacts, performing an action associated with the first item; and in accordance with a determination that the first input is a stationary input with a second number of contacts that is different from the first number of contacts, switching the user interface from the first mode of operation to a second mode of operation without performing the action associated with the first item; while the electronic device is in the second mode of operation, detecting a second input including the first number of contacts at a location on the display corresponding to a second item of the plurality of items; and in response to detecting the second input, selecting the second item without performing an action associated with the second item.

An electronic device is described. The electronic device comprises: a display; a touch-sensitive surface; one or more processors; and memory storing one or more programs configured to be executed by the one or more processors, the one or more programs including instructions for: displaying, via the display, a user interface including a plurality of items; while the user interface is in a first mode of operation, detecting a first input including a respective number of contacts on the user interface at a location corresponding to a first item of the plurality of items; in response to detecting the first input in accordance with a determination that the first input is a stationary input with a first number of contacts, performing an action associated with the first item; and in accordance with a determination that the first input is a stationary input with a second number of contacts that is different from the first number of contacts, switching the user interface from the first mode of operation to a second mode of operation without performing the action associated with the first item; while the electronic device is in the second mode of operation, detecting a second input including the first number of contacts at a location on the display corresponding to a second item of the plurality of items; and in response to detecting the second input, selecting the second item without performing an action associated with the second item.

An electronic device is described. The electronic device comprises: a display; a touch-sensitive surface; means for displaying, via the display, a user interface including a plurality of items; means for while the user interface is in a first mode of operation, detecting a first input including a respective number of contacts on the user interface at a location corresponding to a first item of the plurality of items; means for in response to detecting the first input: in accordance with a determination that the first input is a stationary input with a first number of contacts, performing an action associated with the first item; and in accordance with a determination that the first input is a stationary input with a second number of contacts that is different from the first number of contacts, switching the user interface from the first mode of operation to a second mode of operation without performing the action associated with the first item; means for while the electronic device is in the second mode of operation, detecting a second input including the first number of contacts at a location on the display corresponding to a second item of the plurality of items; and means for in response to detecting the second input, selecting the second item without performing an action associated with the second item.

A method is described. The method is performed at an electronic device having a display and a touch-sensitive surface. The method comprises: displaying, via the display, a user interface that includes a plurality of items; detecting a first input at a location on the display corresponding to a first item in the plurality of items; in response to detecting the first input at the location on the display corresponding to the first item, changing the selection state of the first item; after changing the selection state of the first item, detecting a second input that corresponds to a request to scroll the user interface; and in response to detecting the second input: in accordance with a determination that the first input is maintained on the display, changing the selection state of one or more items while scrolling the plurality of items; and in accordance with a determination that the first input is not maintained on the display, scrolling the plurality of items without changing the selection state of the one or more items in the plurality of items.

A non-transitory computer-readable storage medium is described. The non-transitory computer-readable storage medium stores one or more programs configured to be executed by one or more processors of an electronic device with a display and a touch-sensitive surface, the one or more programs including instructions for: displaying, via the display, a user interface that includes a plurality of items; detecting a first input at a location on the display corresponding to a first item in the plurality of items; in response to detecting the first input at the location on the display corresponding to the first item, changing the selection state of the first item; after changing the selection state of the first item, detecting a second input that corresponds to a request to scroll the user interface; and in response to detecting the second input: in accordance with a determination that the first input is maintained on the display, changing the selection state of one or more items while scrolling the plurality of items; and in accordance with a determination that the first input is not maintained on the display, scrolling the plurality of items without changing the selection state of the one or more items in the plurality of items.

A transitory computer-readable storage medium is described. The transitory computer-readable storage medium stores one or more programs configured to be executed by one or more processors of an electronic device with a display and a touch-sensitive surface, the one or more programs including instructions for: displaying, via the display, a user interface that includes a plurality of items; detecting a first input at a location on the display corresponding to a first item in the plurality of items; in response to detecting the first input at the location on the display corresponding to the first item, changing the selection state of the first item; after changing the selection state of the first item, detecting a second input that corresponds to a request to scroll the user interface; and in response to detecting the second input: in accordance with a determination that the first input is maintained on the display, changing the selection state of one or more items while scrolling the plurality of items; and in accordance with a determination that the first input is not maintained on the display, scrolling the plurality of items without changing the selection state of the one or more items in the plurality of items.

An electronic device is described. The electronic device comprises: a display; a touch-sensitive surface; one or more processors; and memory storing one or more programs configured to be executed by the one or more processors, the one or more programs including instructions for: displaying, via the display, a user interface that includes a plurality of items; detecting a first input at a location on the display corresponding to a first item in the plurality of items; in response to detecting the first input at the location on the display corresponding to the first item, changing the selection state of the first item; after changing the selection state of the first item, detecting a second input that corresponds to a request to scroll the user interface; and in response to detecting the second input: in accordance with a determination that the first input is maintained on the display, changing the selection state of one or more items while scrolling the plurality of items; and in accordance with a determination that the first input is not maintained on the display, scrolling the plurality of items without changing the selection state of the one or more items in the plurality of items.

An electronic device is described. The electronic device comprises: a display; a touch-sensitive surface; means for displaying, via the display, a user interface that includes a plurality of items; means for detecting a first input at a location on the display corresponding to a first item in the plurality of items; means for in response to detecting the first input at the location on the display corresponding to the first item, changing the selection state of the first item; means for after changing the selection state of the first item, detecting a second input that corresponds to a request to scroll the user interface; and means for in response to detecting the second input: in accordance with a determination that the first input is maintained on the display, changing the selection state of one or more items while scrolling the plurality of items; and in accordance with a determination that the first input is not maintained on the display, scrolling the plurality of items without changing the selection state of the one or more items in the plurality of items.

A method is described. The method is performed at an electronic device having a display and a touch-sensitive surface. The method comprises: displaying, via the display, a user interface; detecting a first input that corresponds to a request to scroll the user interface; in response to detecting the first input, scrolling the user interface and displaying a scroll progress indicator; while the scroll progress indicator is displayed, detecting a second input that includes a first portion that is substantially stationary followed by a second portion that includes movement in a first direction; and in response to detecting the second input: in accordance with a determination that the first portion of the second input was directed to the scroll progress indicator and does not satisfy first criteria, scrolling the user interface in a first manner based on the movement of the contact in the second portion of the second input; and in accordance with a determination that the first portion of the second input was directed to the scroll progress indicator and satisfies the first criteria, scrolling the user interface in a second manner that is different from the first manner and is based on the movement of the contact in the second portion of the second input.

A non-transitory computer-readable storage medium is described. The non-transitory computer-readable storage medium stores one or more programs configured to be executed by one or more processors of an electronic device with a display and a touch-sensitive surface, the one or more programs including instructions for: displaying, via the display, a user interface; detecting a first input that corresponds to a request to scroll the user interface; in response to detecting the first input, scrolling the user interface and displaying a scroll progress indicator; while the scroll progress indicator is displayed, detecting a second input that includes a first portion that is substantially stationary followed by a second portion that includes movement in a first direction; and in response to detecting the second input: in accordance with a determination that the first portion of the second input was directed to the scroll progress indicator and does not satisfy first criteria, scrolling the user interface in a first manner based on the movement of the contact in the second portion of the second input; and in accordance with a determination that the first portion of the second input was directed to the scroll progress indicator and satisfies the first criteria, scrolling the user interface in a second manner that is different from the first manner and is based on the movement of the contact in the second portion of the second input.

A transitory computer-readable storage medium is described. The transitory computer-readable storage medium stores one or more programs configured to be executed by one or more processors of an electronic device with a display and a touch-sensitive surface, the one or more programs including instructions for: displaying, via the display, a user interface; detecting a first input that corresponds to a request to scroll the user interface; in response to detecting the first input, scrolling the user interface and displaying a scroll progress indicator; while the scroll progress indicator is displayed, detecting a second input that includes a first portion that is substantially stationary followed by a second portion that includes movement in a first direction; and in response to detecting the second input: in accordance with a determination that the first portion of the second input was directed to the scroll progress indicator and does not satisfy first criteria, scrolling the user interface in a first manner based on the movement of the contact in the second portion of the second input; and in accordance with a determination that the first portion of the second input was directed to the scroll progress indicator and satisfies the first criteria, scrolling the user interface in a second manner that is different from the first manner and is based on the movement of the contact in the second portion of the second input.

An electronic device is described. The electronic device comprises: a display; a touch-sensitive surface; one or more processors; and memory storing one or more programs configured to be executed by the one or more processors, the one or more programs including instructions for: displaying, via the display, a user interface; detecting a first input that corresponds to a request to scroll the user interface; in response to detecting the first input, scrolling the user interface and displaying a scroll progress indicator; while the scroll progress indicator is displayed, detecting a second input that includes a first portion that is substantially stationary followed by a second portion that includes movement in a first direction; and in response to detecting the second input: in accordance with a determination that the first portion of the second input was directed to the scroll progress indicator and does not satisfy first criteria, scrolling the user interface in a first manner based on the movement of the contact in the second portion of the second input; and in accordance with a determination that the first portion of the second input was directed to the scroll progress indicator and satisfies the first criteria, scrolling the user interface in a second manner that is different from the first manner and is based on the movement of the contact in the second portion of the second input.

An electronic device is described. The electronic device comprises: a display; a touch-sensitive surface; means for displaying, via the display, a user interface; means for detecting a first input that corresponds to a request to scroll the user interface; means for in response to detecting the first input, scrolling the user interface and displaying a scroll progress indicator; means for while the scroll progress indicator is displayed, detecting a second input that includes a first portion that is substantially stationary followed by a second portion that includes movement in a first direction; and means for in response to detecting the second input: in accordance with a determination that the first portion of the second input was directed to the scroll progress indicator and does not satisfy first criteria, scrolling the user interface in a first manner based on the movement of the contact in the second portion of the second input; and in accordance with a determination that the first portion of the second input was directed to the scroll progress indicator and satisfies the first criteria, scrolling the user interface in a second manner that is different from the first manner and is based on the movement of the contact in the second portion of the second input.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for selecting and scrolling items, thereby increasing the effectiveness, efficiency, and user satisfaction with such devices. Such methods and interfaces may complement or replace other methods for selecting and scrolling items.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for selecting and scrolling items. For example, items in a list, such as a list of emails, can be scrolled and selected (e.g., for performing an action such as moving or deleting the emails) using the disclosed techniques. Such techniques can reduce the cognitive burden on a user who selects and scrolls items, thereby enhancing productivity. Further, such techniques can reduce processor and battery power otherwise wasted on redundant user inputs.

Figure 6A:
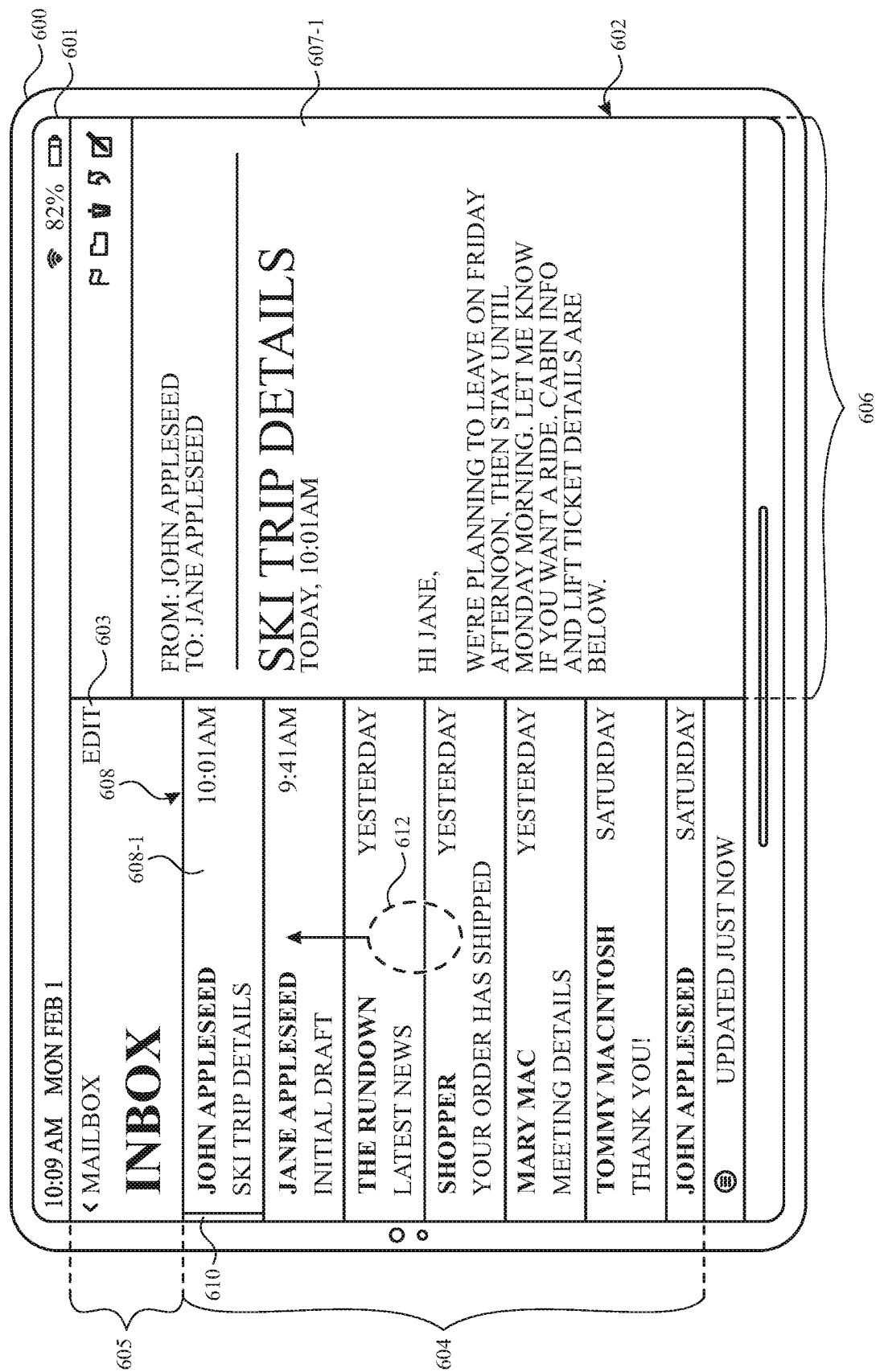
FIGS. 6A-6S illustrate exemplary user interfaces for selecting and scrolling items in accordance with some embodiments.
Figure 6S:
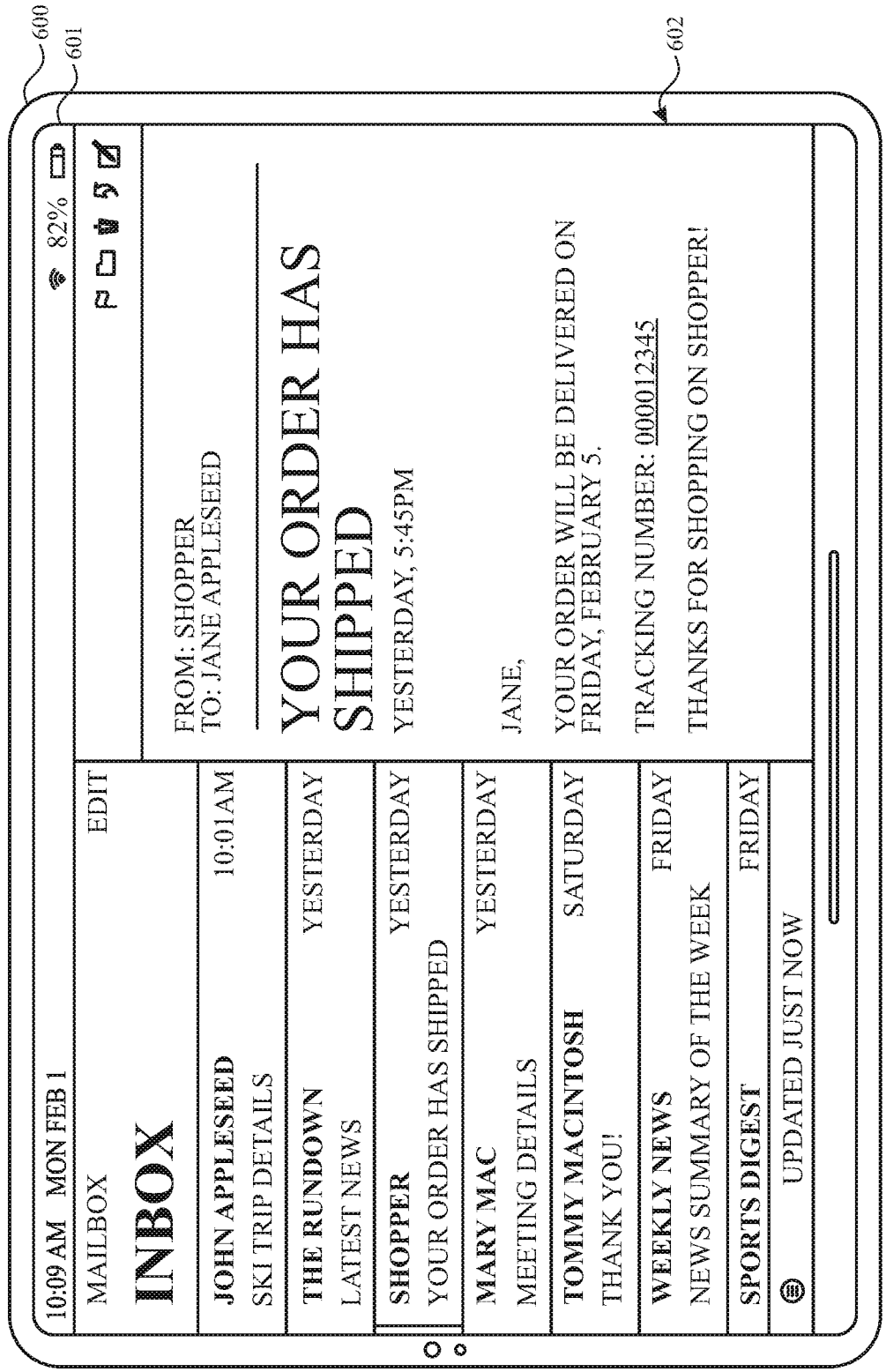
Figure 7:
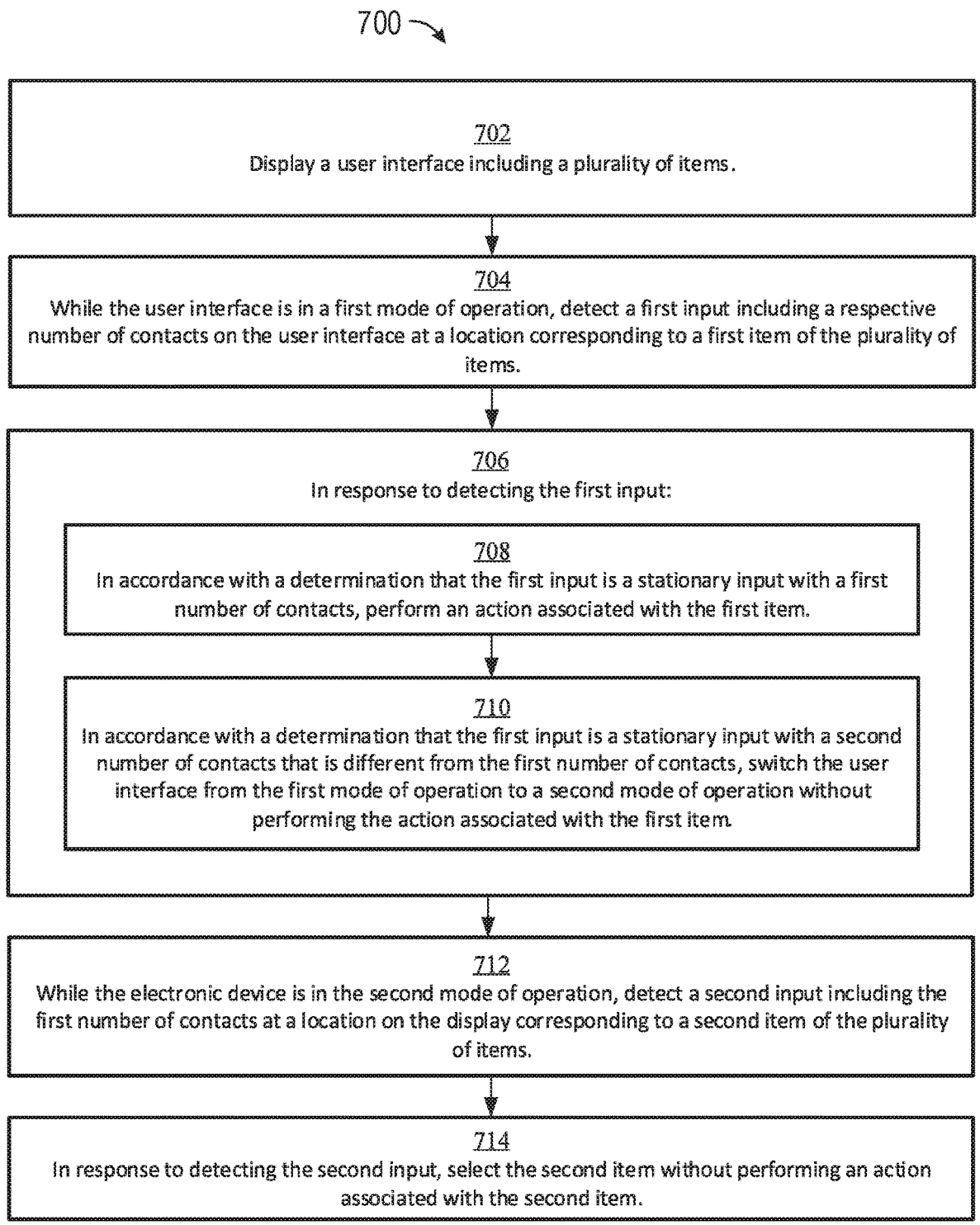
FIG. 7 is a flow diagram illustrating a method for selecting and scrolling items in accordance with some embodiments.
Figure 8A:
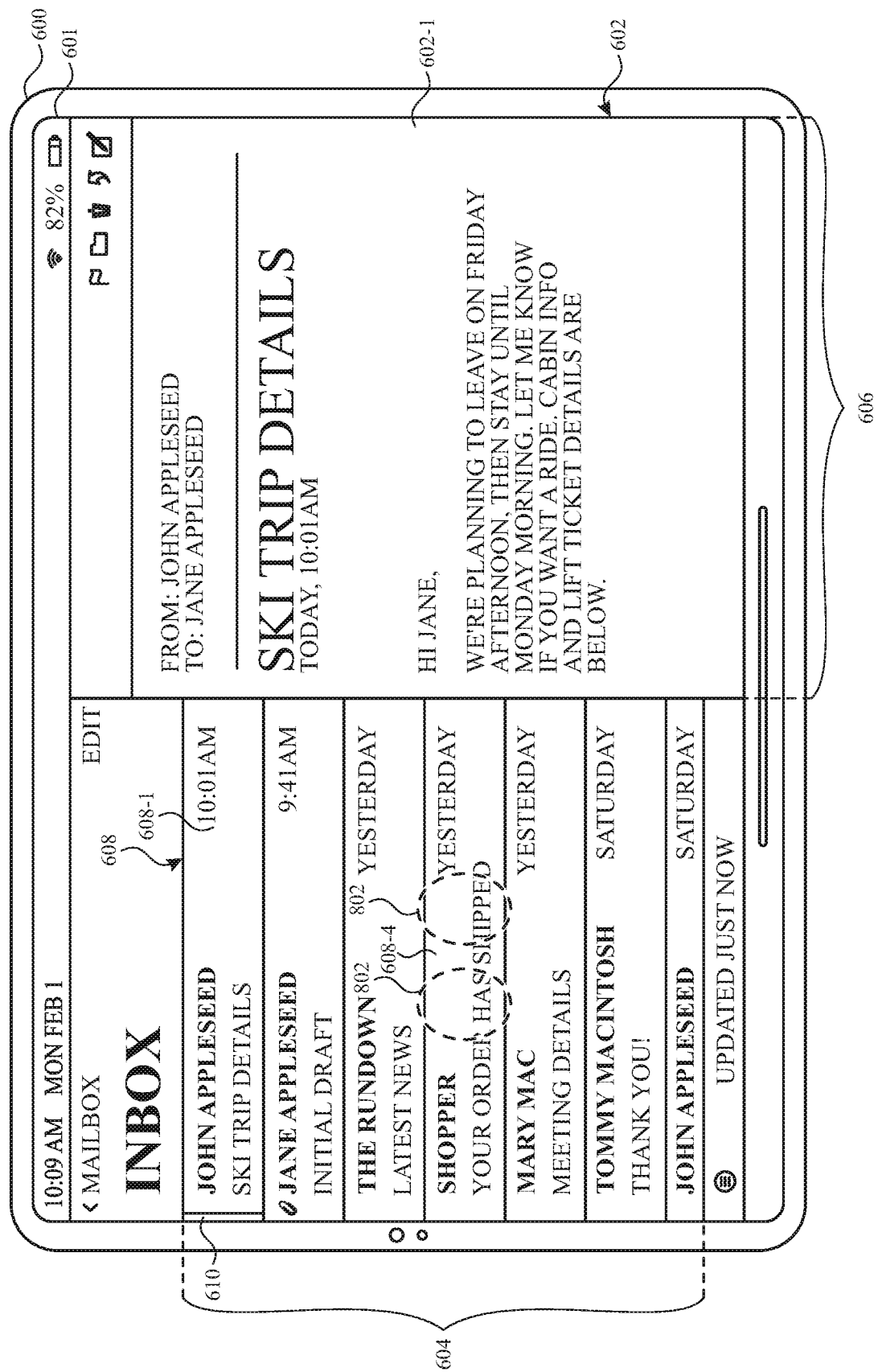
FIGS. 8A-8R illustrate exemplary user interfaces for selecting and scrolling items in accordance with some embodiments.
Figure 8B:
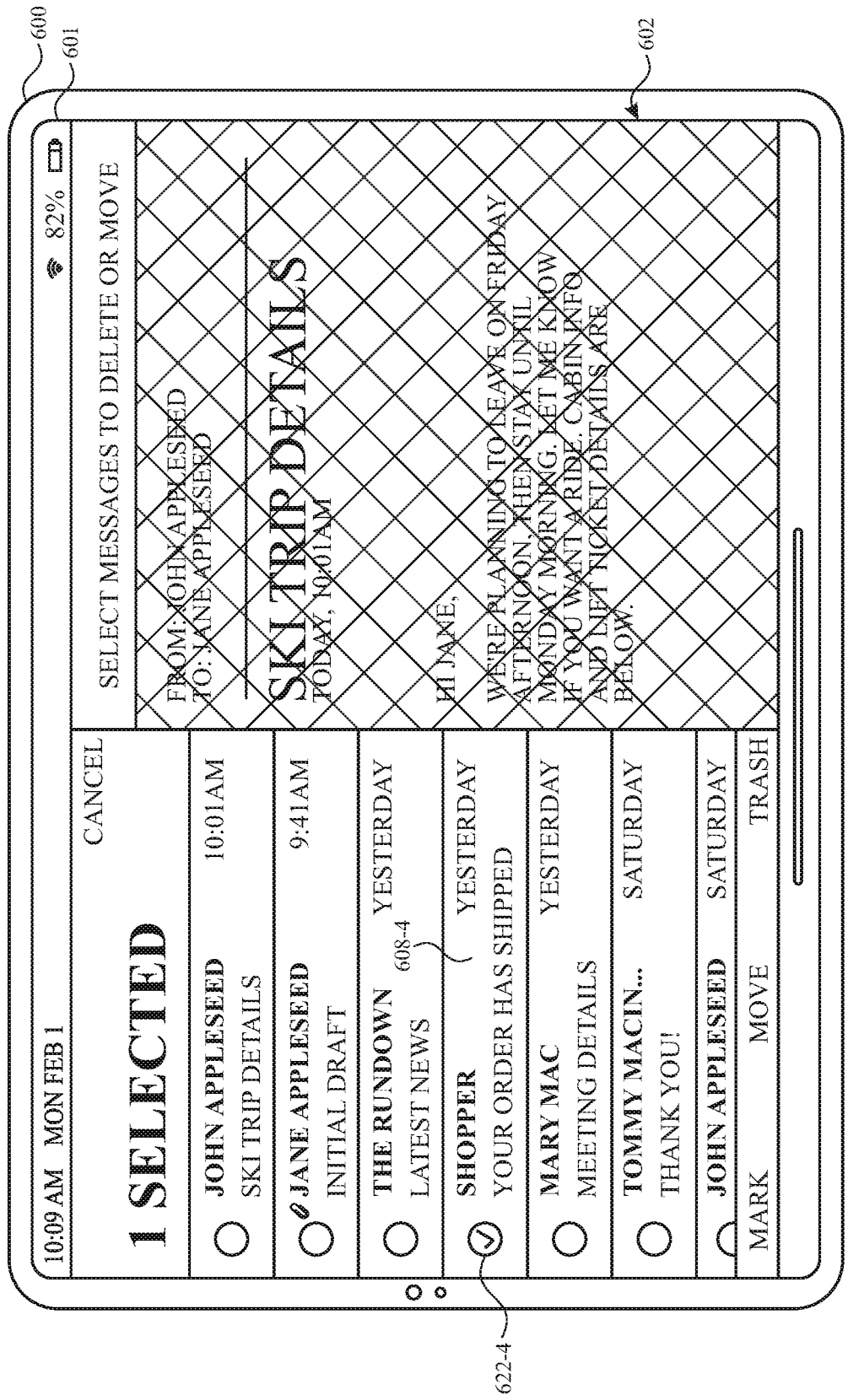
Figure 8R:
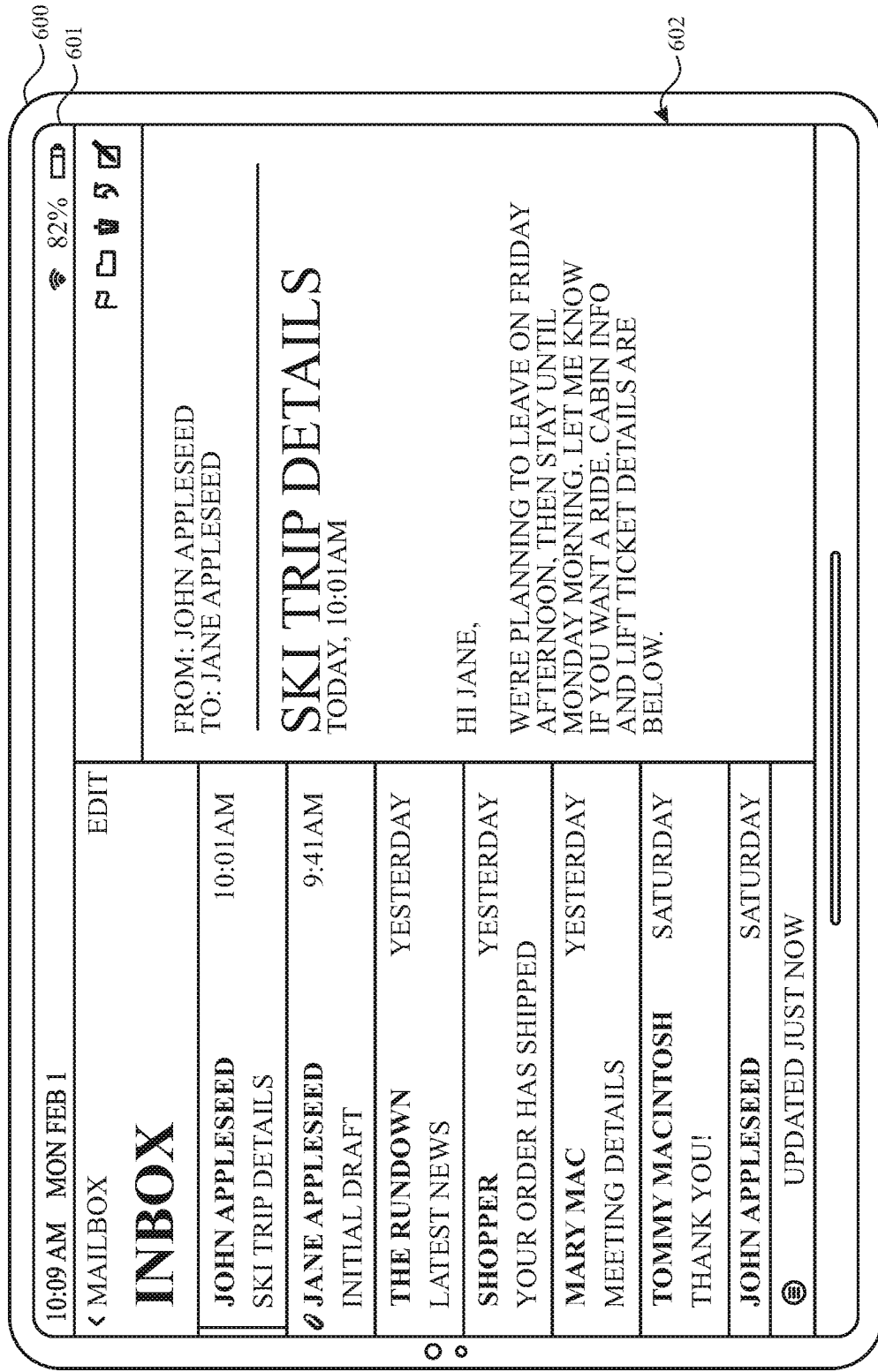
Figure 9:
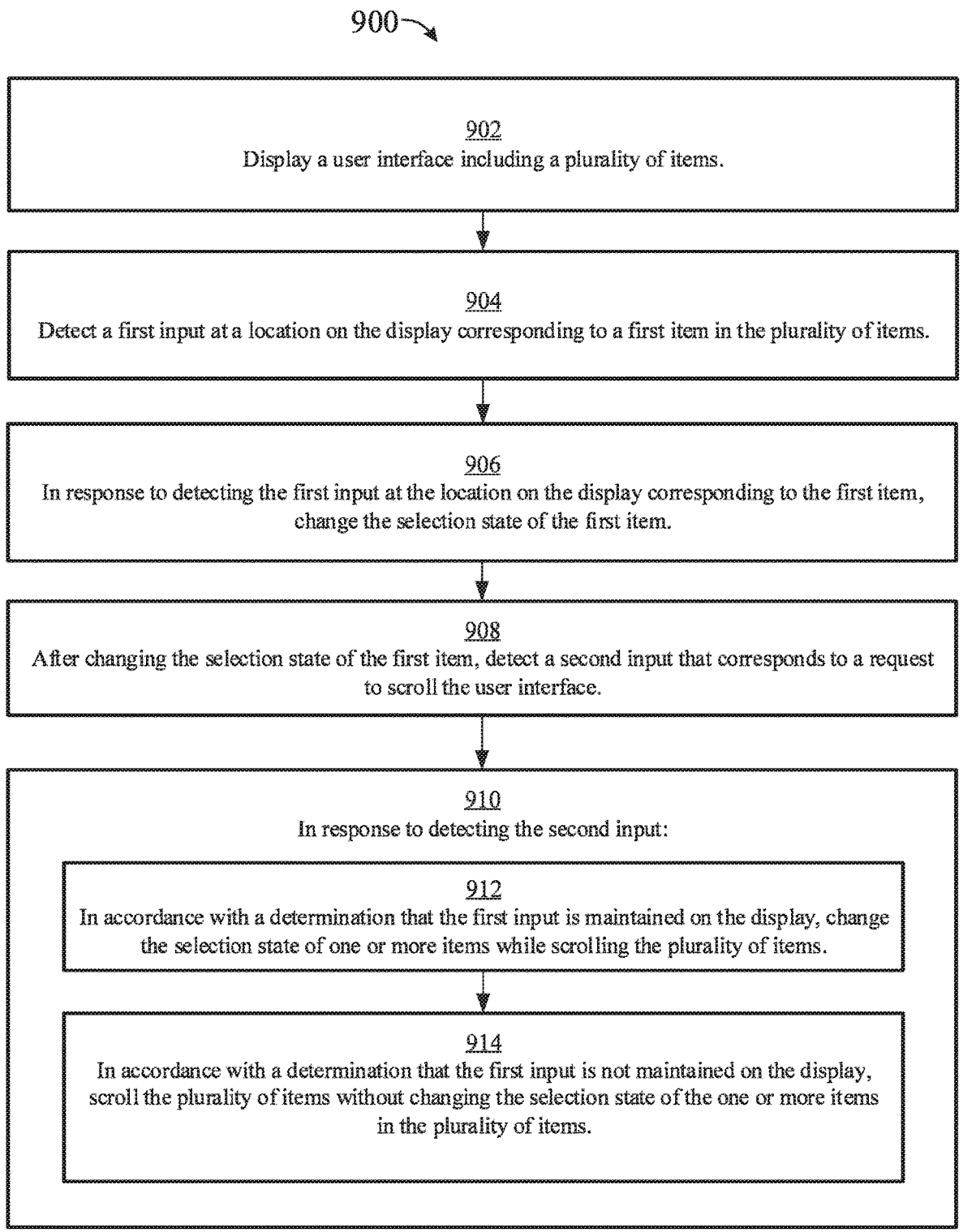
FIG. 9 is a flow diagram illustrating a method for selecting and scrolling items in accordance with some embodiments.
Figure 10A:
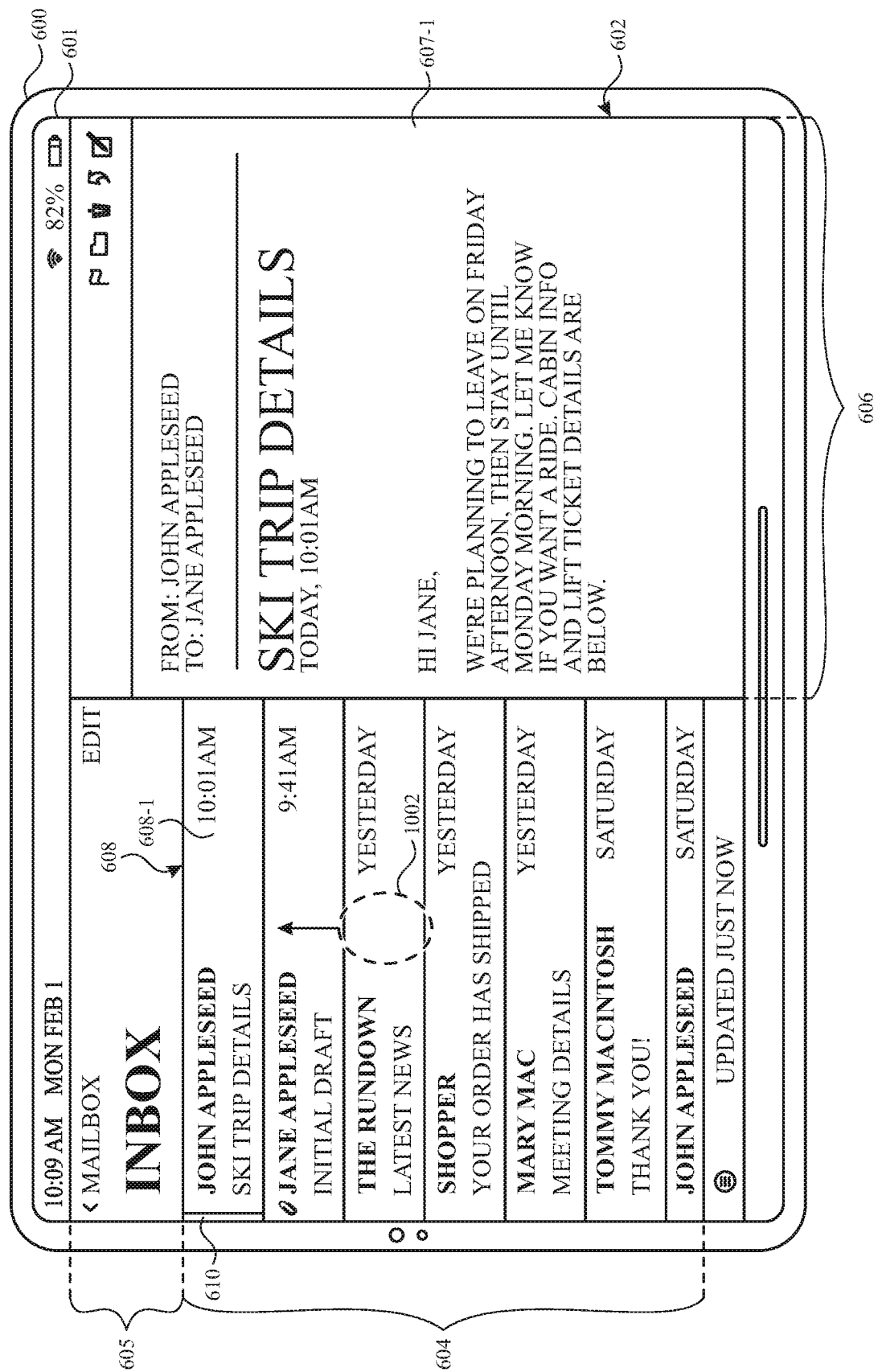
FIGS. 10A-10W illustrate exemplary user interfaces for scrolling items in accordance with some embodiments.
Figure 10B:
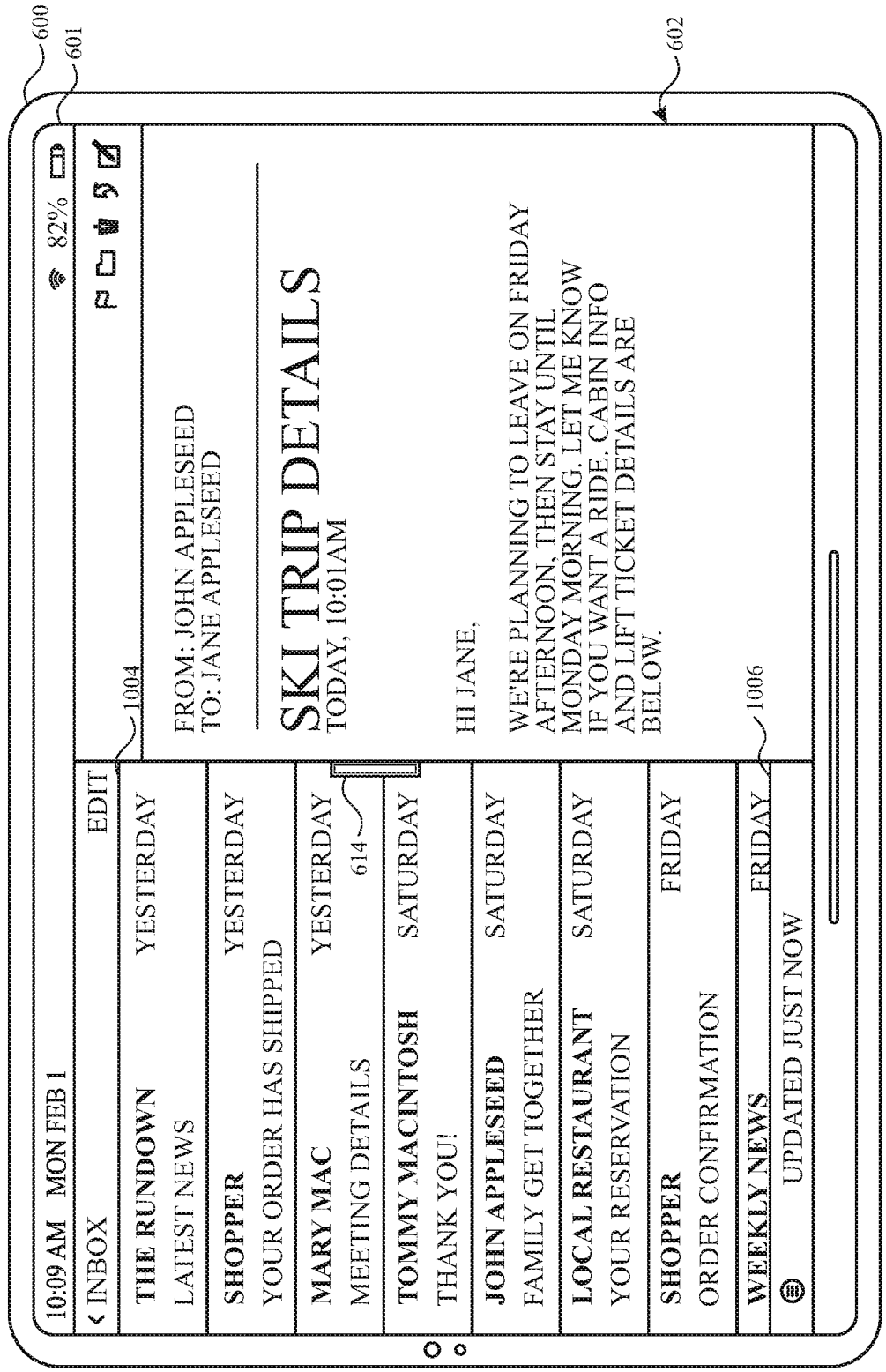
Figure 10C:
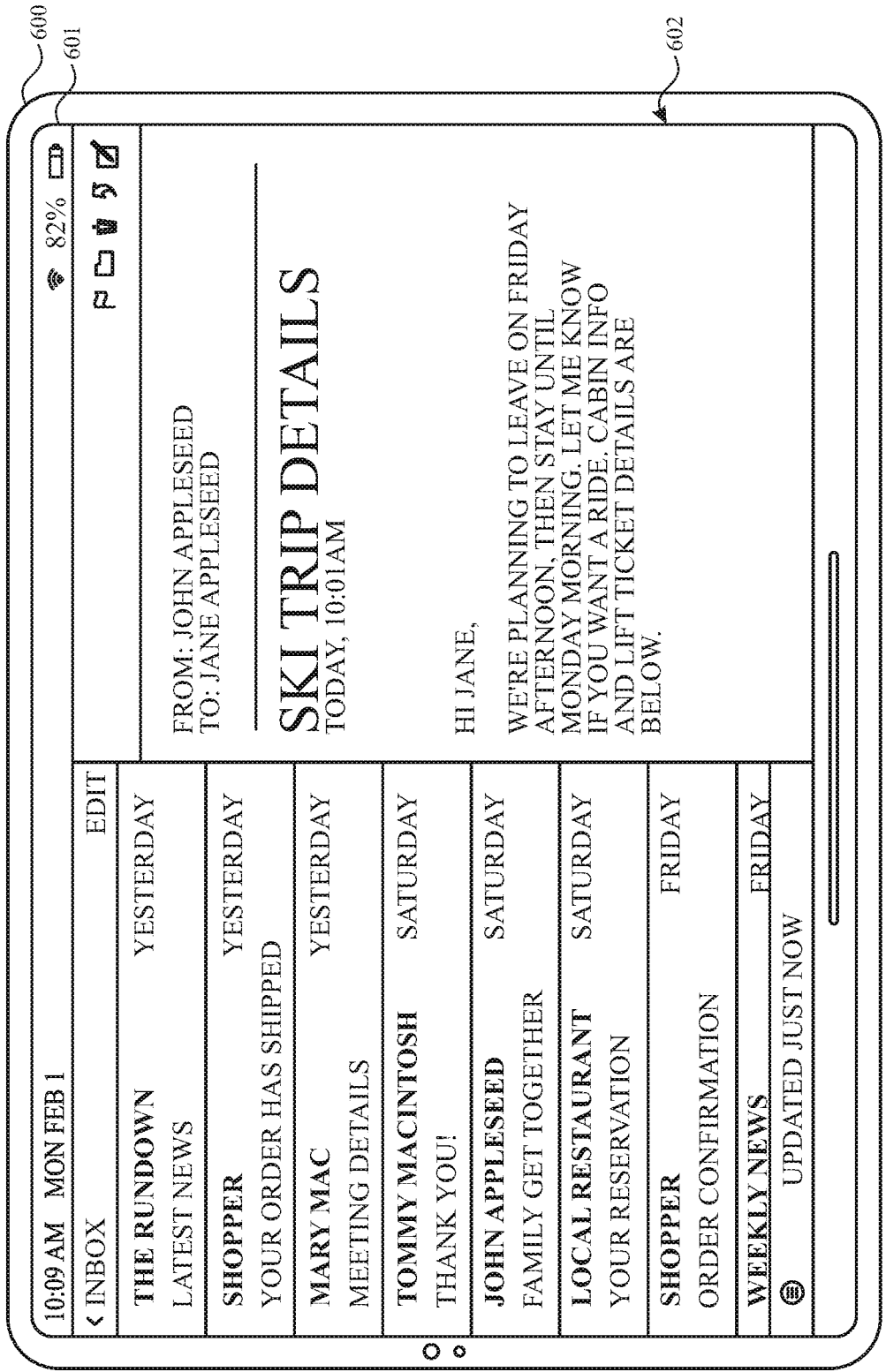
Figure 10W:
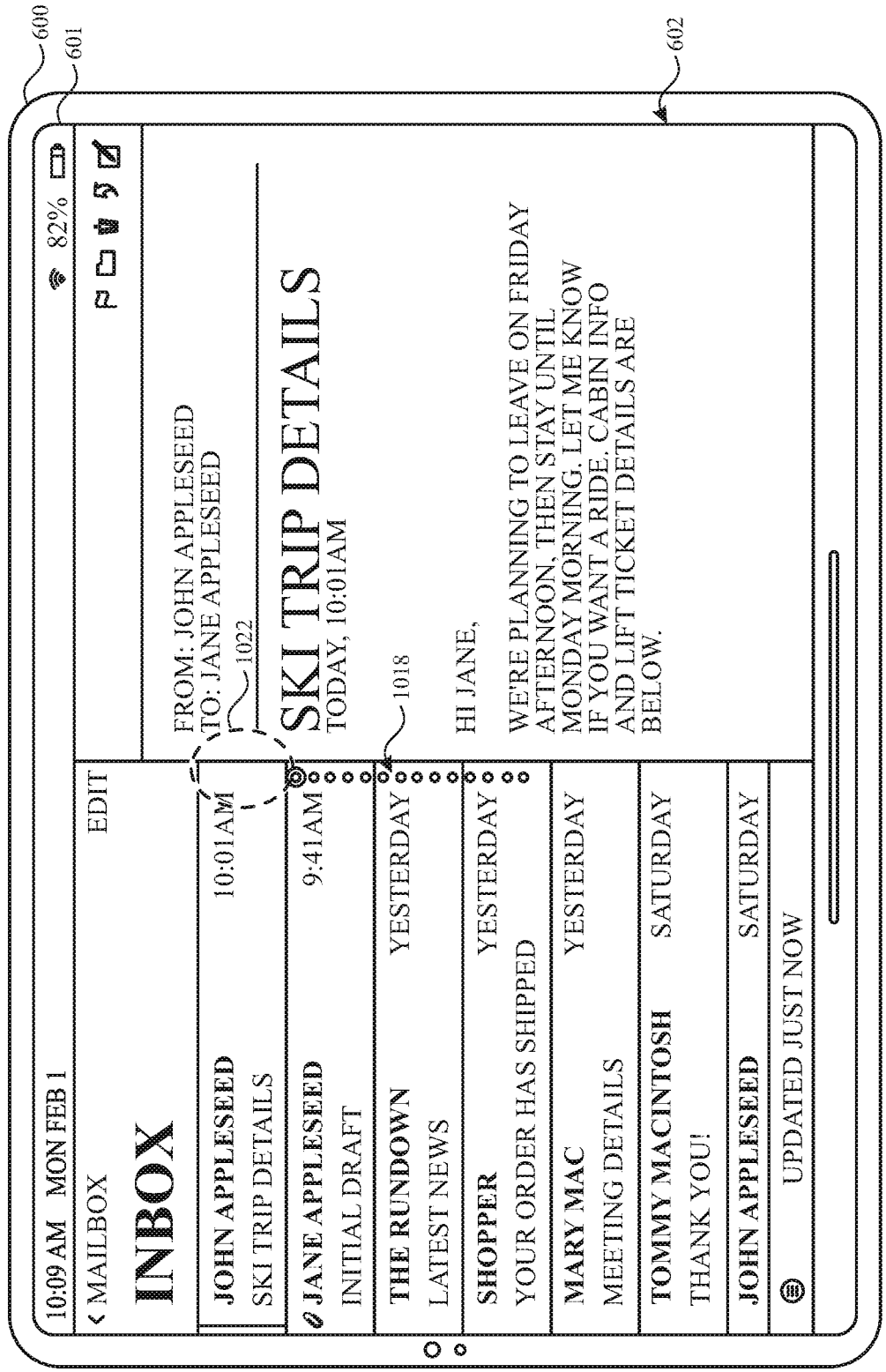
Figure 11:
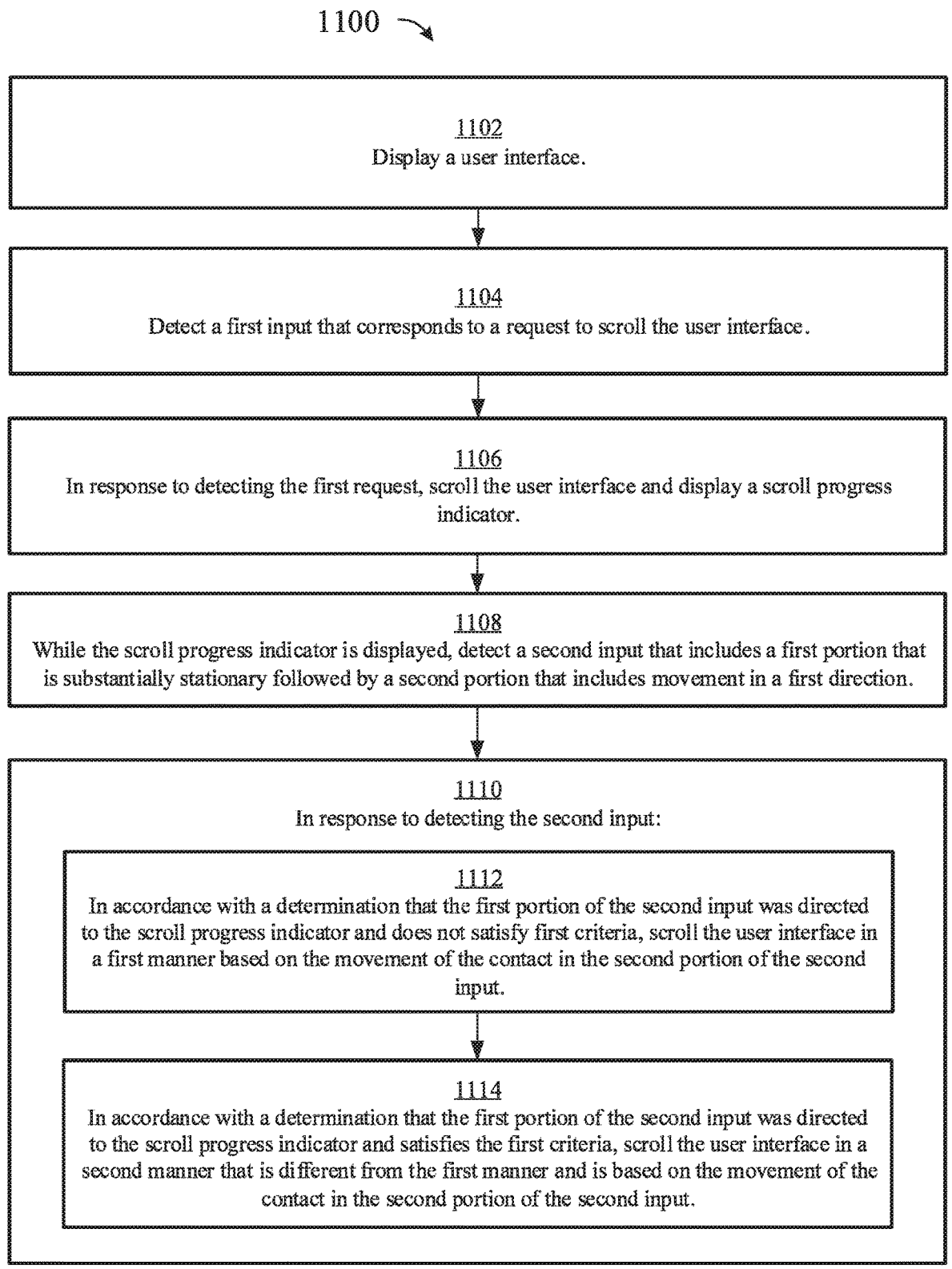
FIG. 11 is a flow diagram illustrating a method for scrolling items in accordance with some embodiments.

Below, FIGS. 1A-1B, 2, 4A-4B, and 5A-5B provide a description of exemplary devices for performing the techniques for selecting and scrolling items. FIGS. 6A-6S illustrate exemplary user interfaces for selecting and scrolling items. FIG. 7 is a flow diagram illustrating methods of selecting and scrolling items in accordance with some embodiments. The user interfaces in FIGS. 6A-6S are used to illustrate the processes described below, including the processes in FIG. 7. FIGS. 8A-8R illustrate exemplary user interfaces for selecting and scrolling items. FIG. 9 is a flow diagram illustrating methods of selecting and scrolling items in accordance with some embodiments. The user interfaces in FIGS. 8A-8R are used to illustrate the processes described below, including the processes in FIG. 9. FIGS. 10A-10W illustrate exemplary user interfaces for scrolling items. FIG. 11 is a flow diagram illustrating methods of scrolling items in accordance with some embodiments. The user interfaces in FIGS. 10A-10W are used to illustrate the processes described below, including the processes in FIG. 11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
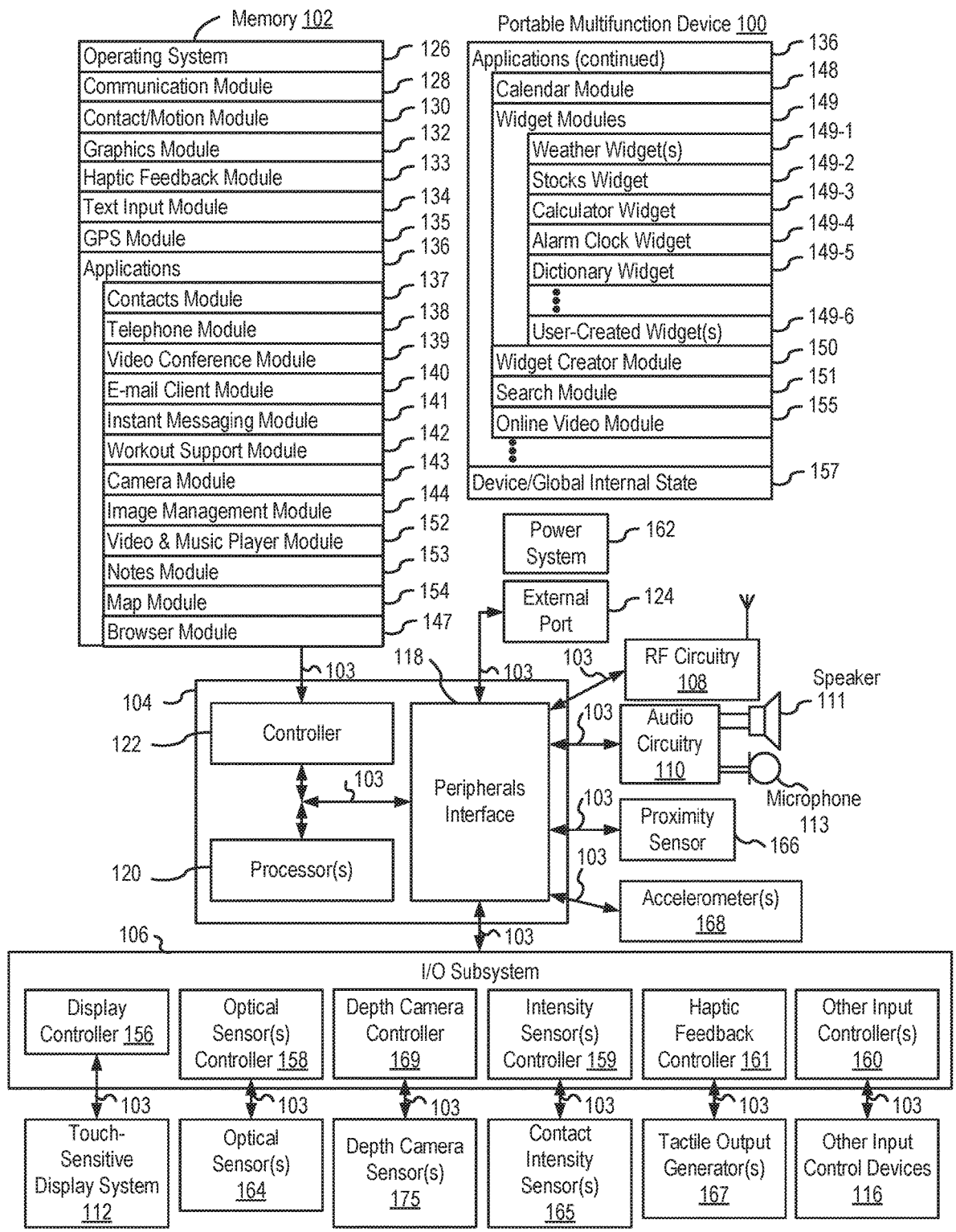
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data. GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA) Bluetooth, Bluetooth Low Energy (BTE), Wireless Fidelity (Wi-Fi) (e.g., IEEE 802.11a, IEEE 802.11b, IEEE 802.11g, IEEE 802.11n, and/or IEEE 802.11c), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen" filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity in Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based. On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
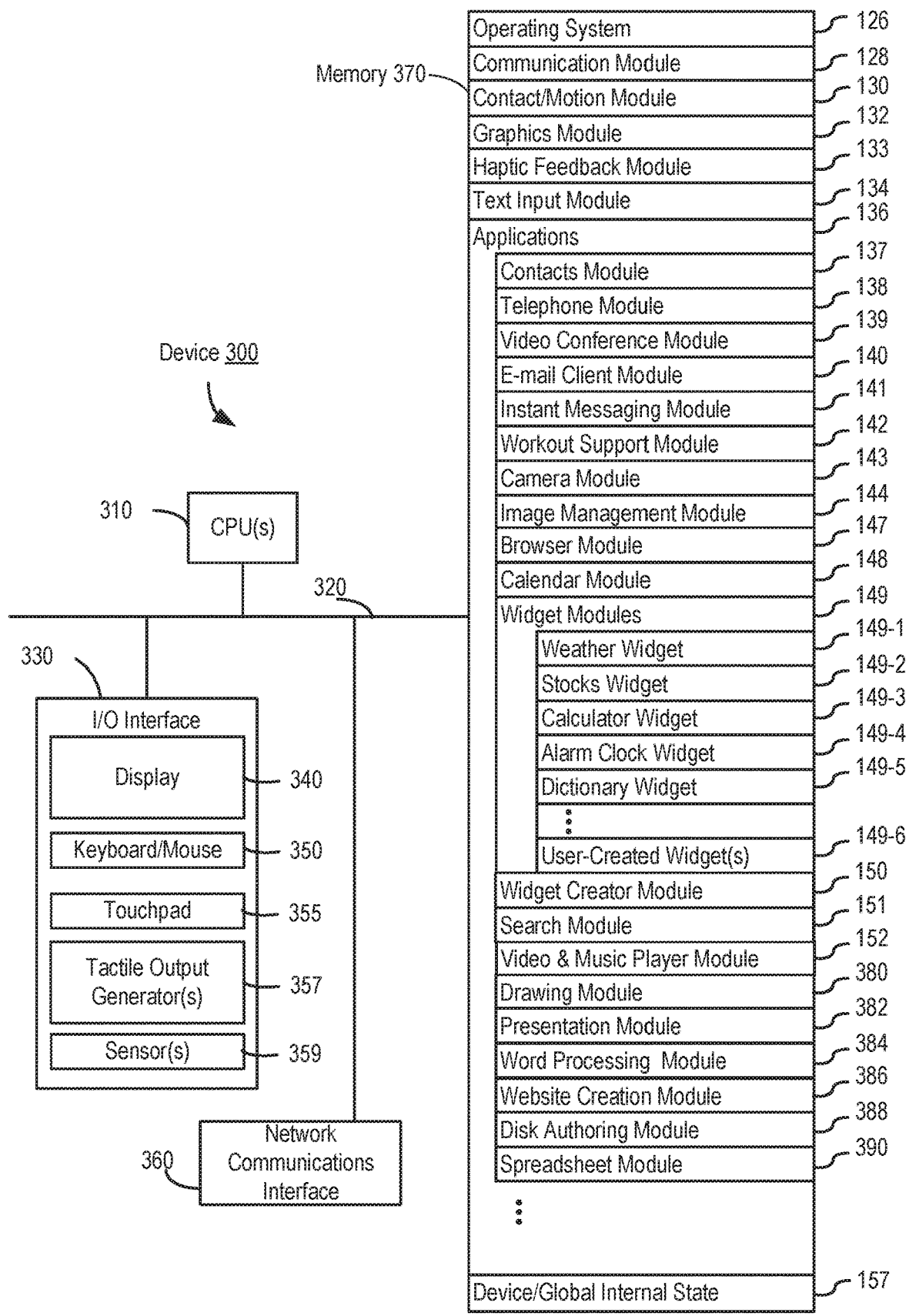
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
linage management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or MIPS).

In conjunction with RE circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RE circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RE circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application e.g., the computer-implemented methods and other information processing methods described herein). These modules (e.g., sets of instructions) creed not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
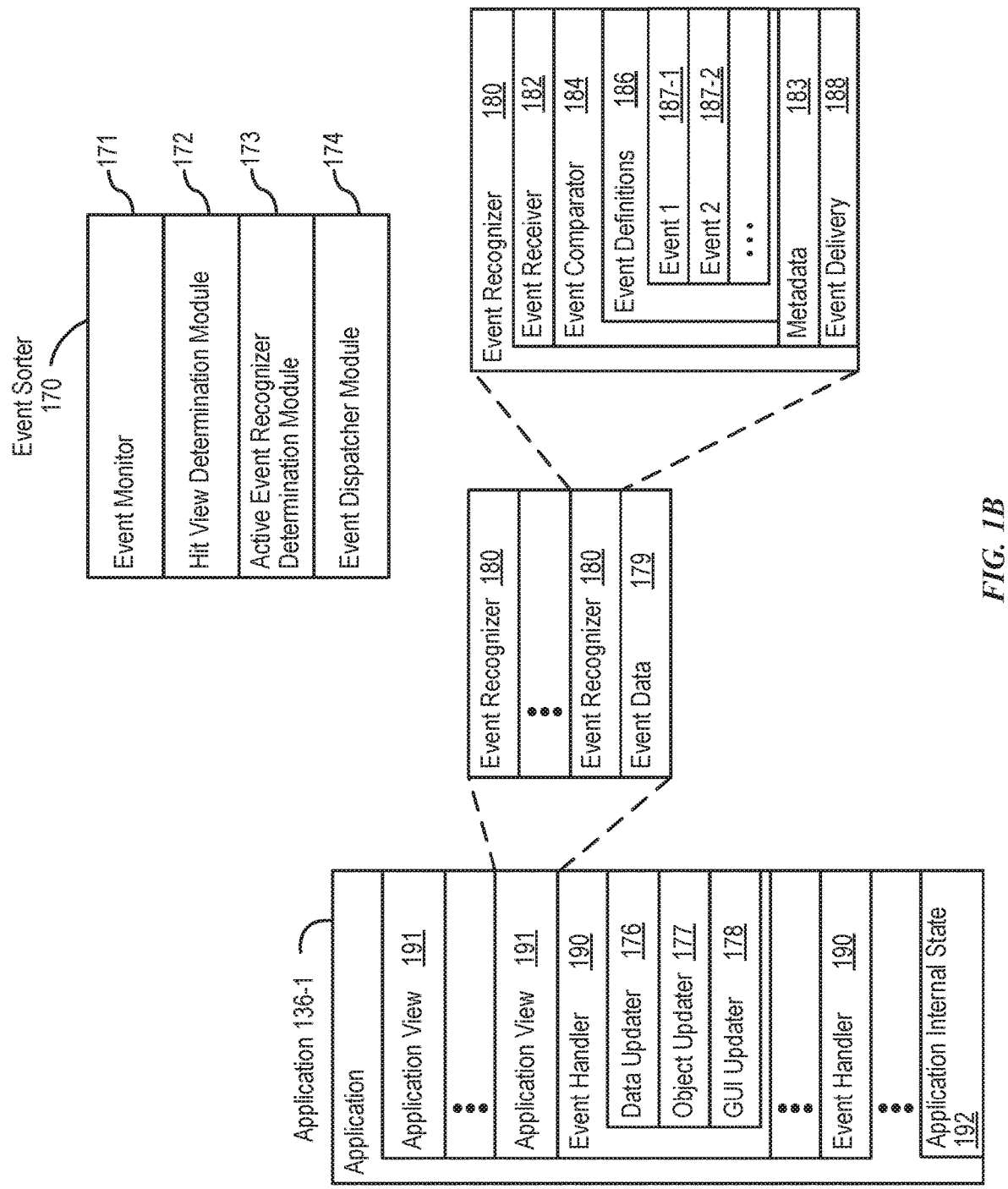
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application views) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118, Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192, Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
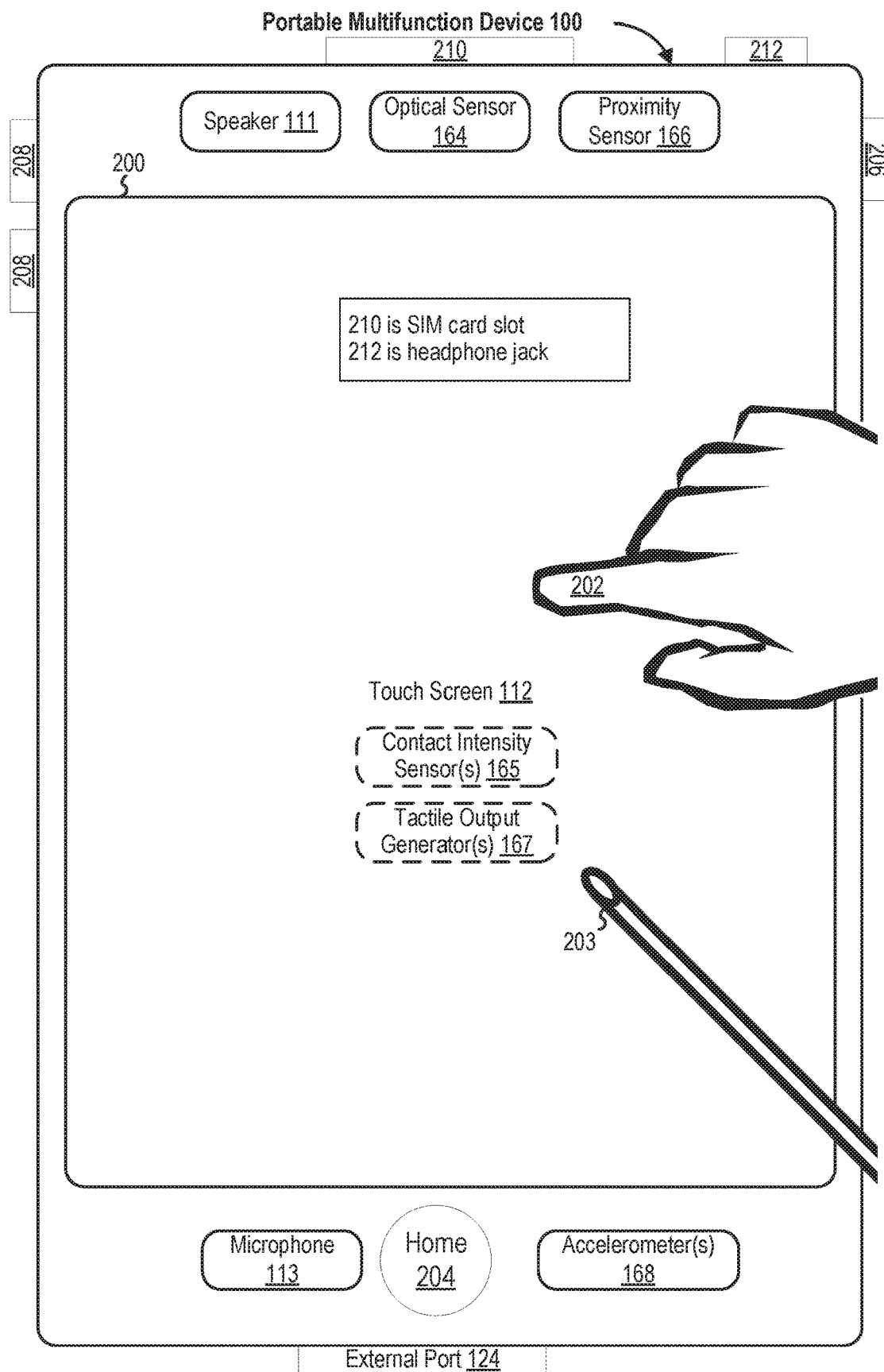
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
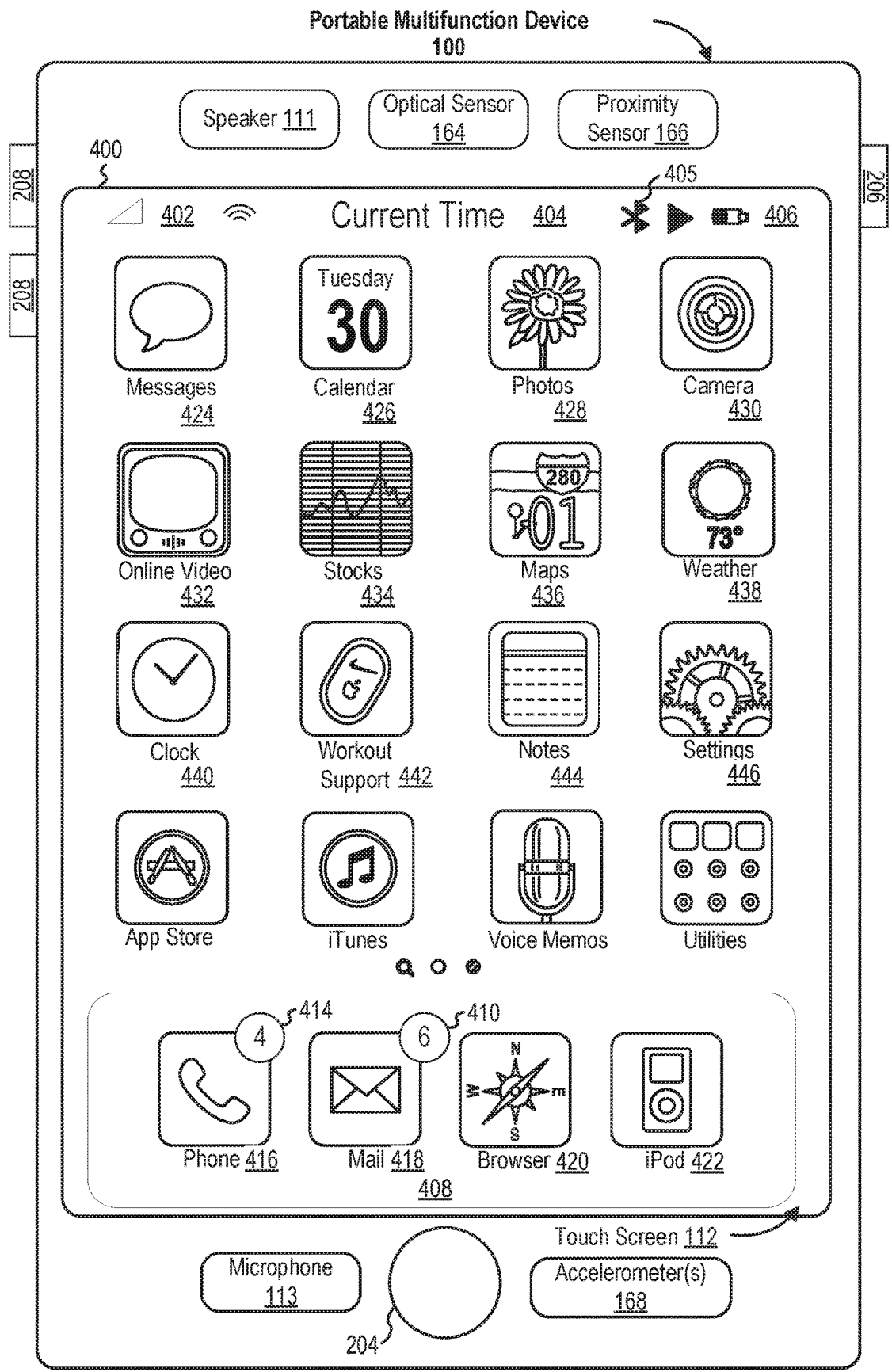
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc module 152, labeled "iPod;" and
- Icons for other applications, such as:
  - Icon 424 for LM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - icon 436 for map module 154, labeled "Maps;"
  - icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
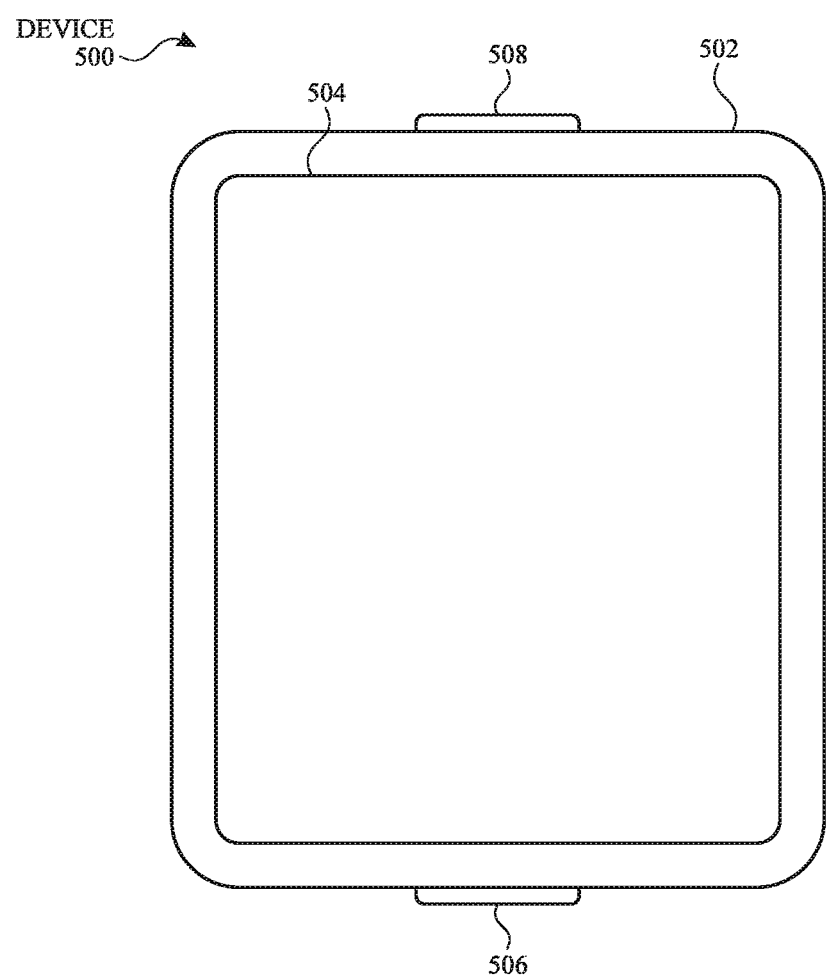
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms, Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
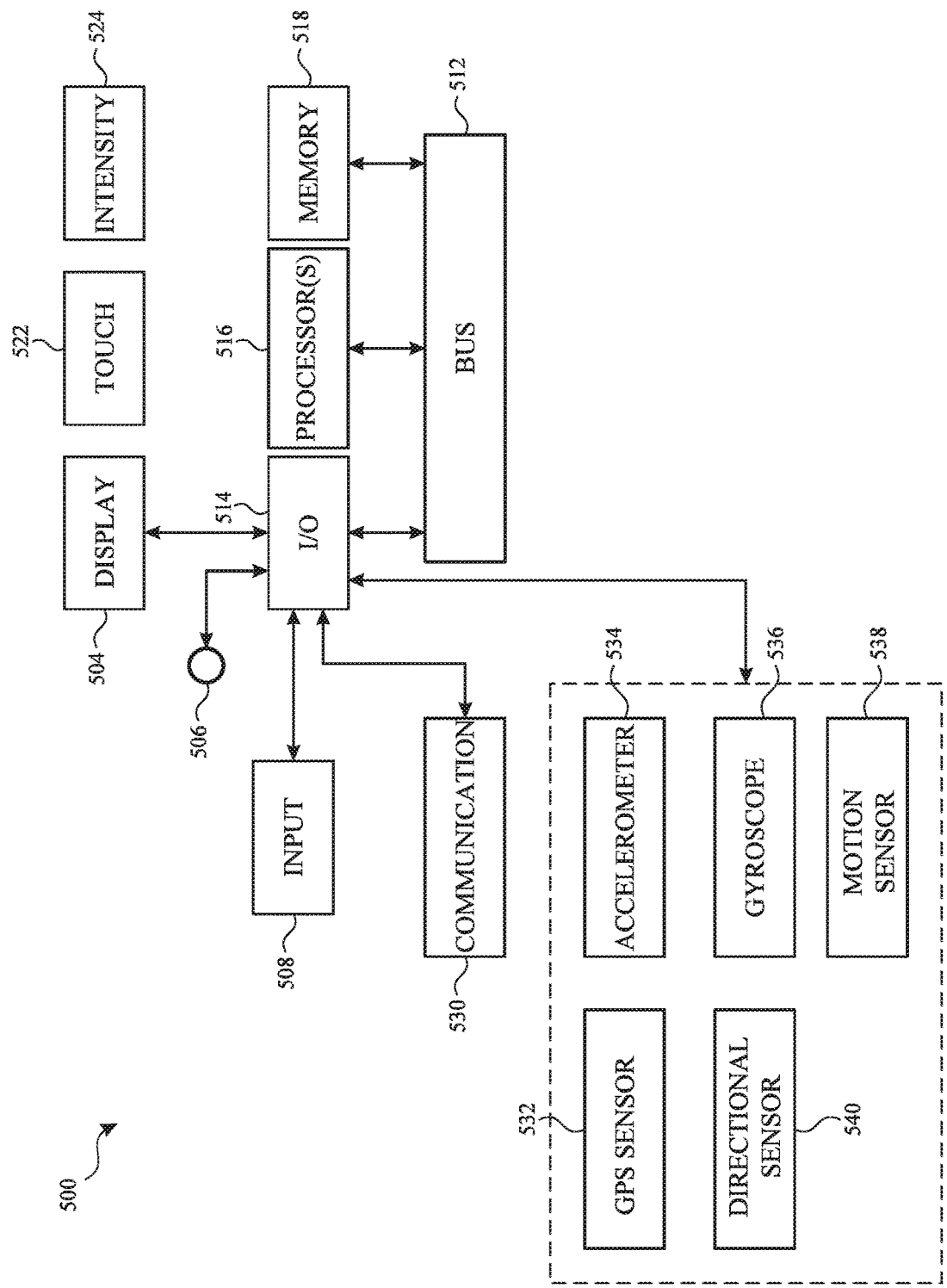
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for scrolling and selecting items, in accordance with some embodiments. The user interfaces in these figures are used to illustrate the processes described below, including the processes in FIG. 7.

FIGS. 6A-6S illustrate exemplary user inputs and corresponding changes to a user interface (e.g., user interface 602) that includes a listing of items, which can be displayed on an electronic device, such as electronic device 600 shown in FIG. 6A, and having display 601, which in some cases is a touch-sensitive display (e.g., 112). It should be appreciated that the scroll operations and selection operations described herein can be performed in slightly different manners without departing from the scope of the present disclosure. For example, a scrolling operation performed in direction that is described herein as being an upward direction can generally be performed in a downward direction, and vice versa. Similarly, vertical scrolling directions can be performed horizontally, Additionally, commands for changing a selection state of an item from a selected state to a deselected state can generally be performed to change the selection state from an unselected state to a selected state, and vice versa.

Figure 6B:
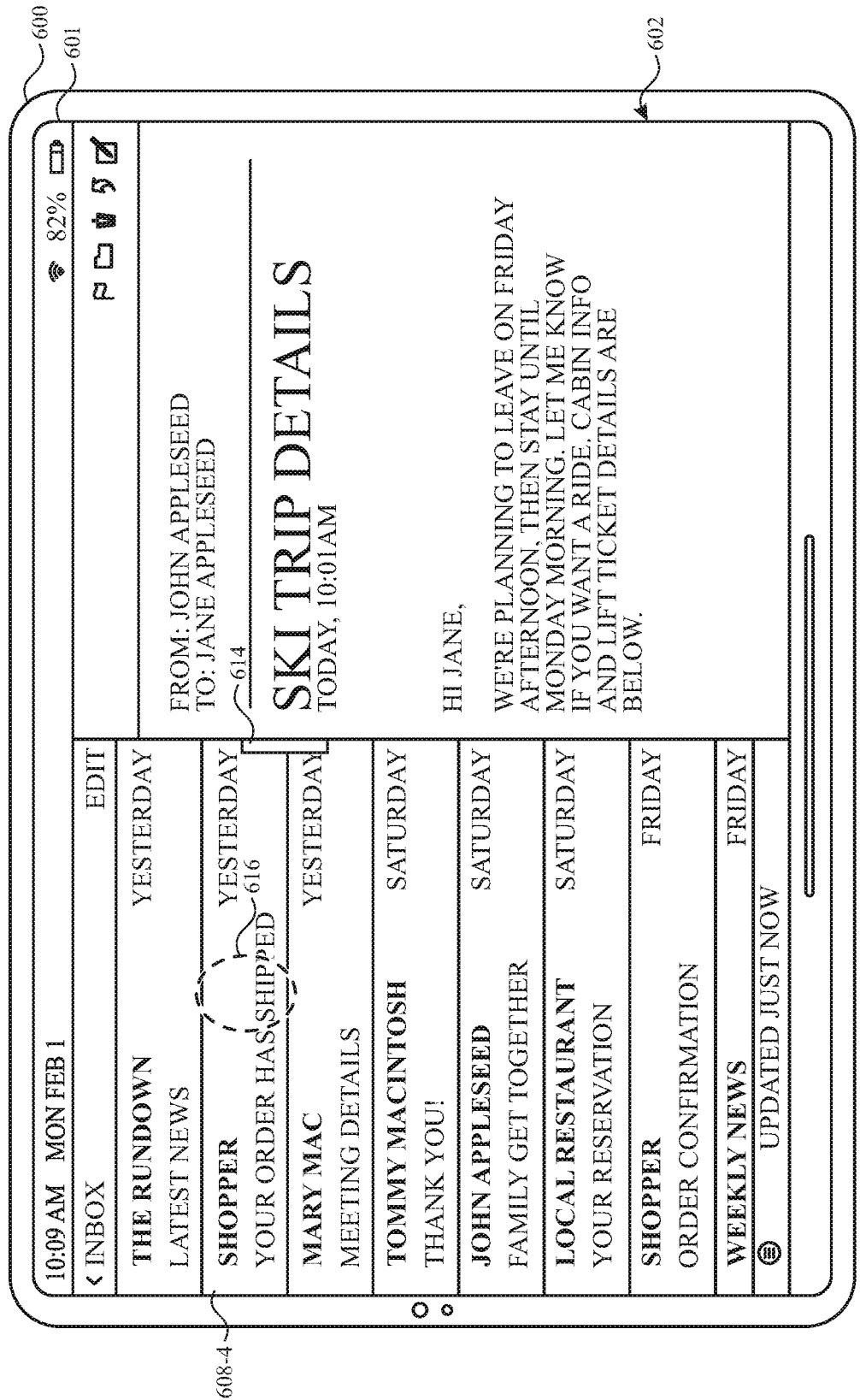
Figure 6C:
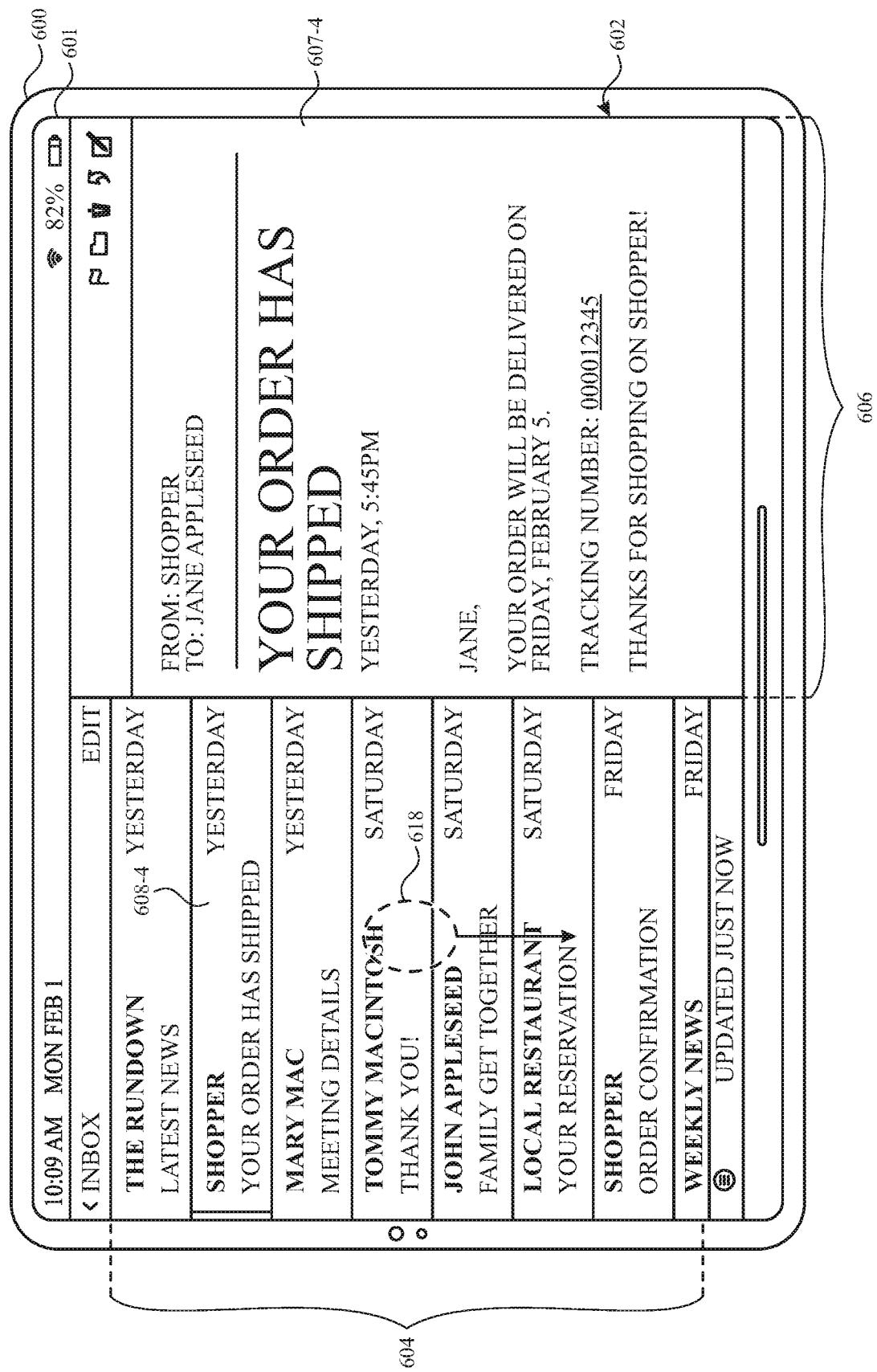

As described herein, user interface 602 can operate in an edit mode and a non-edit mode. FIGS. 6A-6C illustrate various scrolling and selecting operations that can be performed when user interface 602. Is in the non-edit mode.

As shown in FIG. 6A, electronic device 600 displays user interface 602 having list 604 and preview pane 606. Electronic device 600 can include one or more features of devices 100, 300, and 500. List 604 includes items 608, which, in FIG. 6A, include emails in an inbox folder of an email application. Preview pane 606 displays a preview of the contents of a selected item 608 in list 604. In FIG. 6A, item 608-1 is selected, as indicated by highlighting 610 at item 608-1, and a preview of the contents of item 608-1 is displayed as preview content 607-1 in preview pane 606. It should be appreciated that the disclosed embodiments are not limited to a listing of emails and, therefore, can be implemented in other user interfaces including listings of items such as, for example, listings of text messages, photographs, files, or other items.

User interface 602 includes header region 605 having edit affordance 603, which may be selected to transition to an edit mode in which items 608 in list 604 can be selected and, optionally, an action can be performed on the selected items (e.g., deletion, archiving, forwarding, etc.).

In FIG. 6A, electronic device 600 detects input 612 (e.g., an input from a user of the electronic device) on list 604. Input 612 is a contact followed by upward movement (e.g., a swipe) that is recognized by electronic device 600 as a scrolling command. In response to detecting input 612, electronic device 600 scrolls items 608 in list 604 based on movement (e.g., direction and magnitude) of input 612 on list 604, while maintaining selection of item 608-1. Specifically, list 604 scrolls down (e.g., items 608 move upward in list 604).

FIG. 6B shows the scrolled list 604 and scroll bar 614, which is displayed in response to input 612 and represents a scrolled position of list 604. In some embodiments, scroll bar 614 is displayed in response to a scroll command and persists for a period of time after the scroll command, and if no further scroll commands are received during the period of time, the scroll bar disappears. In FIG. 6B, item 608-1 remains selected, and preview pane 606 maintains display of preview content 607-1.

In FIG. 6B, electronic device 600 detects input 616 (e.g., a single-input tap gesture) on item 608-4. In response, electronic device 600 selects item 608-4 and updates preview pane 606 to display content 607-4 of item 608-4 without scrolling list 604, as shown in FIG. 6C.

Figure 6D:
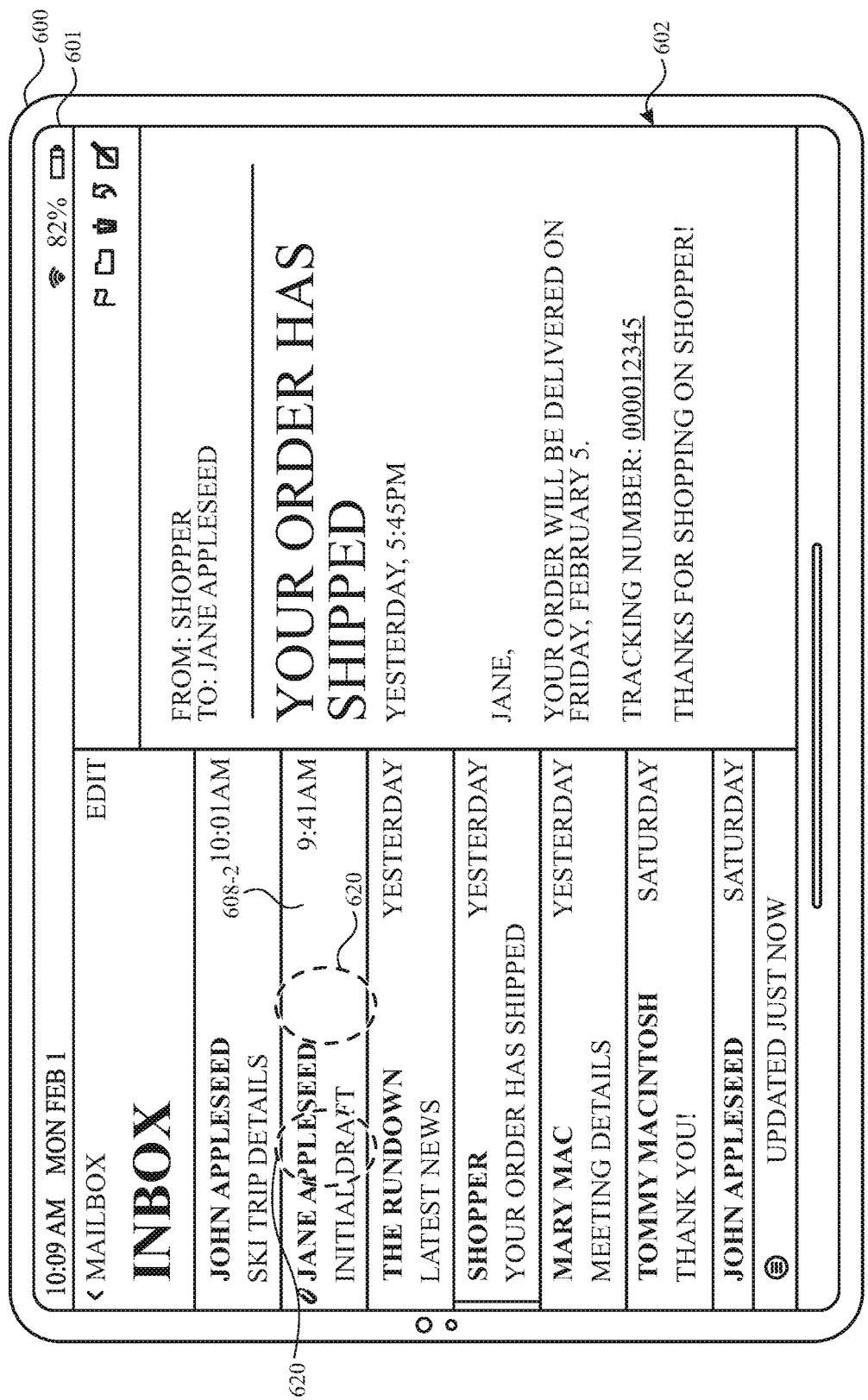

In FIG. 6C, electronic device 600 detects input 618, which corresponds to a scroll command. In response, electronic device 600 scrolls list 604 as shown in FIG. 6D. Specifically, input 618 includes downward movement (e.g., a downward swipe) and list 604 scrolls up (e.g., items 608 move downward in list 604).

Figure 6E:
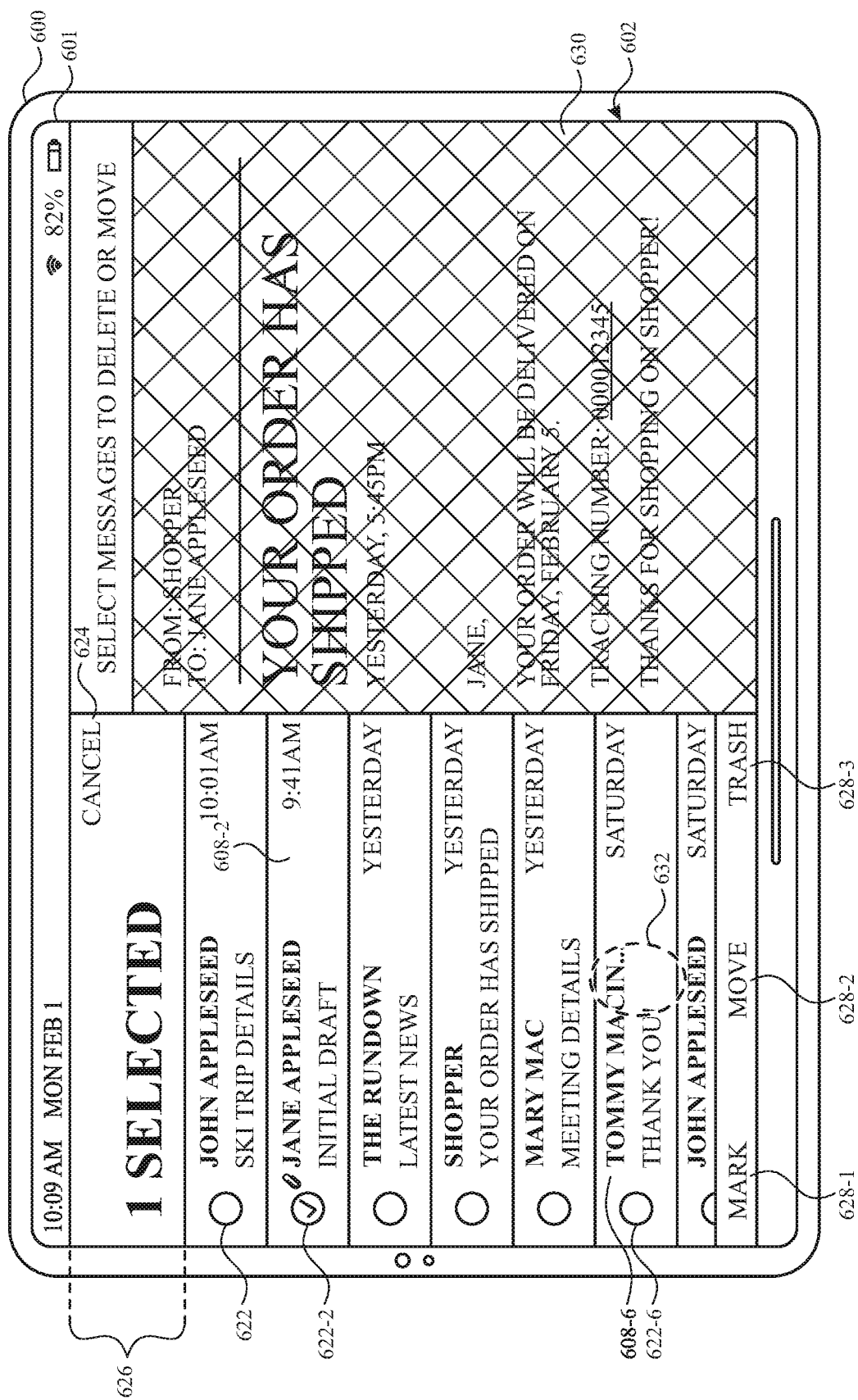
Figure 6F:
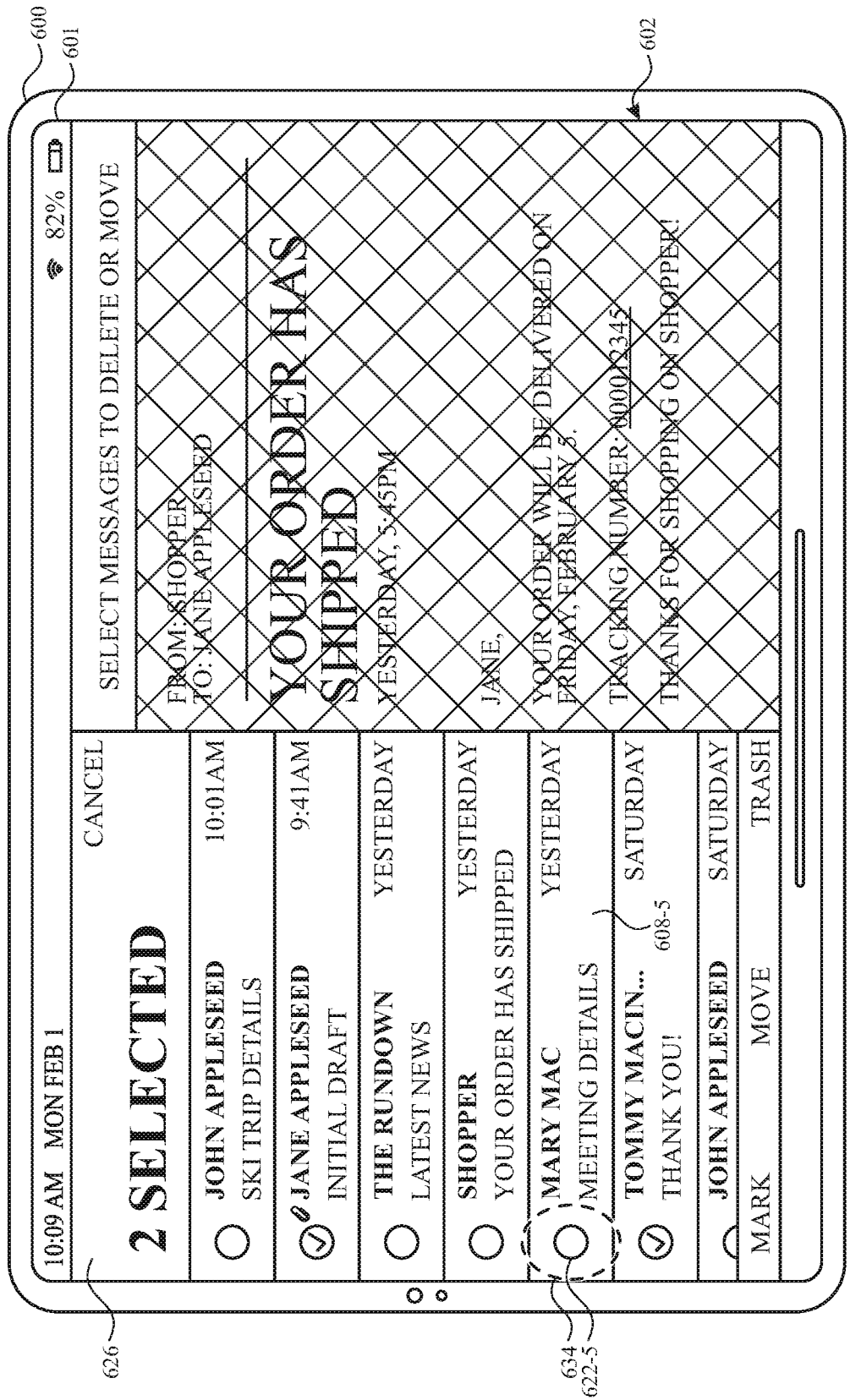
Figure 6G:
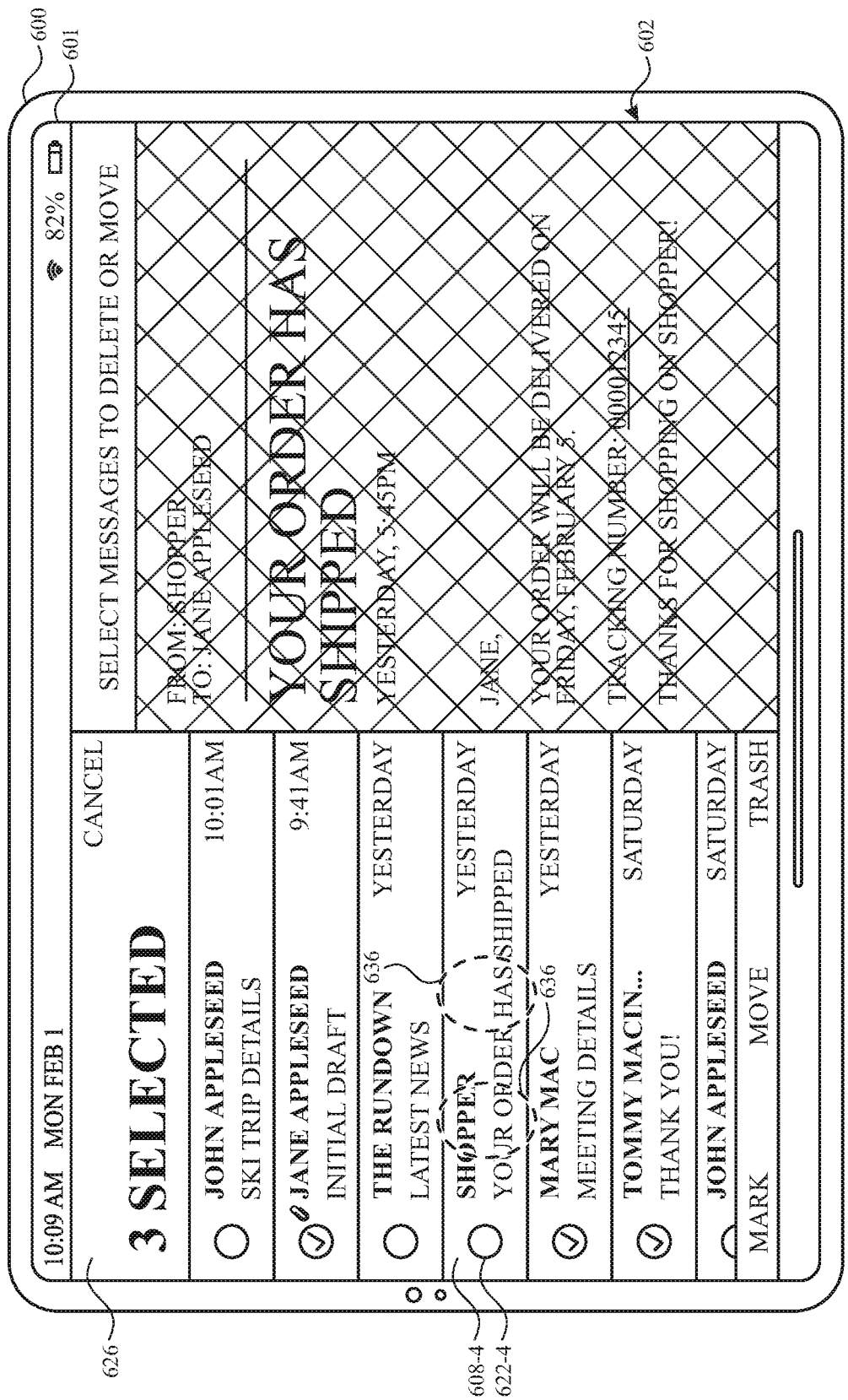
Figure 6H:
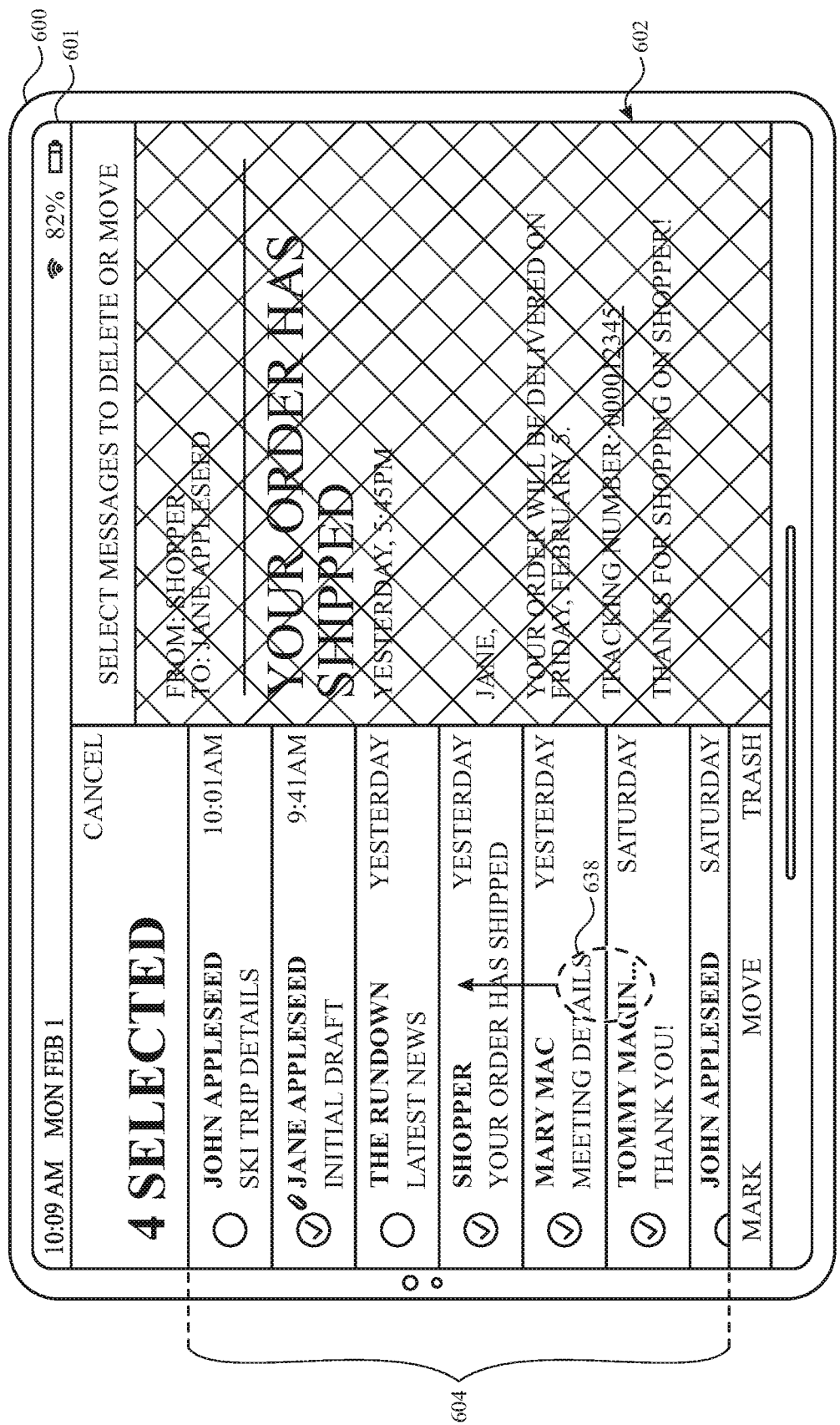
Figure 6I:
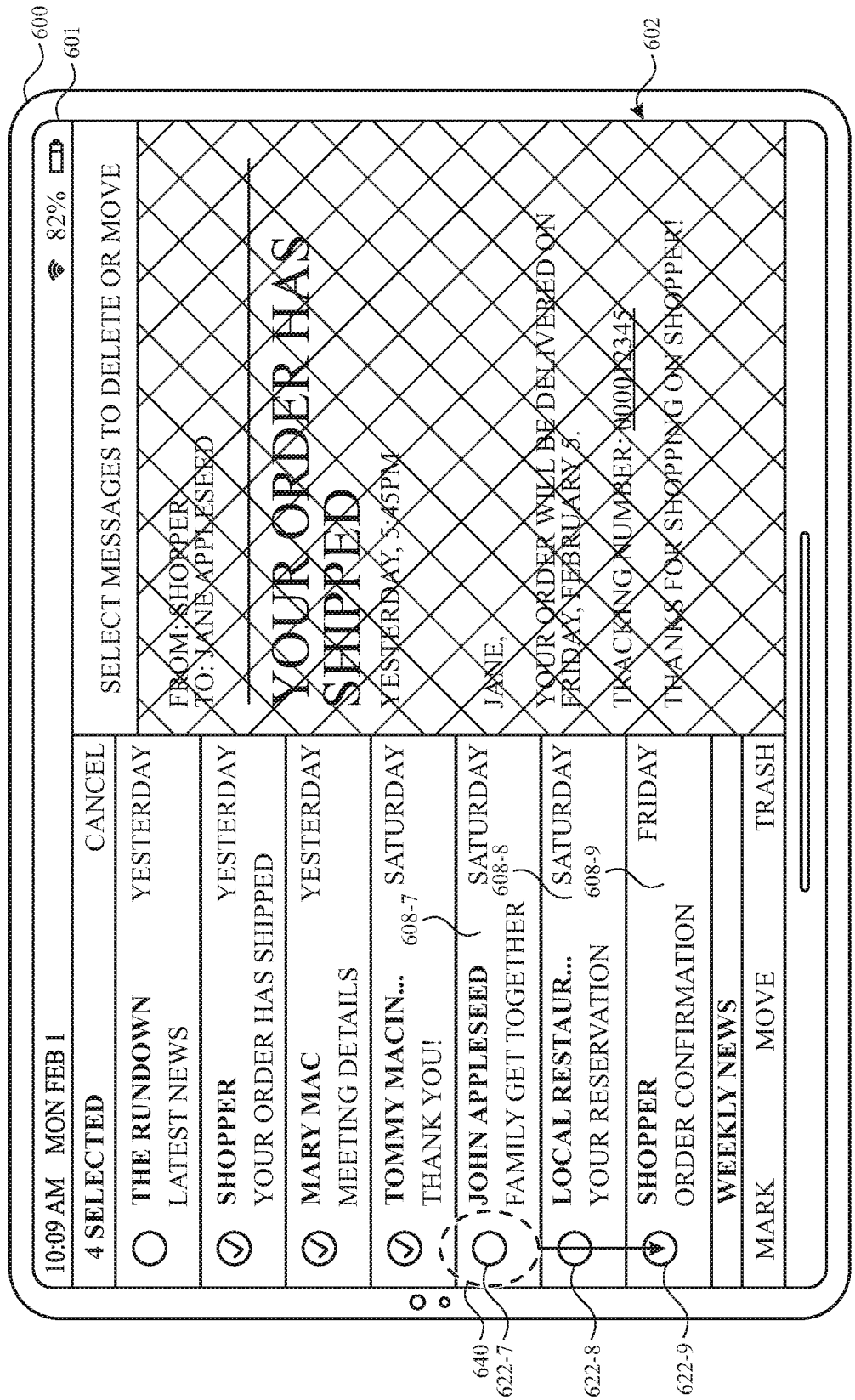

In FIG. 6I, list 604 has a scrolled position in response to input 618. Electronic device 600 detects input 620 (e.g., a two-input tap gesture) at item 608-2 and, in response, transitions to an edit mode as shown in FIG. 6E. In some embodiments, electronic device 600 incorporates a timing threshold for recognizing input 618 as a gesture to enter edit mode. In some embodiments, the threshold is a non-zero amount of time that is greater than a threshold amount of time for detecting a different touch gesture (e.g., a swipe). The greater threshold value distinguishes the command to enter edit mode from a command in which the user uses two fingers to scroll the user interface.

FIG. 6E shows user interface 602 after transitioning to an edit mode in response to input 620. Header region 605 is replaced with status region 626, which includes replacing edit affordance 603 with cancel affordance 624 for exiting the edit mode. When in edit mode, user interface 602 further includes action affordances 628-1, 628-2, and 628-3, each corresponding to an action to be performed on items selected in list 604. For example, action affordance 628-1 corresponds to an action for marking selected items, action affordance 628-2 corresponds to an action for moving selected items, and action affordance 628-3 corresponds to an action for deleting selected items.

Additionally, status region 626 is displayed providing an indication of the number of items selected in list 604, and preview pane 606 includes shading 630 to indicate that preview pane 606 is not displaying preview content corresponding to items 608 selected in edit mode. In some embodiments, shading 630 has a semi-transparent appearance over the preview content that was previously displayed at the time edit mode was entered.

When entering edit mode, electronic device 600 also updates items 608 to display selection indicator affordances 622. Displaying selection indicator affordances 622 provides an indication that user interface 602 is in the edit mode. In addition, individual selection indicator affordances each provide an indication of a selected state of the item upon which the selection indicator affordance is displayed. Thus, a respective item 608 is selected or deselected by changing the state of its respective selection indicator affordance 622. For example, when entering edit mode in response to input 620 on item 608-2, electronic device 600 displays selection indicator affordances 622, including selection indicator affordance 622-2 on item 608-2, wherein selection indicator affordance 622-2 has a selected state indicating that item 608-2 is selected upon entering edit mode (e.g., selection indicator affordance 622-2 includes a checkmark to denote the selected state).

Selection indicator affordances 622 generally alternate between selected and unselected (or deselected) states in response to detected inputs. For example, in some embodiments, if the selection indicator affordance has a selected state, an input changing the selection state of the selection indicator affordance will cause the electronic device to change the selection indicator affordance to an unselected, or deselected, state. Alternatively, if the selection indicator affordance has an unselected state, an input changing the selection state of the selection indicator affordance will cause the electronic device to change the selection indicator affordance to a selected state. In some embodiments, however, a selection indicator affordance does not change states in response to an input, when the received input corresponds to a command to transition the selection indicator affordance to the current/already-existing state of the selection indicator affordance. For example, if a selection indicator affordance is currently already selected, and a "select-all" command is received (e.g., see FIG. 8M-8N), the selection indicator affordance remains in the selected state, rather than switching to an unselected state. Similarly, if a selection indicator affordance currently has an unselected state, a command to transition the selection indicator affordance to an unselected state (e.g., see FIG. 8J) does not change the state of the selection indicator affordance to a selected state. Rather, the selection indicator affordance remains unselected.

Referring now to FIG. 6E, user interface 602 shows item 608-6 including selection indicator affordance 622-6 having an unselected state (e.g., selection indicator affordance 622-6 does not include a checkmark). Electronic device 600 detects input 632 on item 608-6. Specifically, input 632 is a single-input gesture (e.g., a tap gesture) located on a portion of item 608-6 other than selection indicator affordance 622-6. In response, electronic device 600 changes the selection state of item 608-6 to a selected state, updates selection indicator affordance 622-6 to denote the selection, and updates status region 626 to indicate two items (e.g., 608-2 and 608-6) are selected, as shown in FIG. 6F.

In FIG. 6F, electronic device 600 detects input 634 (e.g., a single-input tap gesture) on selection indicator affordance 622-5 of item 608-5 and, in response, changes the selection state of item 608-5 to a selected state, updates selection indicator affordance 622-5 to a selected state, and updates status region 626 to indicate three items (e.g., 608-2, 608-5, and 608-6) are selected, as shown in FIG. 6G.

In FIG. 6G, electronic device 600 detects input 636 on selection indicator affordance 622-4 of item 608-4. Specifically, input 636 is a two-input gesture (e.g., a two-input tap gesture located on item 608-4. In response, electronic device 600 changes the selection state of item 608-4 to a selected state, updates selection indicator affordance 622-4 to a selected state, and updates status region 626 to indicate four items (e.g., 608-2, 608-4, 608-5, and 608-6) are selected, as shown in FIG. 6H.

FIGS. 6E-6H demonstrate that individual items 608 can be selected in edit mode in a variety of ways. For example, individual items can be selected via a single-input or two-input tap gesture on the respective item, or by selection of the respective item's selection indicator affordance. Additionally, when the user interface is not in edit mode, a two-input tap gesture on a respective item causes the user interface to enter the edit mode and to select the item upon which the two-input tap gesture was located.

It should be noted that the electronic device has different responses to detected inputs depending on whether the user interface is operating in the edit mode or non-edit mode. For example, items selected in edit mode are selected without an action automatically being performed on the selected item (other than visually indicating the item is selected). Conversely, items selected when the user interface is not in edit mode have an action automatically performed on the respective item. For example, a preview of the contents of the selected item is displayed in preview pane 606. As another example, multiple items can be simultaneously selected in edit mode, whereas only one item can be selected at a single time when the user interface is not in edit mode. As additional examples, certain gestures in non-edit mode cause electronic device 600 to scroll list 604, whereas such gestures can cause electronic device 600 to select items 608 while in edit mode. Details of such gestures is provided in greater detail below.

Referring now to FIG. 6H, electronic device 600 detects input 638 (e.g., a single-input swipe gesture) on list 604 at a location on the items other than a location of selection indicator affordances. In response, electronic device 600 scrolls list 604 without selecting additional items (previously selected items 608-2, 608-4, 608-5, and 608-6 remain selected), as shown in FIG. 6I. In some embodiments, status region 626 shrinks in response to the upward movement of input 638, as shown in FIG. 6I.

Figure 6J:
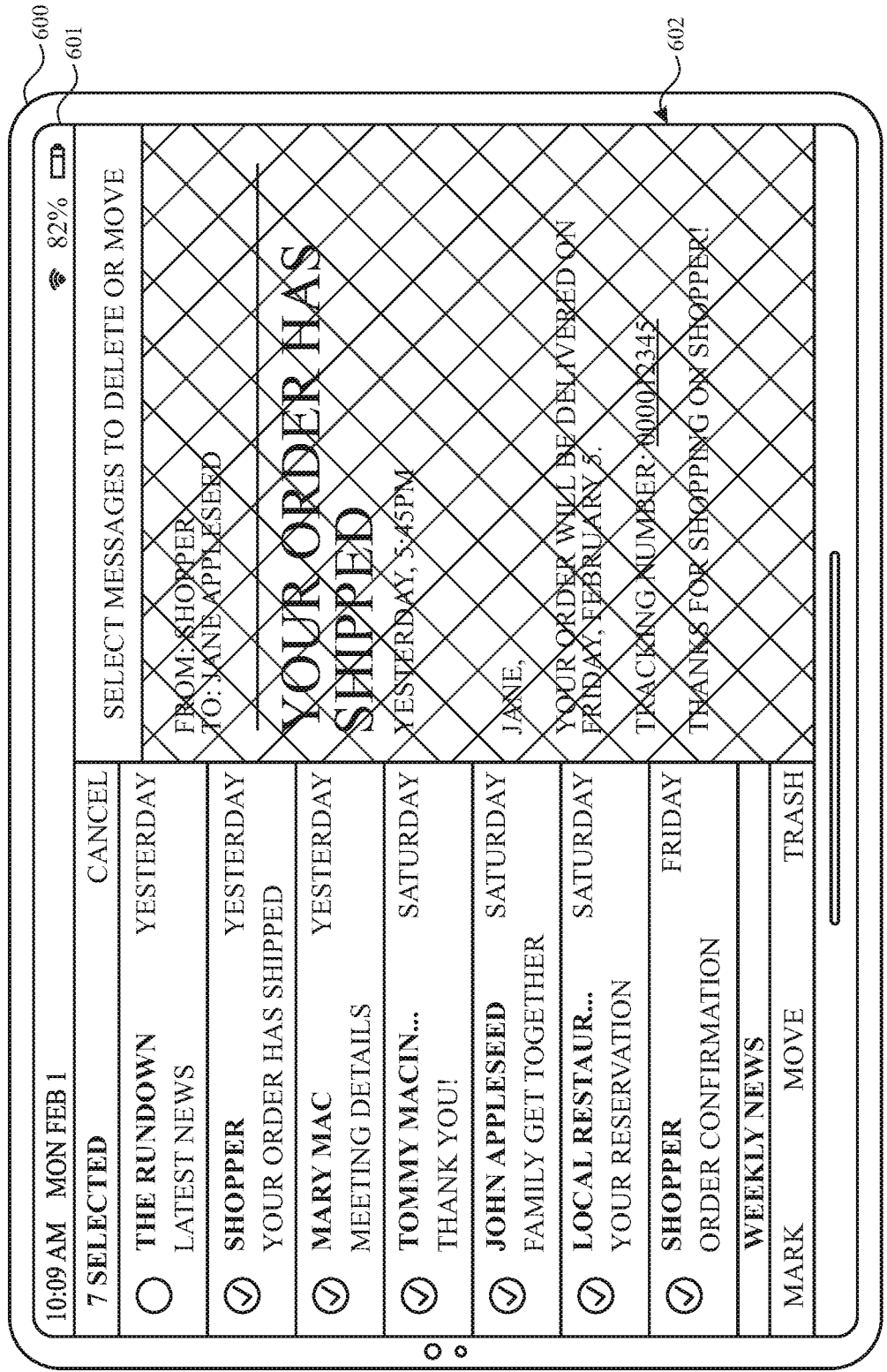

In FIG. 6I, electronic device 600 detects input 640 (e.g., a swipe gesture) on selection indicator affordances 622-7 through 622-9 of respective items 608-7 through 608-9. In response, electronic device 600 selects items 608-7 through 608-9, and status region 626 is updated to indicate seven items 608 are selected, as shown in FIG. 6J.

As discussed above, selection indicator affordances can alternate states in response to various gestures. Thus, a gesture on a selection indicator affordance can either select or deselect one or more selection indicator affordances, depending on the current state of the selection indicator affordance. For example. In FIG. 6I, input 640 causes selection indicator affordances 622-7 through 622-9 to transition from an unselected state to a selected state (e.g., thereby selecting corresponding items 608-7 through 608-9). However, if selection indicator affordances 622-7 through 622-9 were selected prior to detecting input 640, electronic device 600 would have changed selection indicator affordances 622-7 through 622-9 to an unselected state thereby deselecting corresponding items 608-7 through 608-9). This change in states would apply even if the gesture for changing the states is a different gesture. For example, FIGS. 6K-6L show an embodiment in which selected indicator affordances are deselected in response to input 642 on items 608-4 through 608-6.

Figure 6K:
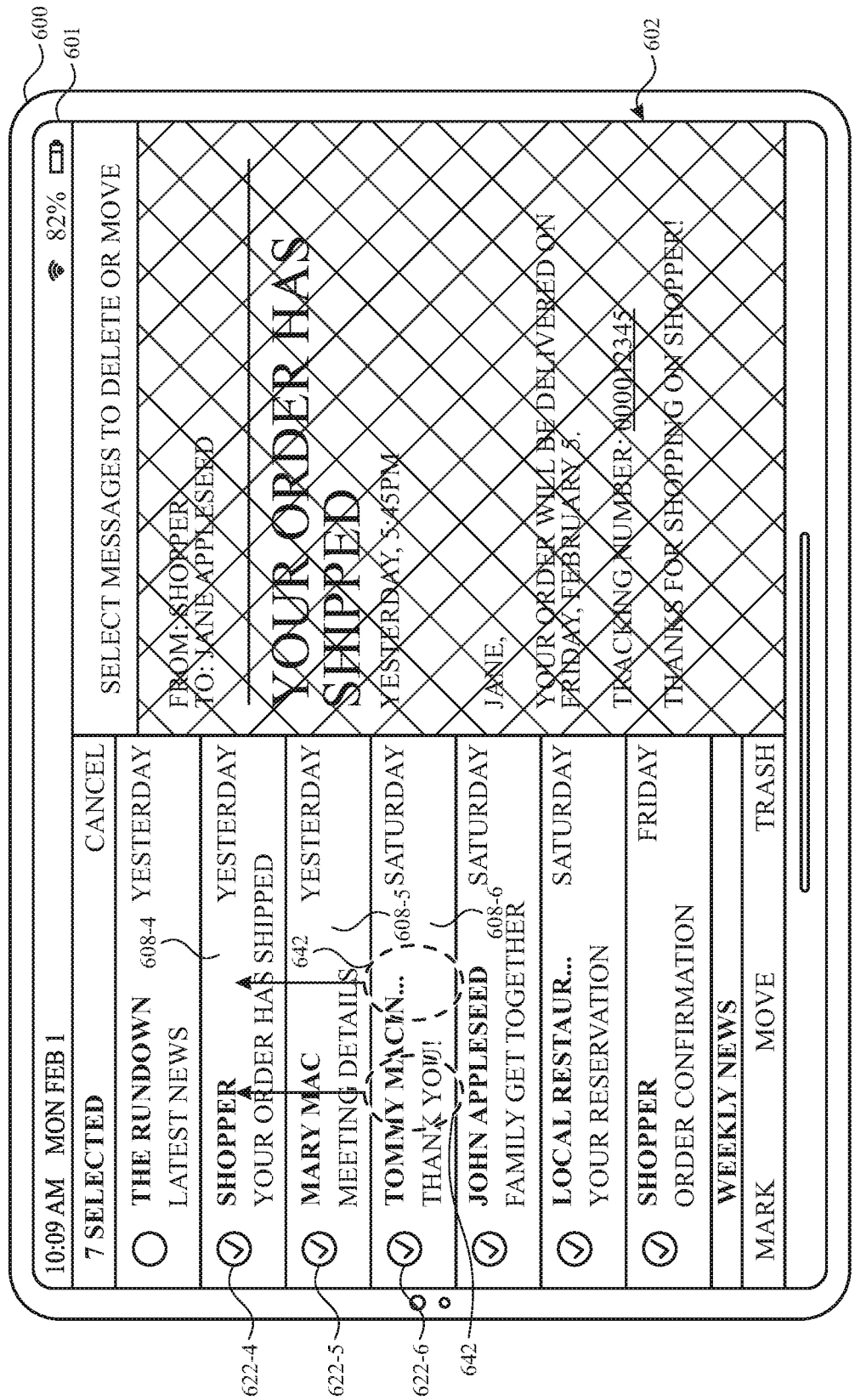

As shown in FIG. 6K, input 642 is a two-input gesture (e.g., a two-input swipe; a two-input drag) having movement across items 608-6 to 608-4 (e.g., the input is not required to be on respective selection indicator affordances 622-6 to 622-4). In response, electronic device 600 deselects items 608-6, 608-5, and 608-4, as shown in FIG. 6L. In some embodiments, electronic device 600 selects or deselects items 608 when a two-input gesture includes a portion of the gesture that is stationary for a threshold period of time (e.g., a two-input tap and hold) followed by a second portion of the gesture that includes movement of the two inputs across the respective items (e.g., a drag of the two inputs). In some embodiments, electronic device 600 scrolls list 604 in response to a two-input gesture when the two-input gesture does not include a first portion that is stationary for the threshold period of time (e.g., the two-input gesture is a two-finger swipe gesture).

Figure 6L:
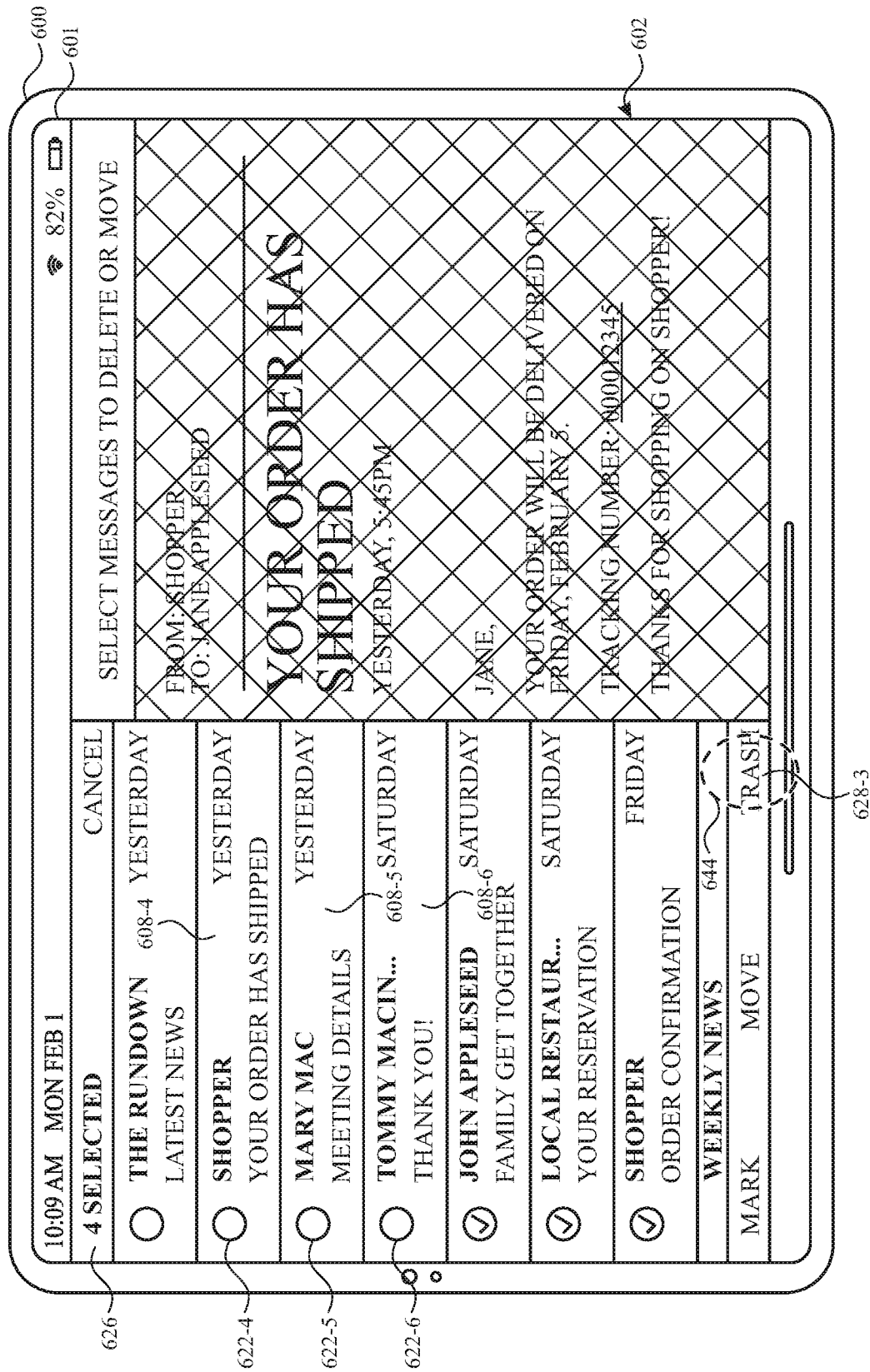

In FIG. 6L, status region 626 indicates that four items 608 are selected (e.g., items 608-2 and 608-7 through 608-9), and electronic device 600 detects input 644 (e.g., a single-input gesture; a tap) on action affordance 628-3. In response, electronic device 600 performs a delete action on the selected items, while taking no action on items that are not selected, and exits the edit mode.

Figure 6M:
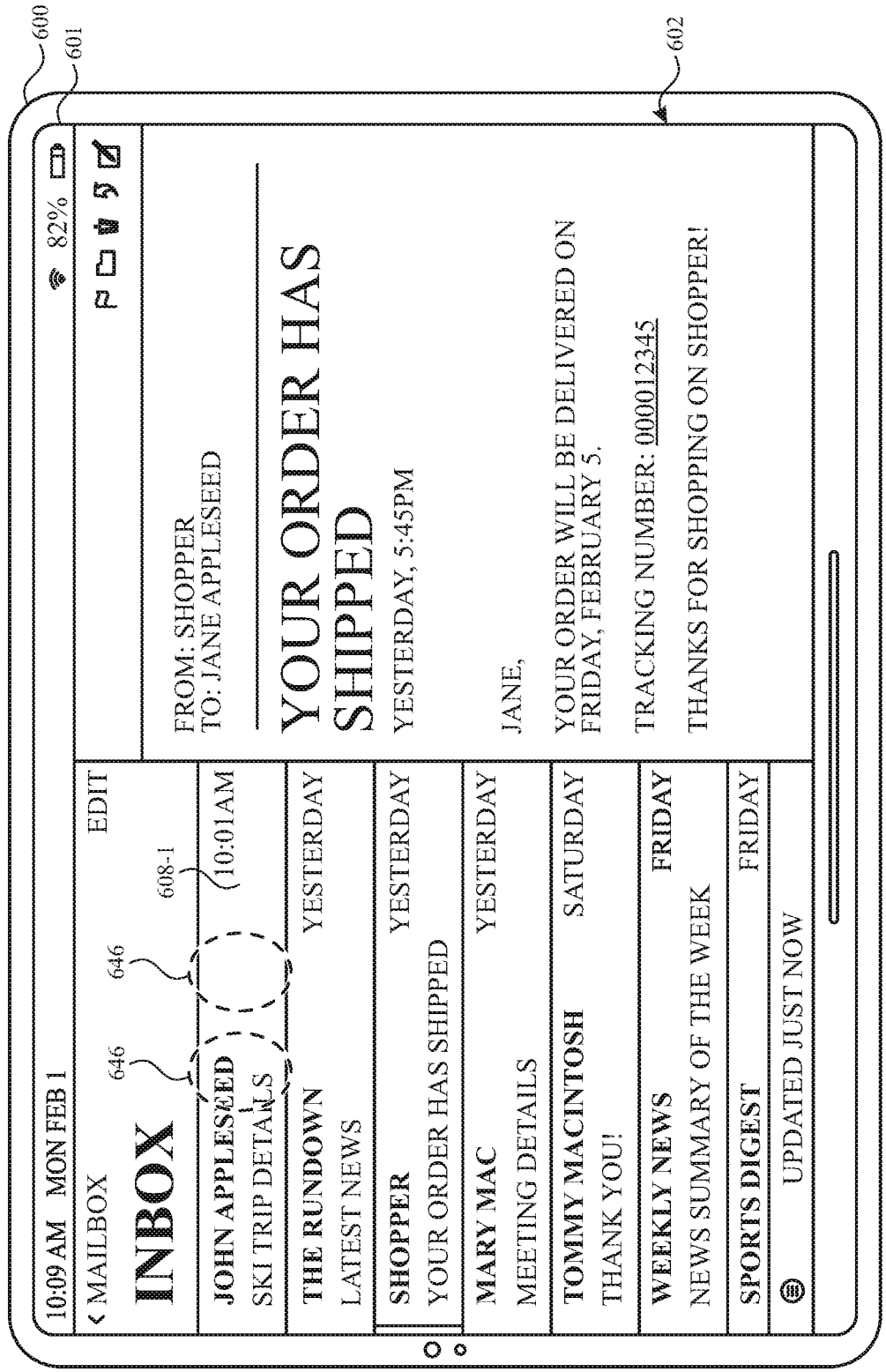

FIG. 6M shows electronic device 600 displaying user interface 602 in the non-edit mode and with items 608-2 and 608-7 through 608-9 deleted from list 604. Accordingly, items 608 no longer include selection indicator affordances 622, and shading 630 is no longer displayed on preview pane 606. Additionally, status region 626 is not displayed, action affordances 628-1 through 628-3 are no longer displayed, and cancel affordance 624 is replaced with edit affordance 603.

Figure 6N:
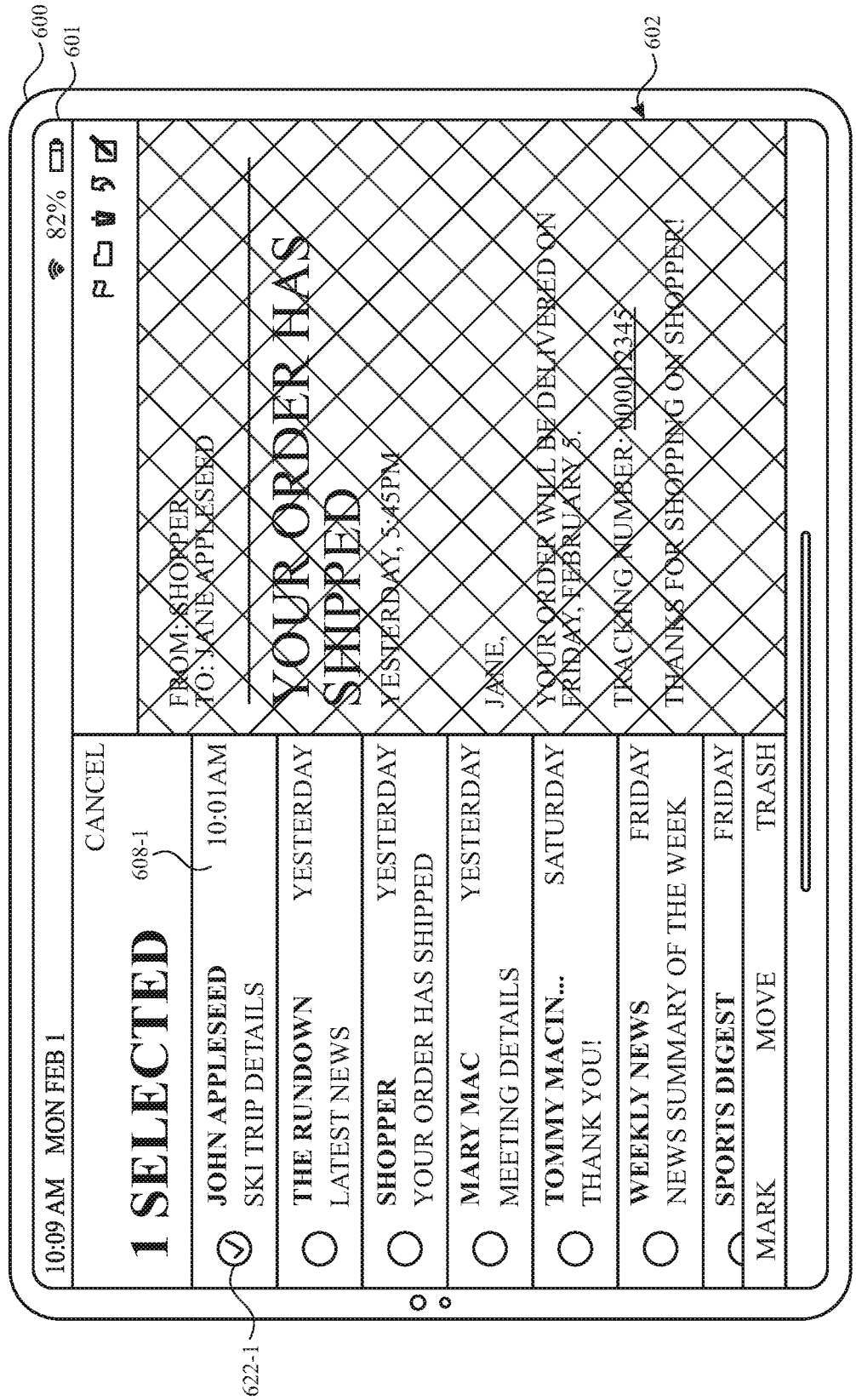

In FIG. 6M, electronic device 600 detects input 646 (e.g., a two-input tap gesture) on item 608-1 and, in response, re-enters edit mode and selects item 608-1 (showing selection indicator affordance 622-1 having a selected state) as shown in FIG. 6N.

Figure 6O:
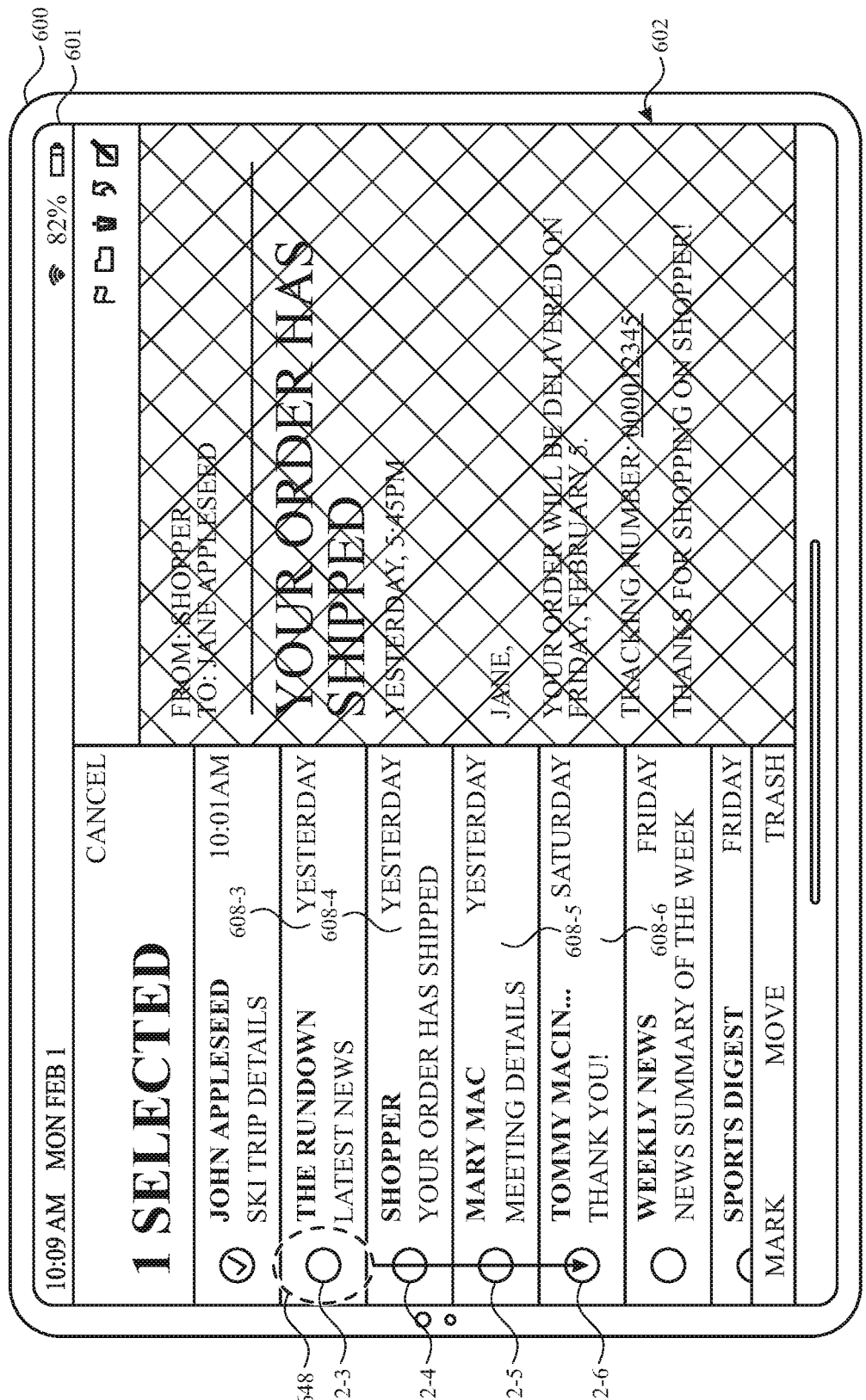

In FIG. 6O, electronic device 600 detects input 648 (e.g., a one-input swipe gesture) on consecutive selection indicator affordances 622-3 through 622-6 of respective items 608-3 through 608-6. Selection indicator affordances 622-3 through 622-6 are then shown selected in FIG. 6P, and status region 626 is updated to indicate five items are selected.

Figure 6P:
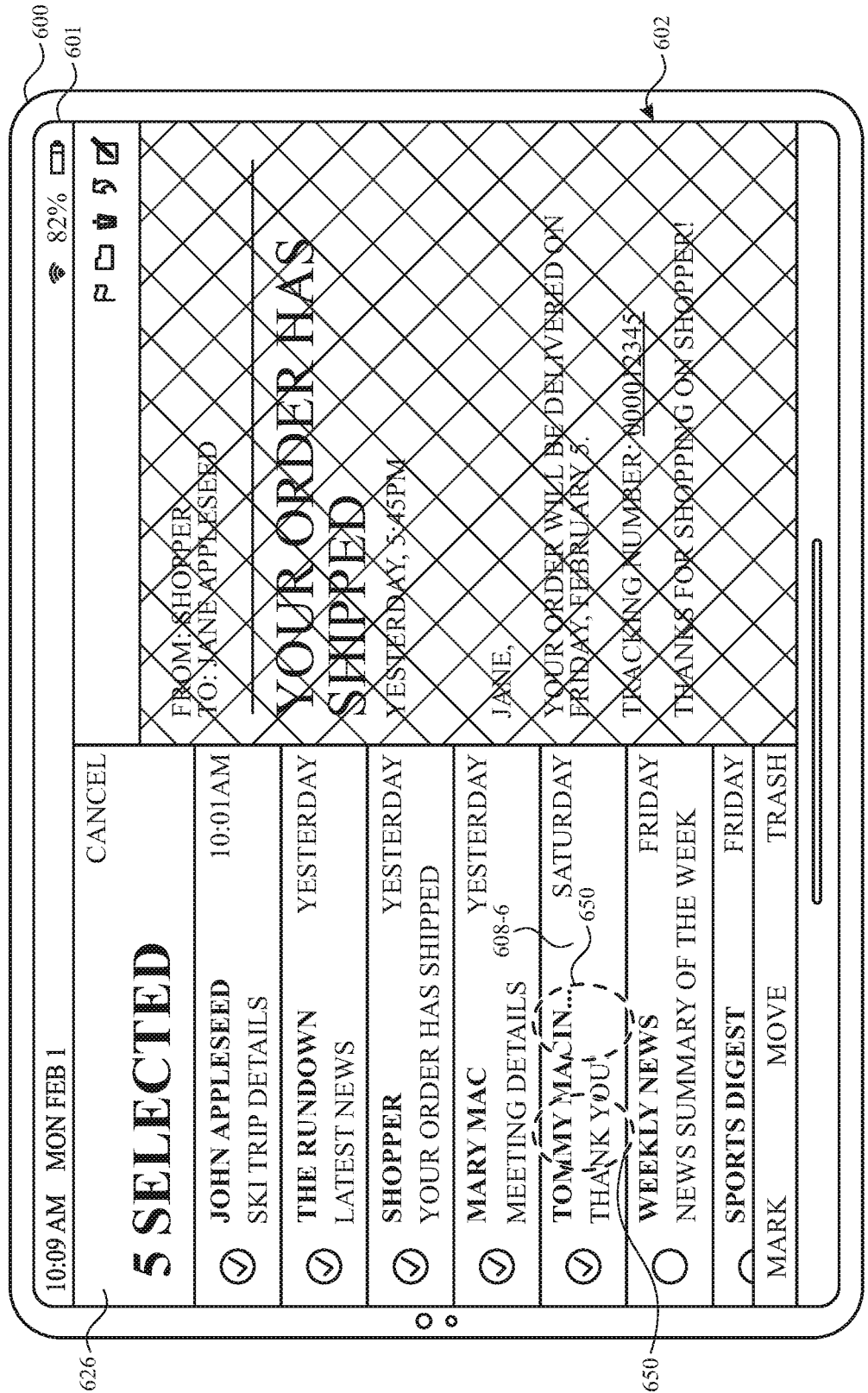
Figure 6Q:
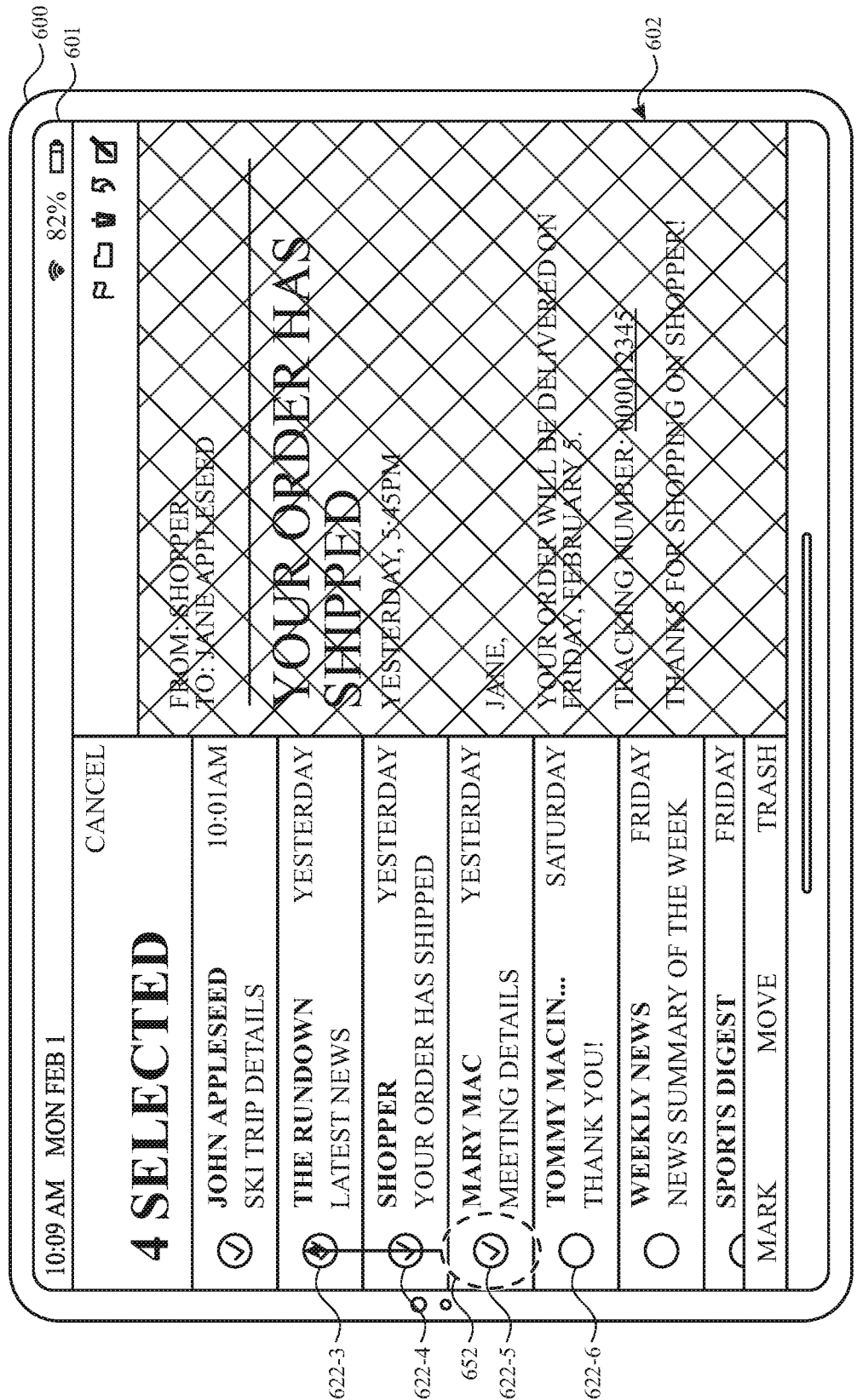

In FIG. 6P, electronic device 600 detects input 650 (e.g., a two-input tap gesture) on item 608-6 and deselects item 608-6 (e.g., selection indicator affordance 622-6 is deselected), as shown in FIG. 6Q. Status region 626 is updated in FIG. 6Q to indicate four items are selected.

Figure 6R:
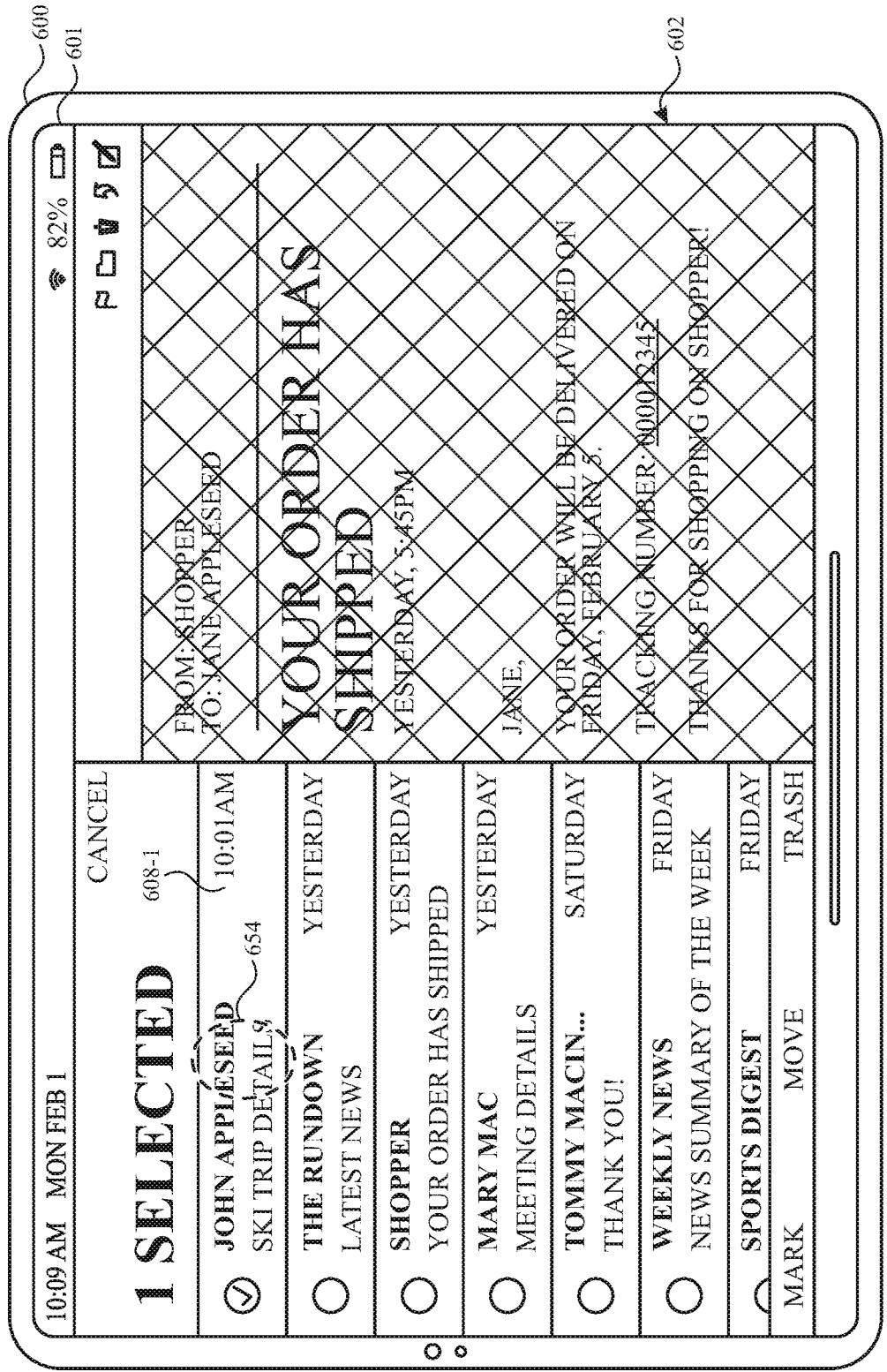

In FIG. 6Q, electronic device 600 detects input 652 (e.g., a one-input swipe gesture) on selection indicator affordances 622-5 through 622-3, which are then deselected as shown in FIG. 6R. Status region 626 is updated in FIG. 6R to indicate one item is selected.

In some embodiments, electronic device 600 exits edit mode in response to deselecting the item that was originally selected upon entry into edit mode (e.g., the item upon which the two-input tap gesture (e.g., input 646 in FIG. 6M) was detected in the non-edit mode so as to enter edit mode). Thus, as shown in FIGS. 6R and 6S, electronic device 600 detects input 654 (e.g., a single-input tap gesture) on item 608-1. In response to detecting input 654, electronic device deselects item 608-1 and exits edit mode, as shown in FIG. 6S. The input for deselecting the item selected upon entry into edit mode (e.g., 608-1) can be an input other than a single-input gesture, so long as it is an input to deselect the respective item. For example, the input (e.g., input 654) could alternatively be a two-input tap gesture or a deselection of selection indicator affordance 622-1. In some embodiments, electronic device 600 exits edit mode upon deselection of the item selected upon entry into edit mode (e.g., 608-1), even if other items in the list are selected at the time the respective item (e.g., 608-1) is deselected.

FIG. 7 is a flow diagram illustrating a method for selecting and scrolling items using an electronic device in accordance with some embodiments. Method 700 is performed at a device (e.g., 100, 300, 500, 600) with a display and a touch-sensitive surface (e.g., 112). Some operations in method 700 are, optionally, combined, the orders of some operations are, optionally, changed, and some operations are, optionally, omitted.

As described below, method 700 provides an intuitive way for selectively entering an edit mode and editing items in the edit mode. The method reduces the cognitive burden on a user for editing items, thereby creating a more efficient human-machine interface. For battery-operated computing devices, enabling a user to enter an edit mode and edit items faster and more efficiently conserves power and increases the time between battery charges.

An electronic device (e.g., 600) with a display (e.g., 601) and a touch-sensitive surface (e.g., 601) (e.g., 112) displays (702), via the display, a user interface (602) including a plurality of items (608) (e.g., graphical objects such as, for example, messages (e.g., emails, text messages), pictures, files, etc.). In some embodiments, the plurality of items are presented in a scrollable user interface, such as, for example, a list (604).

While the user interface is in a first mode of operation (e.g., a normal or non-edit mode in which the items are not selectable and particular edit functions (e.g., 628-1, 628-2, 628-3) (e.g., copy, delete, forward, archive, move, duplicate, etc.) are not enabled), the electronic device detects (704) a first input (e.g., 616) (e.g., a one-input tap gesture) (e.g., 620) (e.g., a two-input tap gesture, an input that comprises two simultaneous tap gestures) including a respective number of contacts (e.g., input 616 includes one contact on the touch-sensitive surface) (e.g., input 620 includes two contacts on the touch-sensitive surface) on the user interface (e.g., 602) at a location corresponding to a first item (e.g., 608-4) (e.g., 608-2) of the plurality of items (e.g., 608) (e.g., the first input is detected at a location on the display and/or touch-sensitive surface corresponding to a location of one of the items).

In response (706) to detecting the first user input: in accordance with a determination that the first input (e.g., 616/620) is a stationary input (e.g., an input that does not move across the display and/or touch-sensitive surface) with a first number of contacts (e.g., 616) (e.g., a single finger tap input), the electronic device performs (708) an action associated with the first item (e.g., 608-4) (e.g., opening the item, viewing contents of the item, or performing an edit function on the item) (e.g., in FIG. 6C item 608-4 is selected and preview pane 604-4 displays a preview of the contents of item 608-4).

In response (706) to detecting the first user input: in accordance with a determination that the first input (e.g., 620) is a stationary input with a second number of contacts (e.g., 620 is a two-input gesture) that is different from the first number of contacts (e.g., a two finger tap gesture), the electronic device switches (710) the user interface (e.g., 602) from the first mode of operation to a second mode of operation (e.g., an edit mode in which the items are selectable and particular edit functions (e.g., 628-1, 628-2, 628-3 are enabled for performing functions on selected items) without performing the action associated with the first item (e.g., 608-2) (and optionally selecting the first item in edit mode for a future action). For example, in FIG. 6E, user interface 602 transitions to edit mode, but preview pane 606 still displays contents of item 608-4, indicating that no action (e.g., previewing contents) was performed on item 608-2. In some embodiments, items (e.g., 608) are selectable (e.g., simultaneous or sequential selection of multiple items) when the second mode is enabled. In some embodiments, items are considered selectable when they are capable of being visually modified individually without automatically performing an action on the visually modified item such as opening the item, viewing contents of the item, or performing an edit function on the item. For example, an item is selected when the item is highlighted, or some other visual indicator is displayed for the item (e.g., selection indicator affordances 622 are selected), but an action is not automatically performed on the item. In some embodiments, selected item(s) (e.g., 608-2 in FIG. 6E) remain selected (e.g., visually modified) until an action is initiated (e.g., by a subsequent user input) for the item(s) such as, deselected (unselecting) the item(s) (e.g., see FIG. 6K), exiting the edit mode, or performing an edit function on the selected item(s) (e.g., see FIGS. 6L and 6M). In some embodiments, when items are unselected (without an action being performed on the item), the item returns to the visual state of the item prior to being visually modified. In some embodiments, items are indicated to be selectable by displaying a selection indicator affordance (e.g., 622) that can be toggled between a selected and deselected (unselected) state to indicate a selected and deselected state of the item, Switching the user interface from the first mode of operation to the second mode of operation without performing the action associated with the first item, when the first input is a stationary input with a second number of contacts different from the first number of contacts, allows the user to quickly and easily switch from the first mode to the second mode without having to select a series of user interface objects, thereby reducing the number of inputs needed to switch modes. Additionally, this provides the user with additional control options (e.g., for switching to the second mode) without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, switching the user interface (e.g., 602) from the first mode of operation to the second mode of operation without performing the action associated with the first item further includes selecting the first item (e.g., see selection of item 608-2 in FIG. 6E) of the plurality of items (e.g., 608). Automatically selecting the first item when switching from the first mode to the second mode allows the user to simultaneously select the first item while entering the second mode, without having to select a series of user interface objects to make the selection, thereby reducing the number of inputs needed to select the item in the second mode. Additionally, this provides the user with additional control options (e.g., for selecting an item while entering the second mode) without having to clutter the user interface with additional displayed controls. These benefits enhance the operability of the device and make the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, while the electronic device is in the second mode of operation, the electronic device detects a third input (e.g., 654) corresponding to a request to deselect the selected first item (e.g., see deselection of item 608-1 in FIG. 6R). In some embodiments, in response to detecting the third input, the electronic device deselects the selected first item (e.g., 608-1) (e.g., switching the first item from a selected state to a deselected (unselected) state) and switches the user interface (e.g., 602) from the second mode of operation to the first mode of operation (e.g., see FIGS. 6R and 6S). In some embodiments, the third input (e.g., 654) is a stationary input detected at a location corresponding to a selection user interface object (e.g., a selection indicator affordance associated (e.g., specifically associated) with the first item (e.g., selection indicator affordance 622-1)) indicating that the first item is selected. In some embodiments, the third input is a stationary input (e.g., a single-input gesture such as input 654, or a two-input gesture such as input 650) detected on the respective item (e.g., item 608-1 as shown in FIG. 6R). Deselecting the selected first item and switching the user interface from the second mode to the first mode in response to detecting, while in the second mode, an input corresponding to a request to deselect the first item allows the user to quickly and easily switch from the second mode back to the first mode without having to select a series of user interface objects, thereby reducing the number of inputs needed to return to the first mode. Additionally, this provides the user with additional control options (e.g., for switching from the second mode to the first mode) without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, switching the user interface from the first mode of operation to the second mode of operation further includes displaying, for each item of the plurality of items (e.g., 608), a selection user interface object (e.g., 622) (e.g., a selection indicator affordance) indicating a selection state of the item (e.g., each item is updated to include a selection indicator affordance that indicates a selected state (selected/deselected) of the respective item). For example, in FIG. 6E, selection indicator affordances 622 are displayed when switching to the edit mode. This provides a visual indication to a user that the user interface (e.g., 602) has switched from the first mode of operation to the second mode of operation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device detects a fourth input (e.g., 640) (e.g., a single-input drag gesture, a drag gesture using one finger) including the first number of contacts (e.g., one contact) at a location corresponding to a selection user interface object (e.g., 622-7) (e.g., affordance) . In some embodiments, in response to detecting the fourth input (e.g., 640) and in accordance with a determination that the fourth input includes movement of the first number of contacts across a plurality of the selection user interface objects (e.g., selection indicator affordances 622-7 through 622-9) associated with a subset of the plurality of items (e.g., items 608-7 through 608-9), the electronic device selects (e.g., or deselects) the subset of the plurality of items. In some embodiments, selecting (or deselecting) the subset of the plurality of items includes modifying an appearance of the plurality of the selection user interface objects (e.g., changing the selection indicator affordances from an unselected state to a selected state or from an unselected state to a selected state) associated with the subset of the plurality of items without performing an action associated with the subset of the plurality of items (e.g., see FIG. 6J). Selecting the subset of items when the fourth input includes movement of the first number of contacts across the plurality of the selection user interface objects associated with the plurality of items allows the user to quickly and easily select multiple items in the second mode without having to select a series of user interface objects, thereby reducing the number of inputs needed to select items in the second mode. Additionally, this provides the user with additional control options (e.g., for selecting items in the second mode) without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after switching the user interface from the first mode of operation to the second mode of operation, the electronic device detects movement of the first input (e.g., 642) from the location corresponding to the first item (e.g., 608-6) to a location corresponding to a third item (e.g., 608-4) of the plurality of items (e.g., 608). In some embodiments, movement of the first input from the first item to the third item includes movement across one or more items (e.g., 608-5) positioned between the first item and the third item. In some embodiments, in response to detecting the movement of the first input from the location corresponding to the first item to the location corresponding to the third item of the plurality of items: in accordance with a determination that the first input satisfies a first set of criteria that includes a requirement that the second number of contacts are stationary for a predetermined amount of time (e.g., a non-zero threshold amount of time) prior to moving to the location corresponding to the third item in order for the first set of criteria to be satisfied, the electronic device selects (or deselects) the third item (e.g., 608-4) (e.g., without performing an action associated with the third item). In some embodiments, the first and third items are separated by a number of items of the plurality of items and the items between the first and third items are selected (or deselected) as the first input moves from the first item to the third item (e.g., as the first input moves over each item, the item is selected). For example, in FIG. 6K, input 642 is detected at item 608-6 and moves across item 608-5 to item 608-4. Items 608-4 through 608-6 are selected, so if input 642 meets the first set of criteria, times 608-4 through 608-6 change states (e.g., become deselected), as shown in FIG. 6K. Selecting the third item when the first input includes a second number of contacts that are stationary for a predetermined amount of time prior to moving to the third item allows a user to selectively scroll or select multiple items with a single gesture, by simply controlling whether the contacts are stationary for a threshold amount of time prior to moving, and without having to select a series of user interface objects, thereby reducing the number of inputs needed to selectively select or scroll items in the second mode. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, in response to detecting the movement of the first input (e.g., 642) from the location corresponding to the first item to the location corresponding to the third item of the plurality of items: in accordance with a determination that the first input does not satisfy the first set of criteria (e.g., the second number of contacts are not stationary for the predetermined amount of time), the electronic device scrolls the plurality of items (e.g., scrolling based on a direction and magnitude of the movement of the first input). Scrolling the plurality of items when the first input does not satisfy the first set of criteria allows a user to selectively scroll or select multiple items with a single gesture, by simply controlling whether the contacts are stationary for a threshold amount of time prior to moving, and without having to select a series of user interface objects, thereby reducing the number of inputs needed to selectively select or scroll items in the second mode. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While the electronic device (e.g., 600) is in the second mode of operation, the electronic device detects (712) a second input (e.g., 632 or 634) (e.g., a single-input tap gesture) (e.g., an input that comprises a single tap gesture) including the first number of contacts (e.g., one contact on the touch-sensitive surface) at a location on the display (e.g., 601) (e.g., on the display and/or touch-sensitive surface) corresponding to a second item (e.g., 608-6 or 608-5) of the plurality of items (e.g., 608). In some embodiments, the location on the display (e.g., 601) corresponding to the second item in the plurality of items is a location of a selection user interface object (e.g., selection indicator affordance 622-5 corresponding to item 608-5) that is associated with the second item.

In response to detecting the second input, the electronic device selects (714) the second item (e.g., 608-6 or 608-5) without performing an action associated with the second item (e.g., indicating selection of the respective item by visually modifying the item or a portion of the item (e.g., 622-5 is selected for item 608-5) without automatically performing an action on the item such as opening the item, viewing contents of the item, or performing an edit function on the item). For example, in FIGS. 6F and 6G, item 608-5 is selected in response to input 634 on selection indicator affordance 622-5. Selecting the second item, in response to the second input, without performing an action associated with the second item allows the user to quickly and easily select multiple items in the second mode without having to select a series of user interface objects, thereby reducing the number of inputs needed to select items in the second mode. Additionally, this provides the user with additional control options (e.g., for selecting items in the second mode) without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the user interface is in the second mode of operation, and while the first and second items are selected and a fourth item is not selected (e.g., in FIG. 6L, items 608-7 and 608-8 are selected, and item 608-6 is not selected), the electronic device detects a request to perform an action (e.g., opening the item, viewing contents of the item, or performing an edit function on the item (e.g., copy, drag/move, delete, forward, archive, duplicate, etc.)) on selected items of the plurality of items (e.g., input 644 on action affordance 628-3). In some embodiments, in response to detecting the request, the electronic device performs the action on the first and second items (e.g., performing the action simultaneously on the first and second items) of the plurality of items without performing the action on the fourth item. For example, as shown in FIGS. 6L and 6M, items 608-7 and 608-8 are deleted, and item 608-6 is not deleted.

In some embodiments, while the user interface is in the second mode of operation, the electronic device detects a fifth input (e.g., 636) (e.g., a two-input tap gesture) (e.g., an input that comprises two simultaneous tap gestures) including the second number of contacts (e.g., two contacts) at a location on the display (e.g., on the display and/or touch-sensitive surface) corresponding to a fifth item (e.g., 608-4) of the plurality of items. In some embodiments, in response to detecting the fifth input, the electronic device selects the fifth item without performing an action associated with the fifth item (e.g., in FIG. 6H, item 608-4 is selected).

In some embodiments, the electronic device (e.g., 600) detects (e.g., while the user interface is in the first or second mode of operation) a sixth input (e.g., 638 or 612) that includes movement of the first number of contacts (e.g., a drag gesture) (e.g., a one-finger drag gesture). In some embodiments, in response to detecting the sixth input: in accordance with a determination that the user interface (e.g., 602) is in the first mode of operation and the movement of the first number of contacts originates at a location on the plurality of items (e.g., in FIG. 6A, input 612 is detected on items 608) (e.g., a location anywhere on the plurality of items), the electronic device scrolls the plurality of items based on the movement (e.g., based on a direction and/or a magnitude of the movement) of the first number of contacts (e.g., see FIG. 6B). In some embodiments, in response to detecting the sixth input: in accordance with a determination that the user interface (e.g., 602) is in the second mode of operation and the movement of the first number of contacts originates at a location on the plurality of items other than a location that corresponds to a selection user interface object (e.g., selection affordance) (e.g., in FIG. 6H, input 638 is detected on items 608 at a location other than the selection indicator affordances 622), the electronic device scrolls the plurality of items (e.g., 608) based on the movement (e.g., based on a direction and/or a magnitude of the movement) of the first number of contacts (e.g., see FIG. 6I). In some embodiments, when the user interface is in the first mode of operation, the sixth input causes the plurality of items to be scrolled when the sixth input is detected (e.g., originates) anywhere on the plurality of items. In some embodiments, when the user interface is in the second mode of operation, the sixth input causes the plurality of items to scroll if the sixth input is detected (e.g., originates) at a location on the plurality of items other than a location of a selection affordance; otherwise, if the sixth input originates at a location of a selection affordance, the sixth input causes the selection/deselection of items that correspond to the selection affordances contacted by the sixth input (e.g., as shown in FIGS. 6I and 6J).

Note that details of the processes described above with respect to method 700 (e.g., FIG. 7) are also applicable in an analogous manner to the methods described below. For example, methods 900 and 1100 optionally include one or more of the characteristics of the various methods described above with reference to method 700. For example, the edit mode can be exited by deselecting the item that was selected when entering the edit mode. For brevity, these details are not repeated below.

FIGS. 8A-8R illustrate exemplary user interfaces for scrolling and selecting items, in accordance with some embodiments, including scrolling to select items. The user interfaces in these figures are used to illustrate the processes described below, including the processes in FIG. 9.

As shown in FIG. 8A, list 604 includes items 608, and preview pane 606 displays preview content 607-1 of selected item 608-1. Electronic device 600 detects input 802 (e.g., a two-input tap gesture) on item 608-4. In response, electronic device 600 transitions user interface 602 to edit mode, as shown in FIG. 8B, including displaying selection indicator affordance 622-4 selected to indicate selection of item 608-4 in edit mode.

Figure 8C:
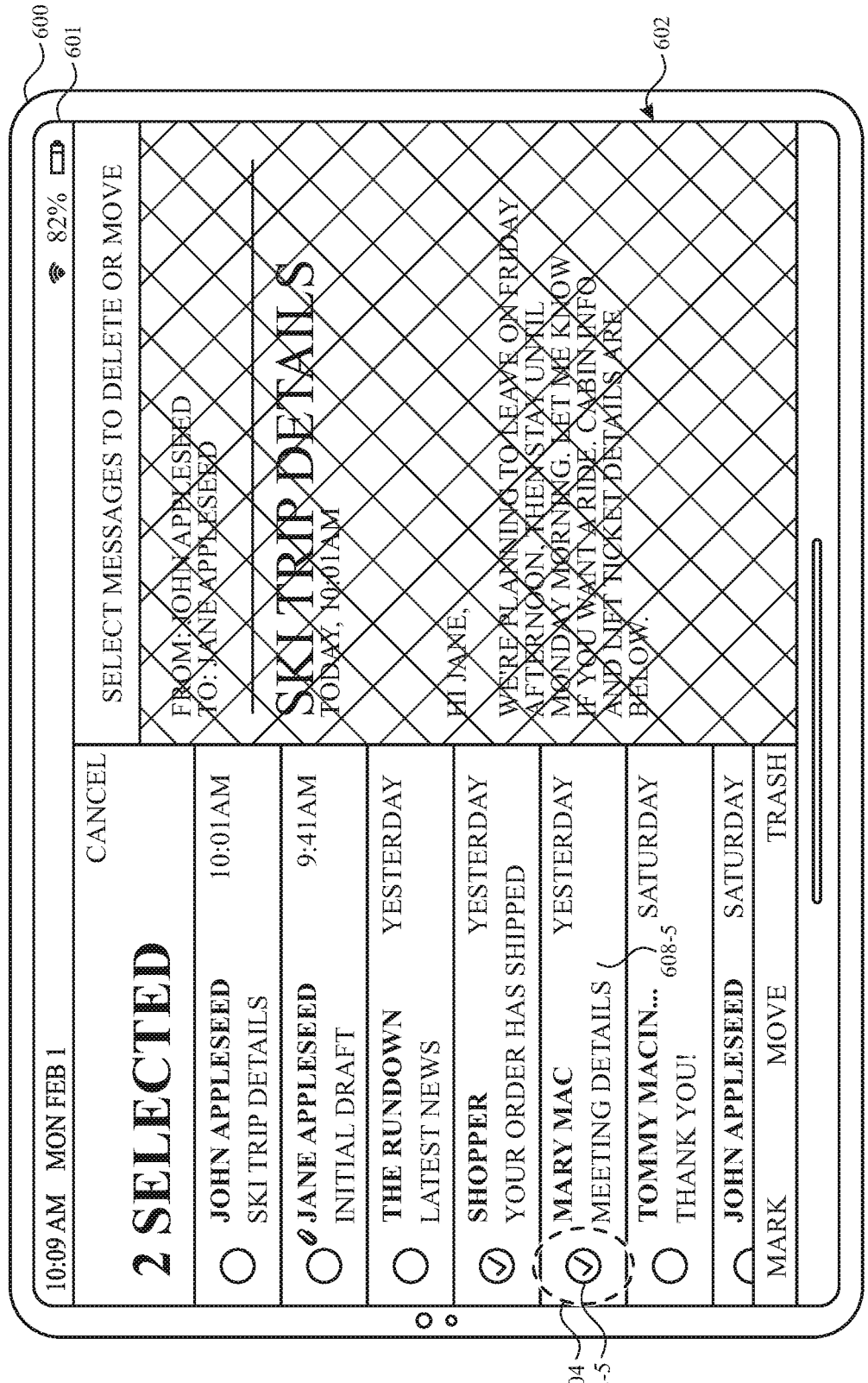

In FIG. 8C, electronic device 600 detects input 804 (e.g., a single-input tap gesture) on selection indicator affordance 622-5 to select item 608-5.

FIGS. 8D-8G illustrate an example embodiment in which electronic device 600 performs an automatic scroll and selection of multiple items 608 in response to a single input (e.g., 806) maintained on display 601. In some embodiments, the automatic scrolling and selection behavior described below is triggered based on the location at which the input (e.g., 806) is detected. For example, in some embodiments, the automatic scrolling and selection occurs when the input is detected on a selection affordance of an item that is the last displayed item (e.g., fully displayed item) in the list. In some embodiments, the automatic scrolling and selection occurs when the input is detected within a region that is near the edge of display 601. The automatic scrolling and selecting behavior reduces the number of inputs needed to perform a scrolling and selecting operation, thereby enhancing operability of the electronic device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 8D:
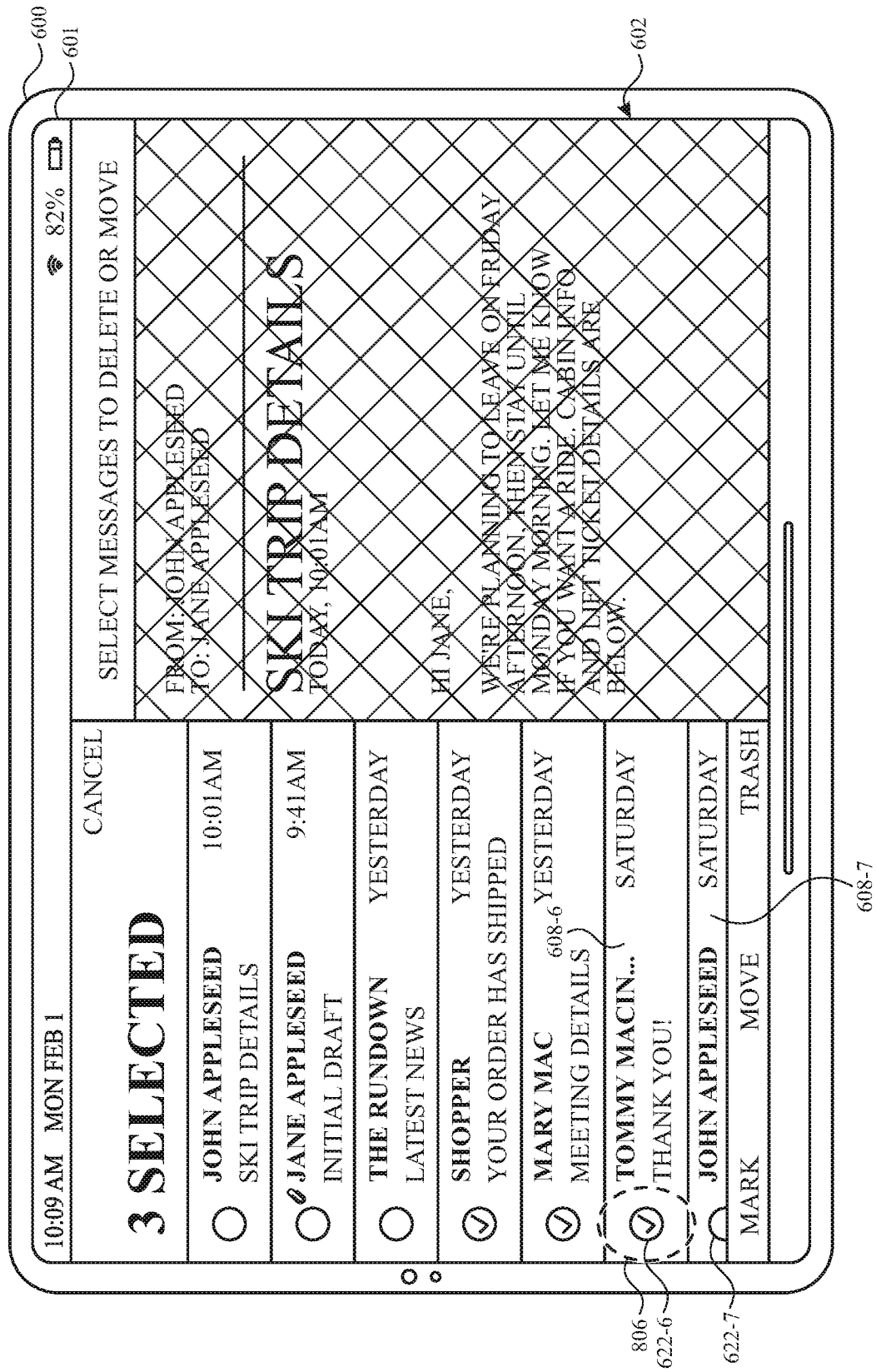
Figure 8E:
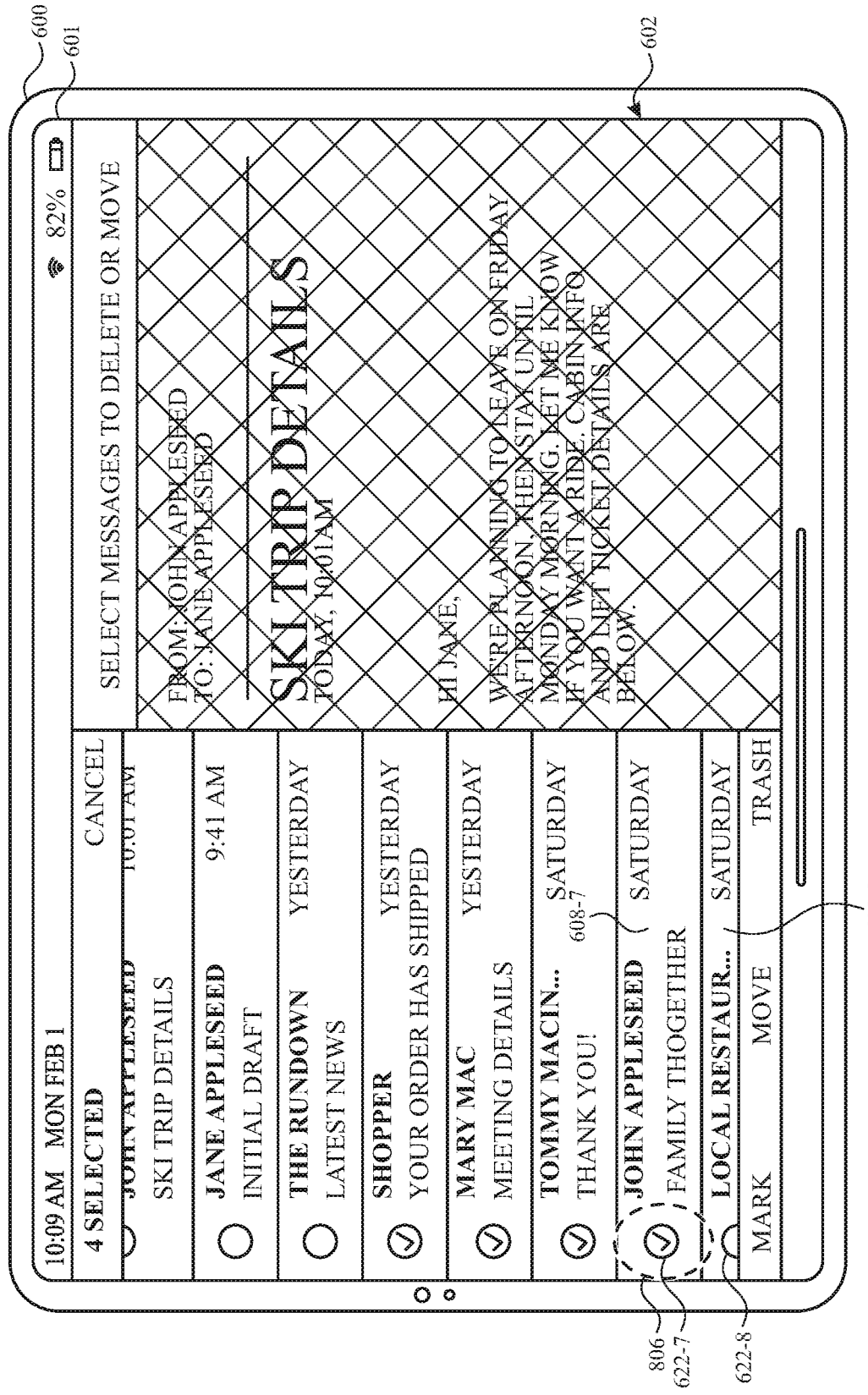
Figure 8F:
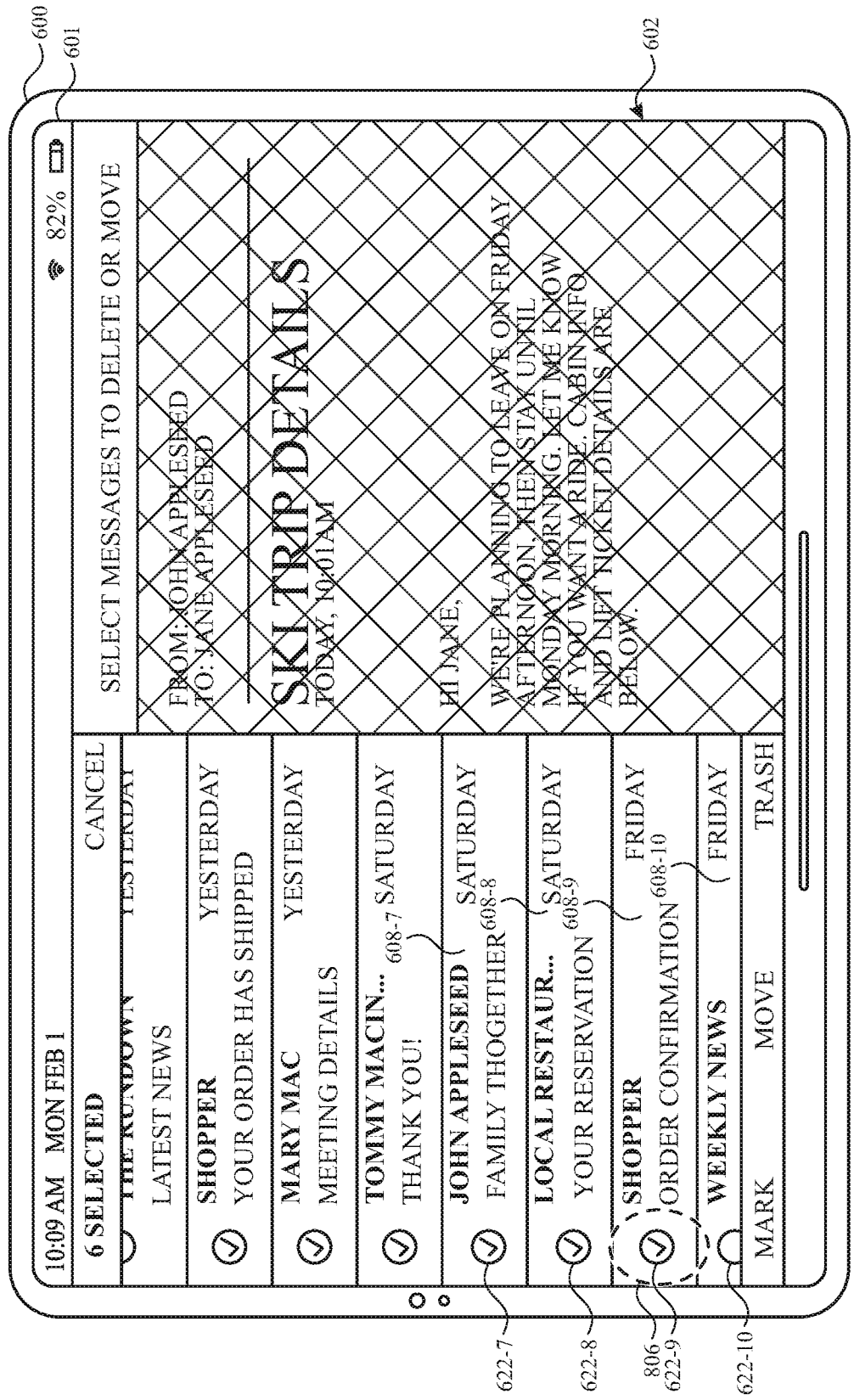

In FIG. 8D, electronic device 600 detects input 806 (e.g., a single-input tap and hold gesture) on selection indicator affordance 622-6 to select item 608-6. Item 608-6 is a last-displayed item in list 604 (e.g., the last item that is fully displayed on-screen in list 604). Electronic device 600 continues to detect input 806, which is a stationary input maintained for a period of time. When input 806 is held for longer than a threshold period of time (e.g., a threshold greater than zero) (e.g., a threshold that is greater than an amount of time for detecting a tap input), electronic device 600 begins to automatically scroll items 608, without detecting any further input from the user. This scrolling behavior is illustrated in FIGS. 8E-8F. The scrolling continues for as long as input 806 is detected (or, in some embodiments, until reaching the end of the scrollable list).

In addition to scrolling items 608 for the duration of input 806, electronic device 600 selects each newly displayed item as it scrolls up in the list to the location of input 806. For example, in FIG. 8D, item 608-7 is displayed partially off-screen, with selection indicator affordance 622-7 in an unselected state. As input 806 is maintained, electronic device 600 scrolls item 608-7 up in list 604, and selects selection indicator affordance 622-7 when its displayed position reaches the location of input 806, as shown in FIG. 8E. As a result of the scrolling, item 608-8 is displayed partially off-screen, with selection indicator affordance 622-8 in an unselected state.

As shown in FIG. 8F, the automatic scrolling and selection continues while input 806 is maintained, resulting in selection of items 608-8 and 608-9 (e.g., via selection of selection indicator affordances 622-8 and 622-9), and partial display of item 608-10 and selection indicator affordance 622-10 having an unselected state.

Figure 8G:
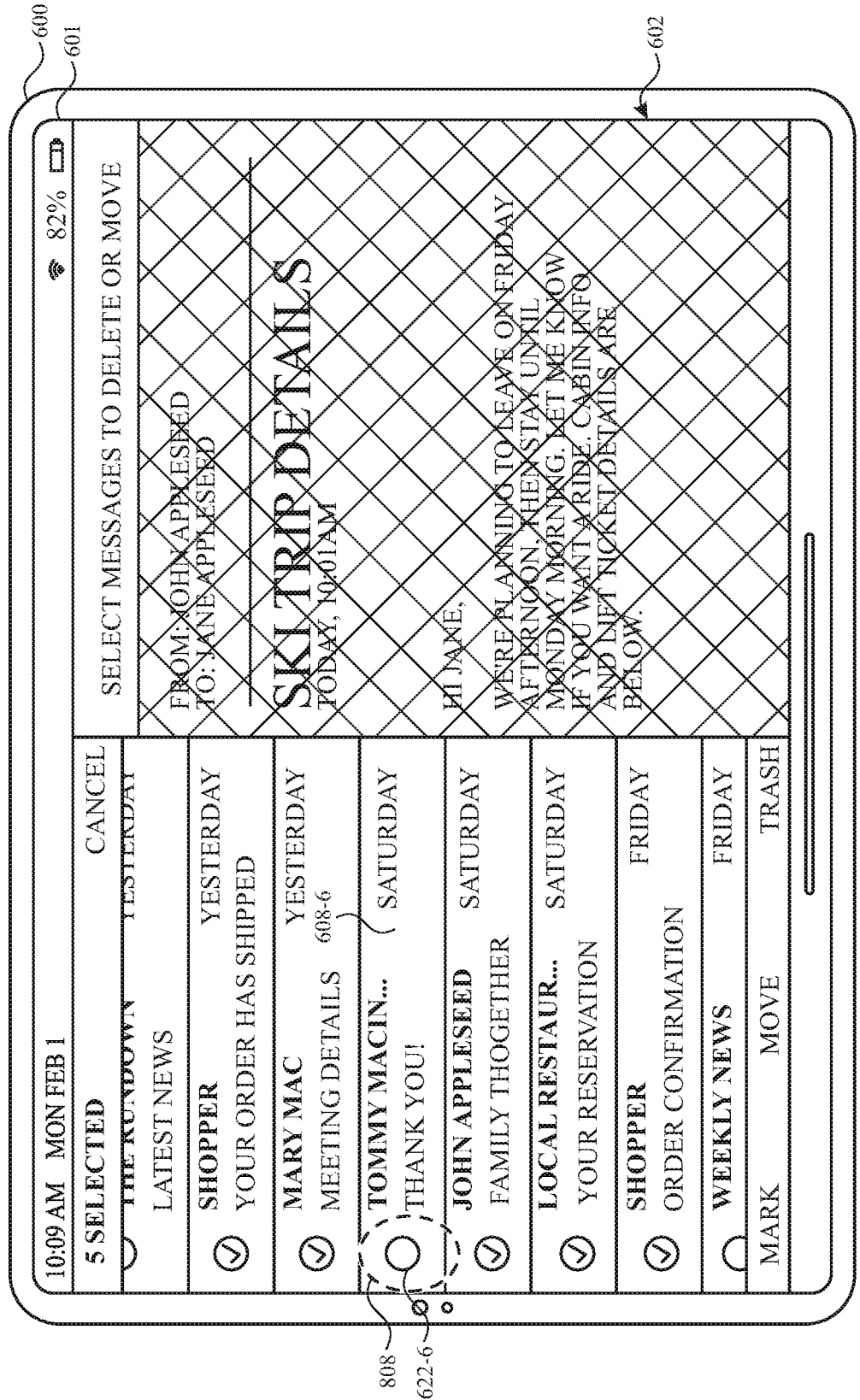

In FIG. 8G, electronic device 600 detects termination of input 806 and, in response, terminates the automatic scrolling and selection behavior.

FIGS. 8G-8J illustrate an embodiment in which electronic device 600 changes a selection state of multiple items by detecting a selection/deselection of a first item, followed by a scroll command to change subsequent items while maintaining the input that changed the selection state of the first item (in some embodiments, the scroll command is received before the input for selecting/deselecting the first item). In some embodiments, the resulting selection state of the subsequent items is determined based on the selection state of the first item that was changed. For example, if the first item changes from a selected state to a deselected state, the subsequent items transition to a deselected state (or remain deselected/unselected if they are already in a deselected/unselected state). Conversely, if the first item changes from an unselected state to a selected state, the subsequent items transition to a selected state (or remain selected if they are already in a selected state).

Figure 8H:
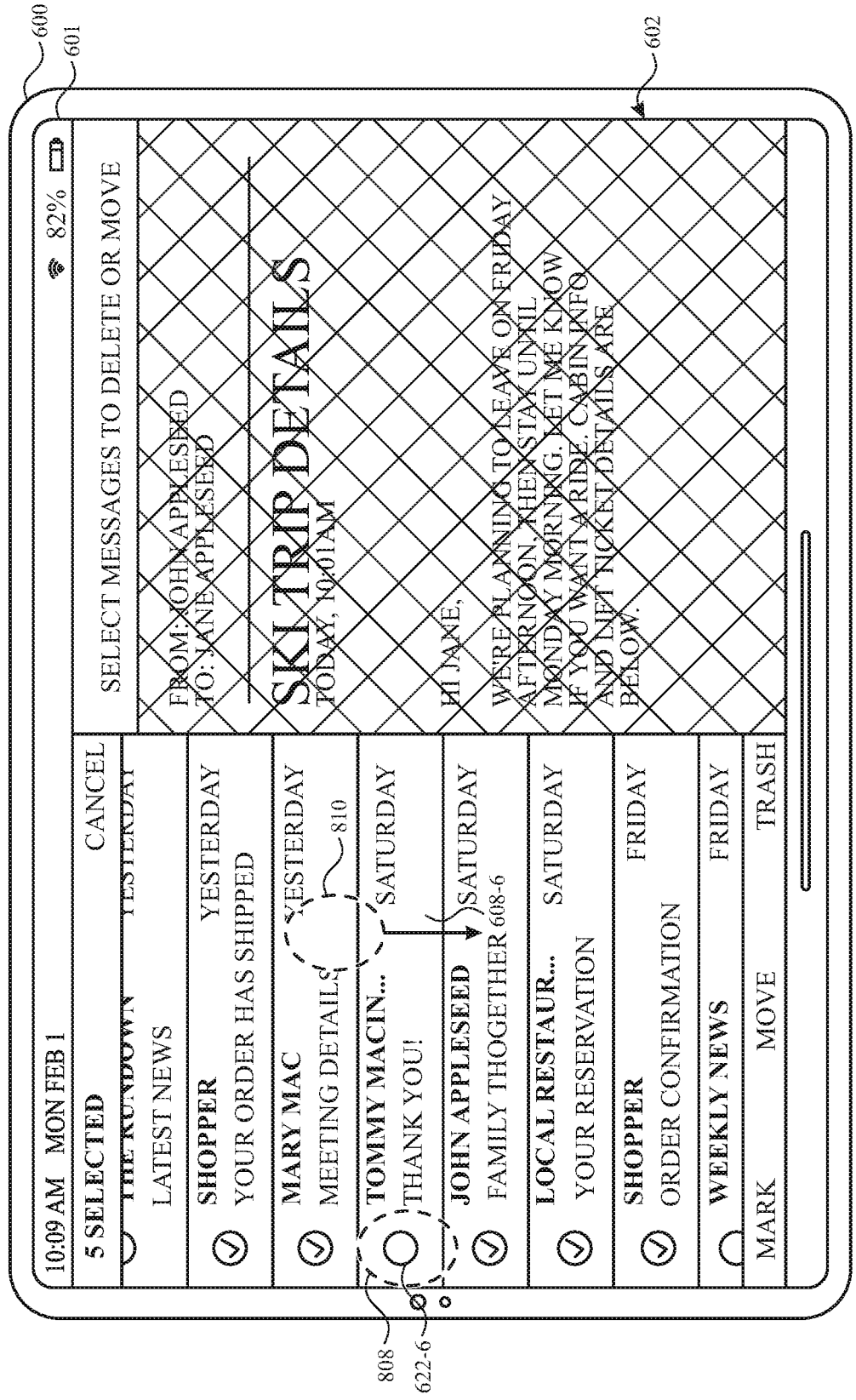

In FIG. 8G, electronic device 600 detects input 808 (e.g., a single-input touch and hold gesture) located at selection indicator affordance 622-6 of item 608-6 and, in response, deselects item 608-6, as shown in FIG. 8H. The electronic device continues to detect input 808, then detects input 810, which is a scroll command (e.g., a single-input scroll gesture).

Figure 8I:
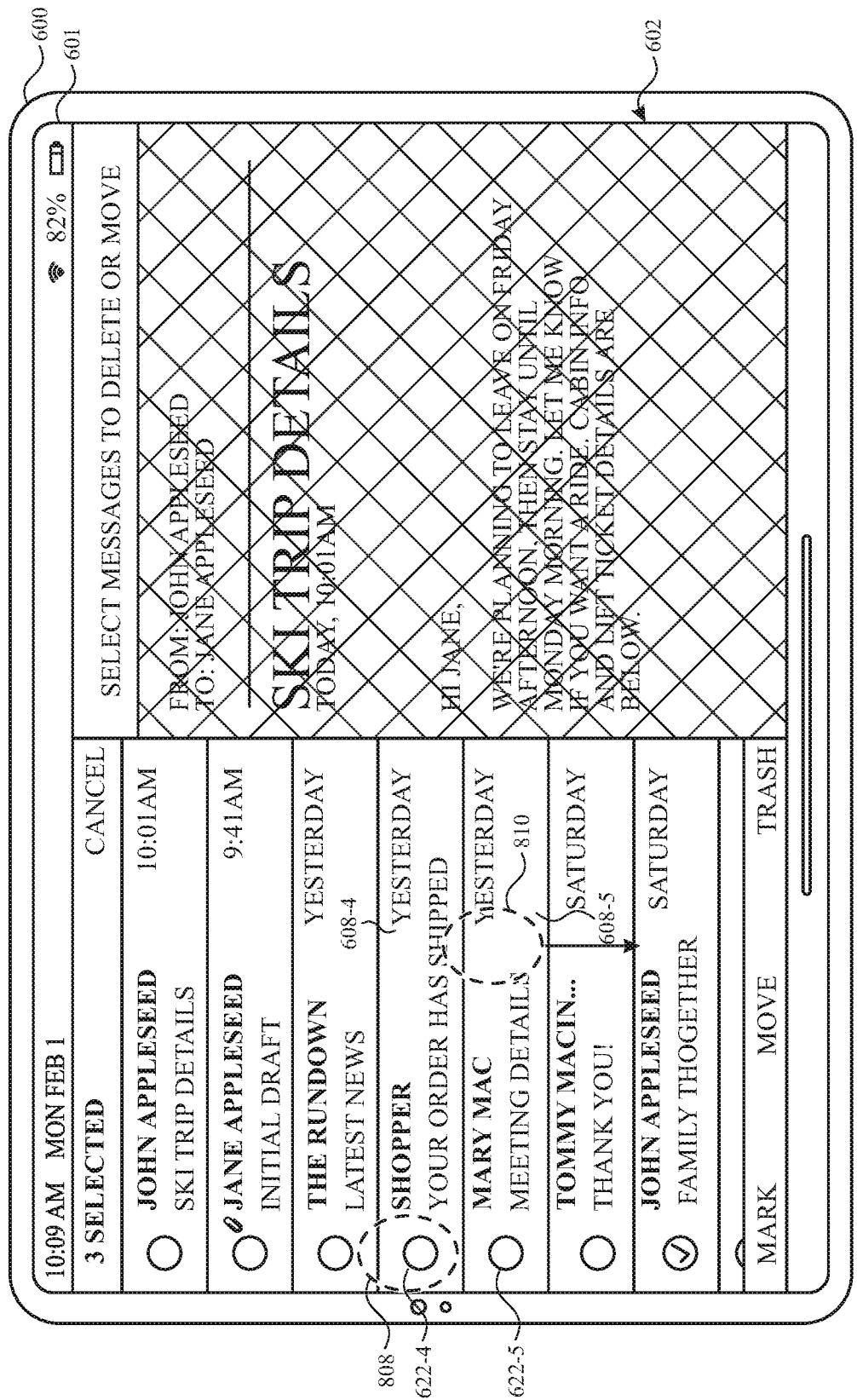

In response to input 810, electronic device 600 scrolls list 604 and deselects items (e.g., items 608-5 and 608-4) as the items scroll beneath input 808, which is maintained on display 601. Because item 608-6 changed from a selected state to a deselected state in response to input 808, items contacting input 808 (while scrolling) transition to a deselected state (or if the item is already deselected, remains deselected (e.g., see FIG. 8J). As shown in FIGS. 8H and 8I, selection indicator affordances 622-4 and 622-5 scroll under input 808 and become deselected as they intersect the location of input 808, which remains stationary on display 601.

Figure 8J:
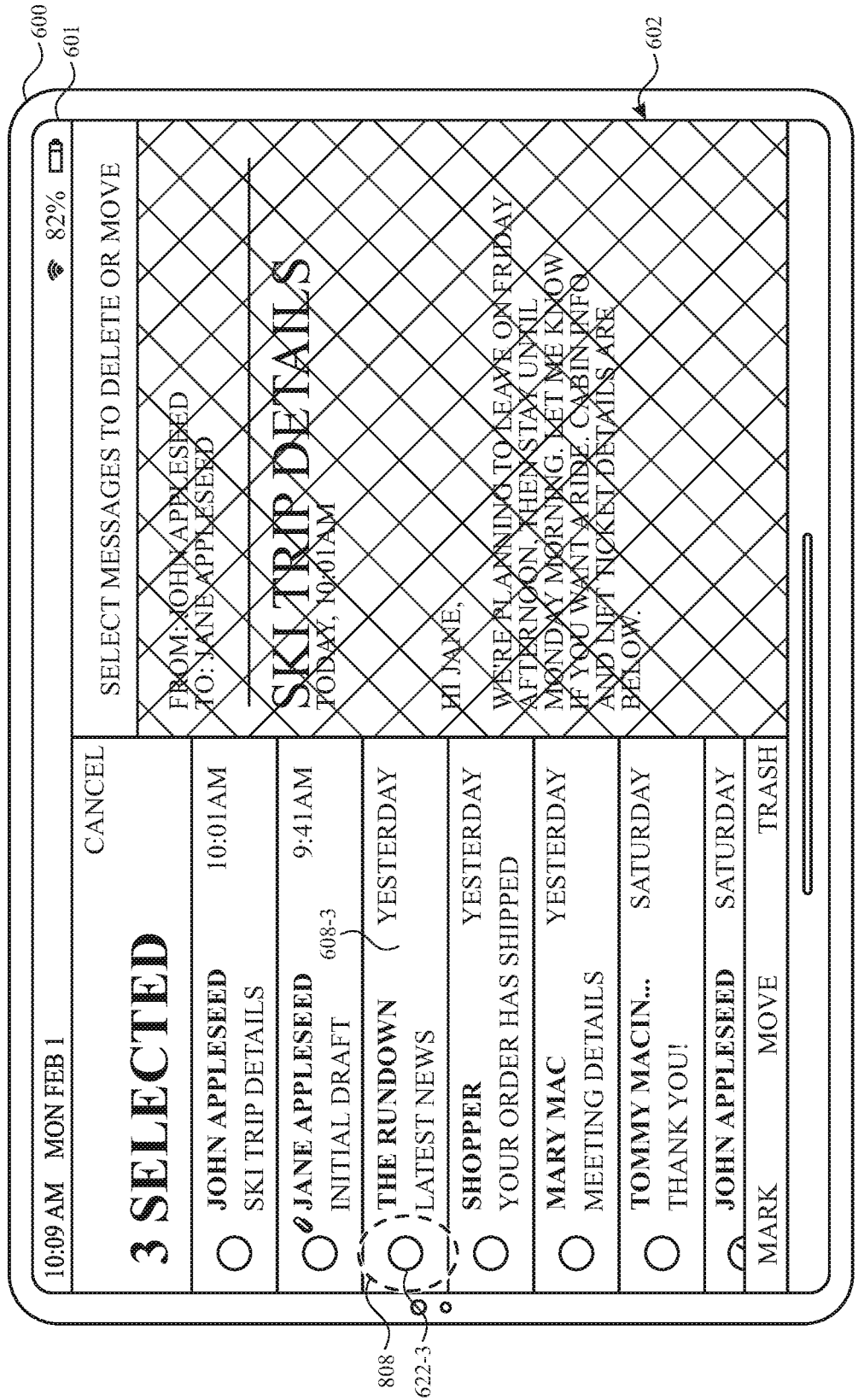

In FIG. 8J, electronic device 600 no longer detects input 810 (e.g., the scroll command), but the list of items continues to scroll with inertia in response to input 810. As the items in the list continue to scroll, intersecting input 808, the items are deselected. Again, the items are deselected because the state change of the first changed item was to a deselected state (e.g., item 608-6 was deselected in response to input 808 in FIG. 8G). As shown in FIG. 8J, selection indicator affordance 622-3 of item 608-3 scrolls under input 808 without changing selection states. This is because selection indicator affordance 622-3 is already in a deselected state. Therefore, selection indicator affordance 622-3 remains in a deselected state, rather than changing selection states.

In some embodiments, the scroll command (e.g., 810) can be detected prior to the first selection input (e.g., 808). For example, an input is received to scroll the list, the device then detects the selection input, and as the items scroll under the selection input, they change selection states while the selection input is maintained on the display.

In some embodiments, the scroll command (e.g., 810) can include a series of scroll commands, causing the list of items to scroll at an accelerated pace while input 808 is maintained on display 601 to select or deselect the items scrolling underneath the input (e.g., 808).

The scrolling and selection/deselection operation illustrated in FIGS. 8G-8J allows for a user to select/deselect large quantities of items in a list in a short amount of time and with precision and using a short series of inputs, which cannot be achieved with a swipe or other selection methods. For example, a select-all command does not allow for the precision of the foregoing scrolling and selection/deselection operation because the select-all command does not allow the user to specify which items should be selected/deselected, A swipe command cannot be executed to select a large number of items as quickly as the scrolling command, because the swipe gesture is limited by the length of the displayed list of items, whereas the scrolling with selection/deselection moves the list of items (e.g., at a rate faster than a user can swipe). Thus, the foregoing scrolling with selection/deselection allows for faster and more precise selection/deselection of items than other methods. Moreover, because the scrolling with selection/deselection operation uses fewer gestures than such other operations, the foregoing technique reduces the number of inputs needed to select large lists of items, thereby conserving computational resources and battery power.

FIGS. 8K-8O illustrate an embodiment for selecting an intervening set of items 608 in list 604. In this embodiment, electronic device 600 detects a tap input on a first item to select the first item, then detects a tap-and-hold input on a second item, and displays: 1) an option to select all items in the list, and 2) an option to select the second item and the items between the first and second item (e.g., intervening items). In some embodiments, the following steps can be performed in an analogous manner to deselect an intervening set of items (or deselect all items).

Figure 8K:
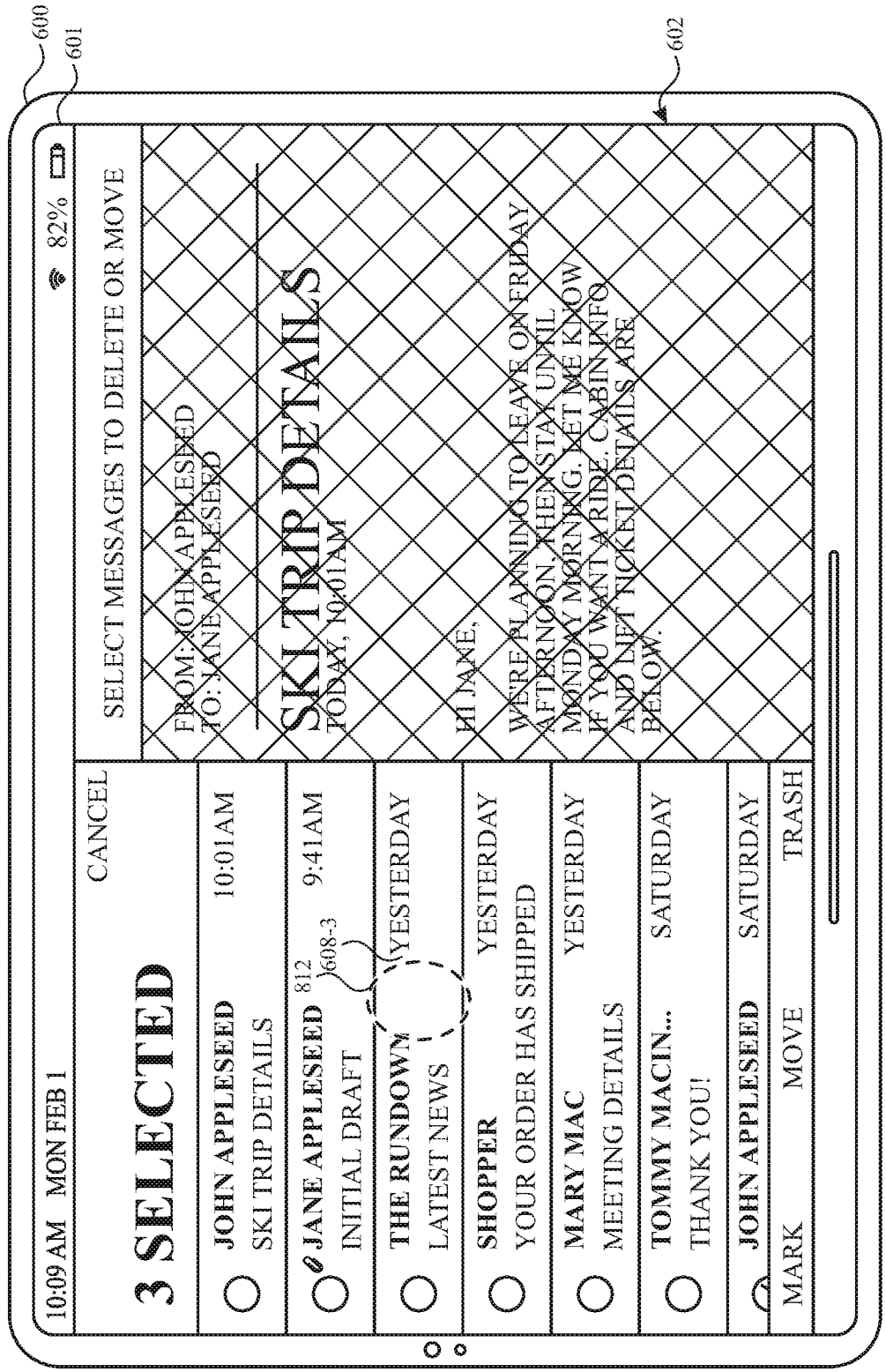
Figure 8L:
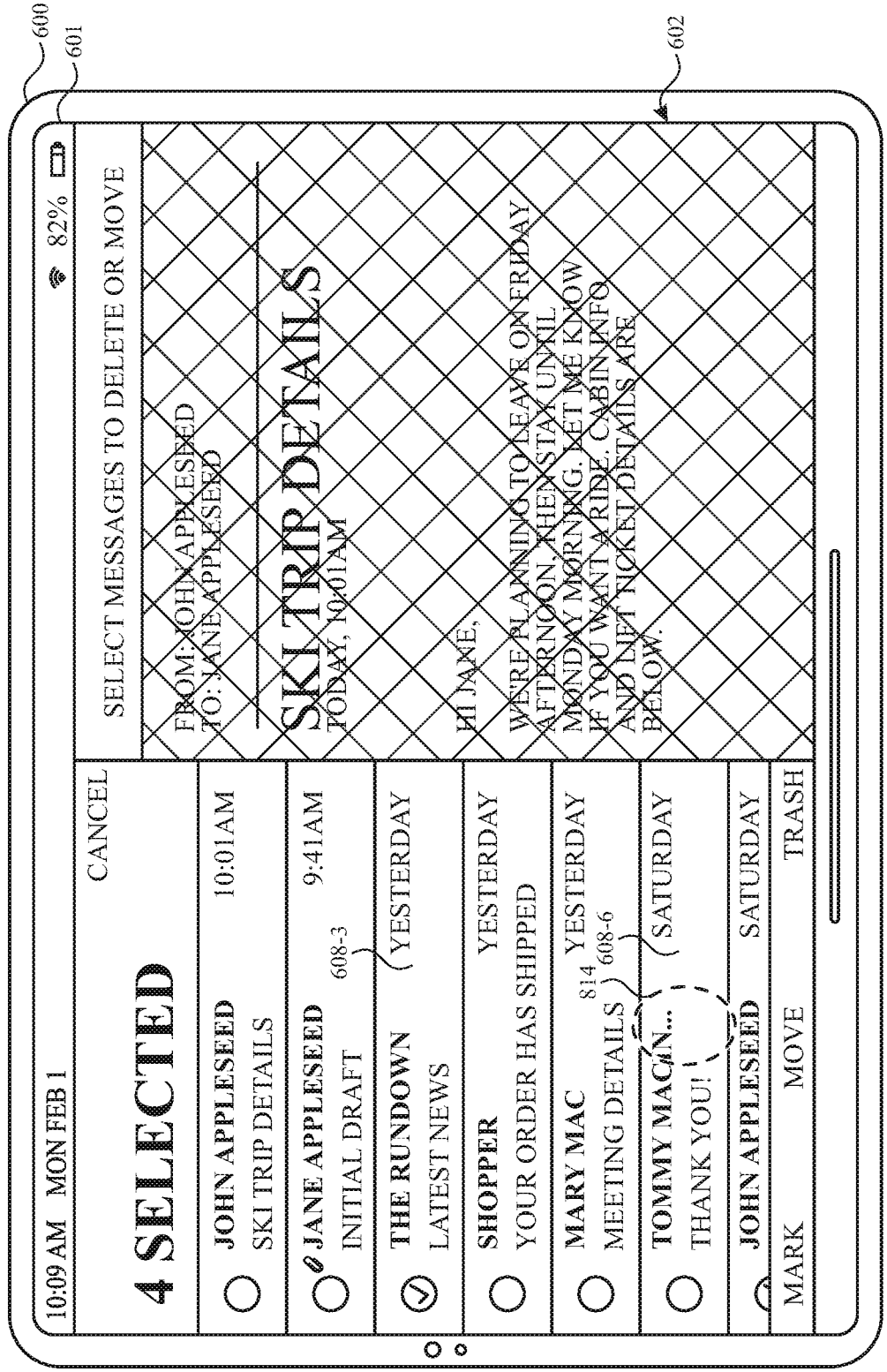

In FIG. 8K, electronic device 600 detects input 812 (e.g., a single-input tap gesture) on item 608-3 and, in response, selects item 608-3, as shown in FIG. 8L.

In FIG. 8L, electronic device 600 detects input 814 (e.g., a single-input tap-and-hold gesture) on item 608-6. Input 814 is a tap-and-hold input. When electronic device 600 detects input 814 is held for longer than a threshold amount of time (e.g., a non-zero threshold that is greater than, for example, an amount of time for detecting a tap input), electronic device 600 displays option interface 816 for selecting items, as shown in FIG. 8M.

Figure 8M:
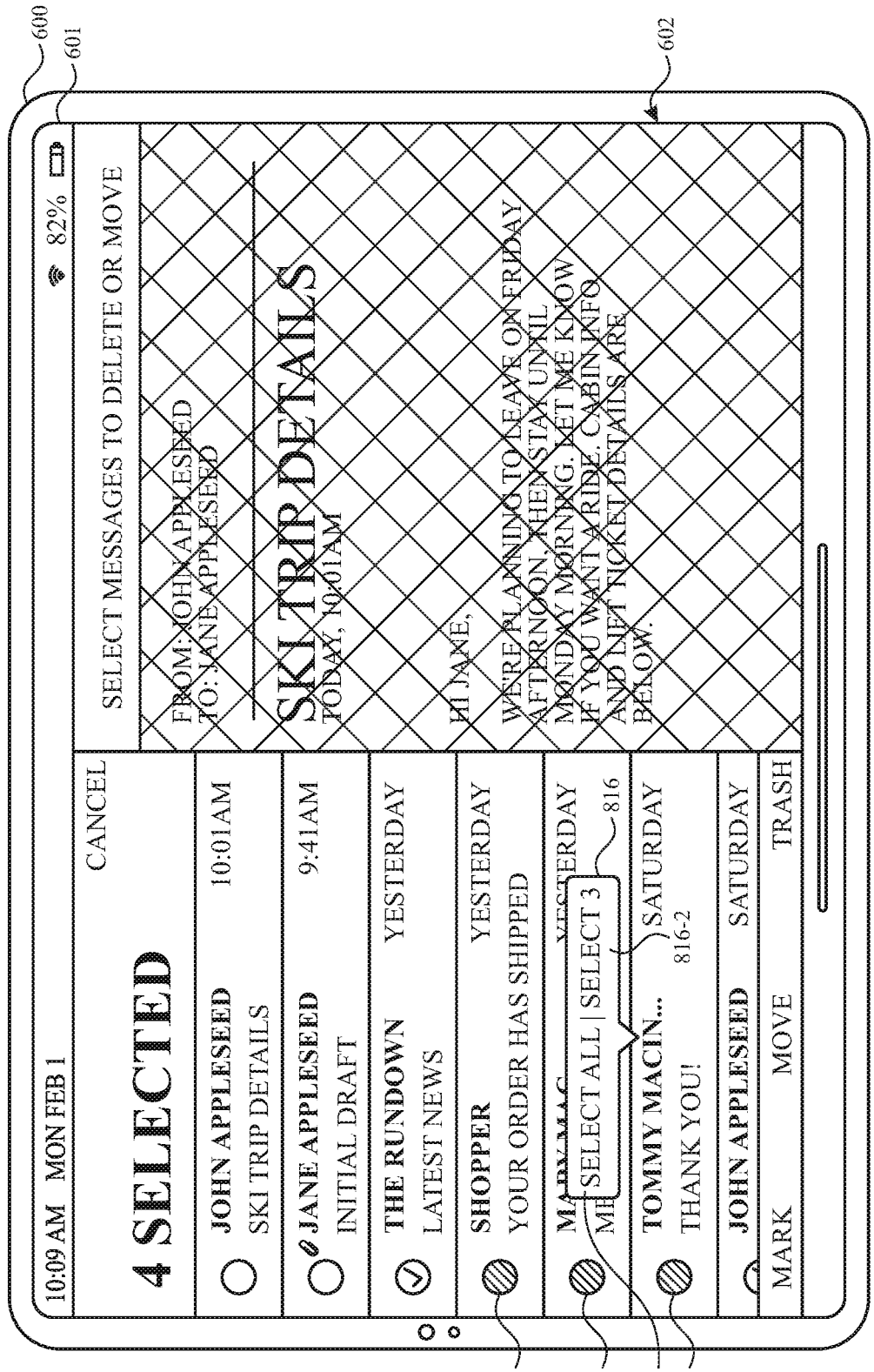

As shown in FIG. 8M, option interface 816 includes a first portion, "Select All" affordance 816-1, which corresponds to an option for selecting all items 608 in list 604, and a second portion, "Select 3" affordance 816-2, which corresponds to an option for selecting item 608-6 and intervening items between item 608-6 and selected item 608-3 (e.g., items 608-4 and 608-5). In addition to displaying option interface 816, electronic device 600 displays selection indicator affordances 622-4 through 622-6 having a shaded effect, to indicate that the corresponding items 608-4 through 608-6 are subject to selection if "Select 3" affordance 816-2 is selected.

Figure 8N:
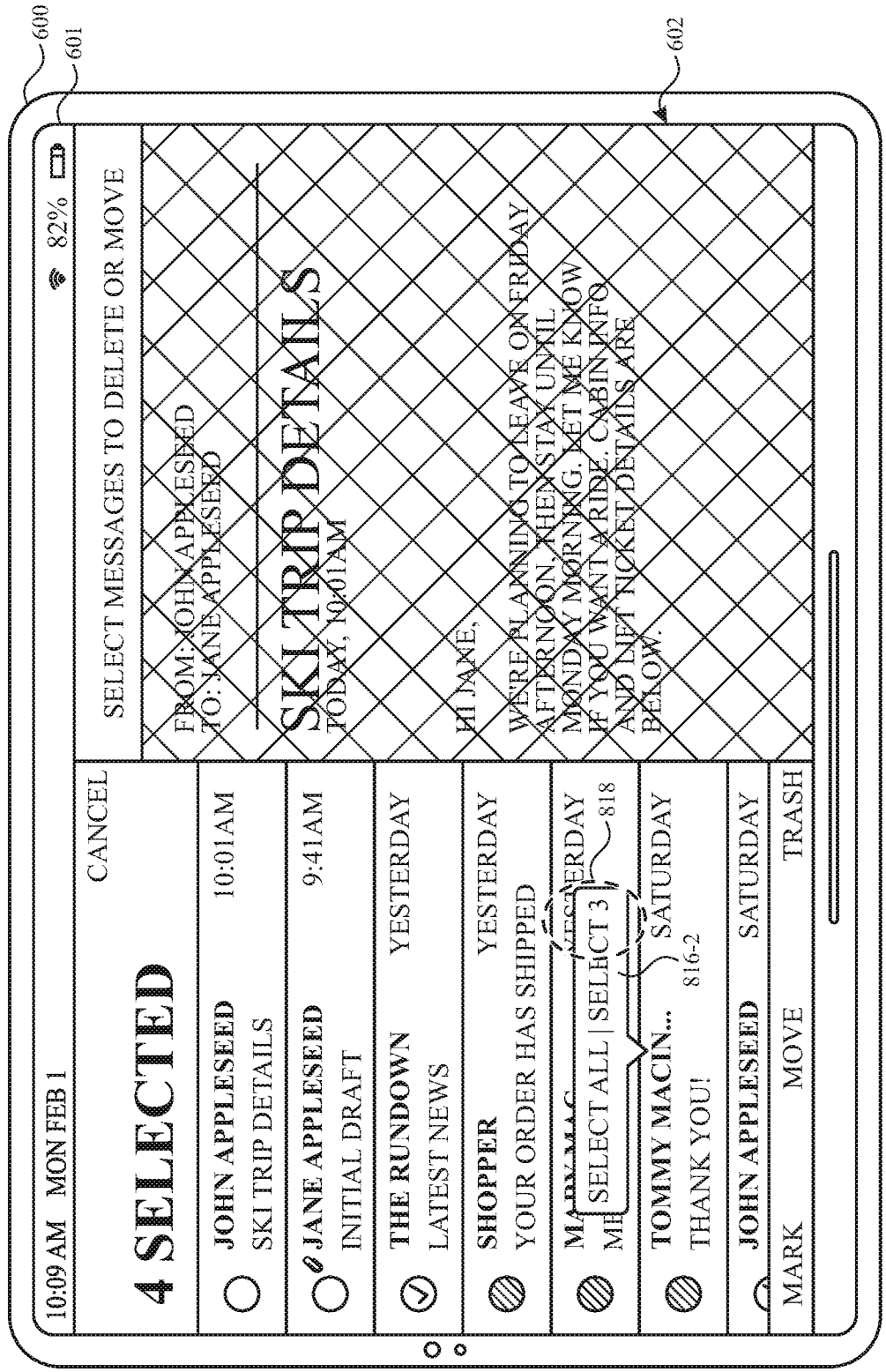
Figure 80:
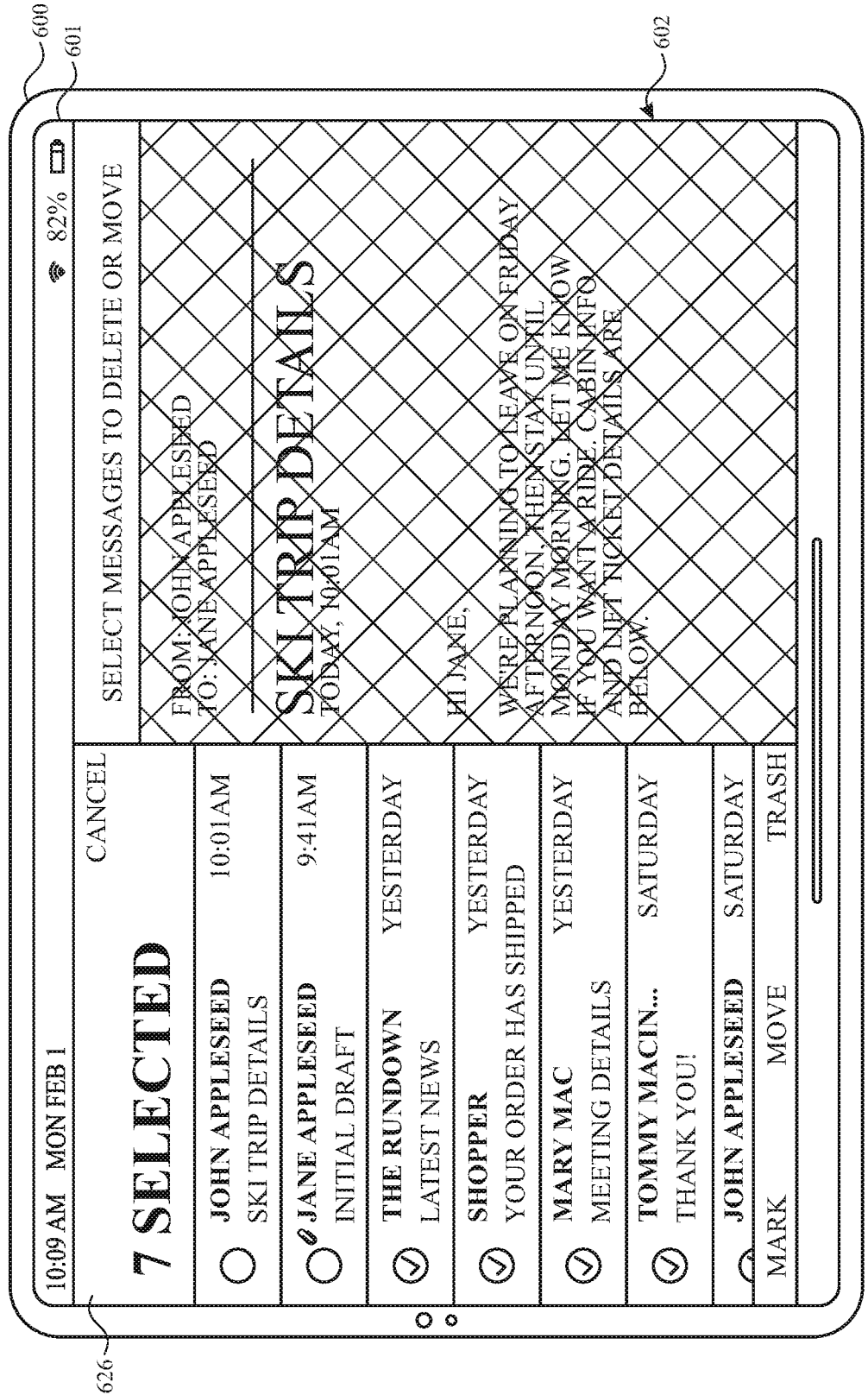

In FIG. 8N, electronic device 600 detects input 818 (e.g., a single-input tap gesture) on "Select 3" affordance 816-2 and, in response, selects items 608-4 through 608-6, changing selection indicator affordances 622-4 through 622-6 from shaded to a selected state, as shown in FIG. 8O. As a result, seven items 608 are selected in list 604, as indicated by status region 626.

Figure 8P:
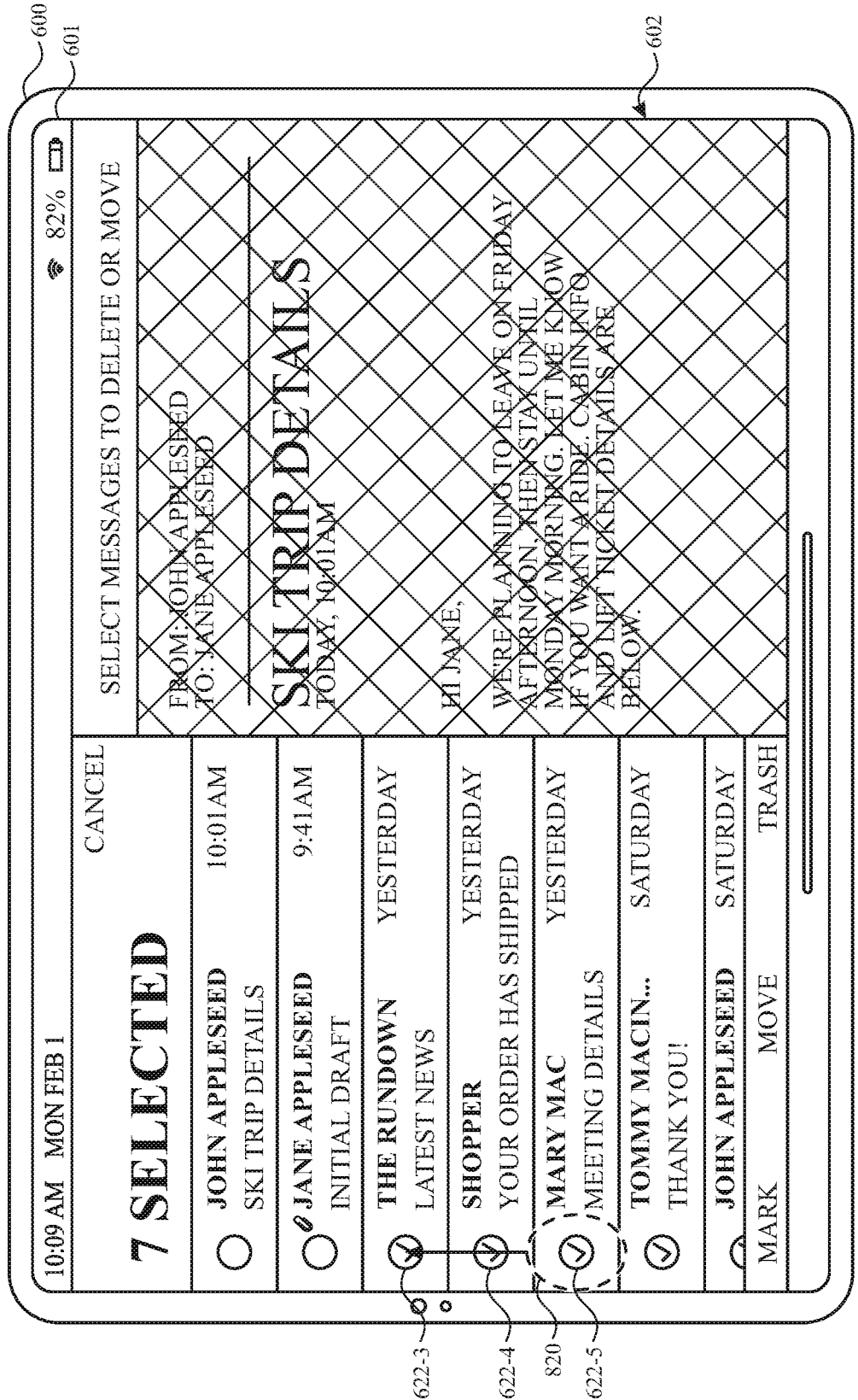
Figure 8Q:
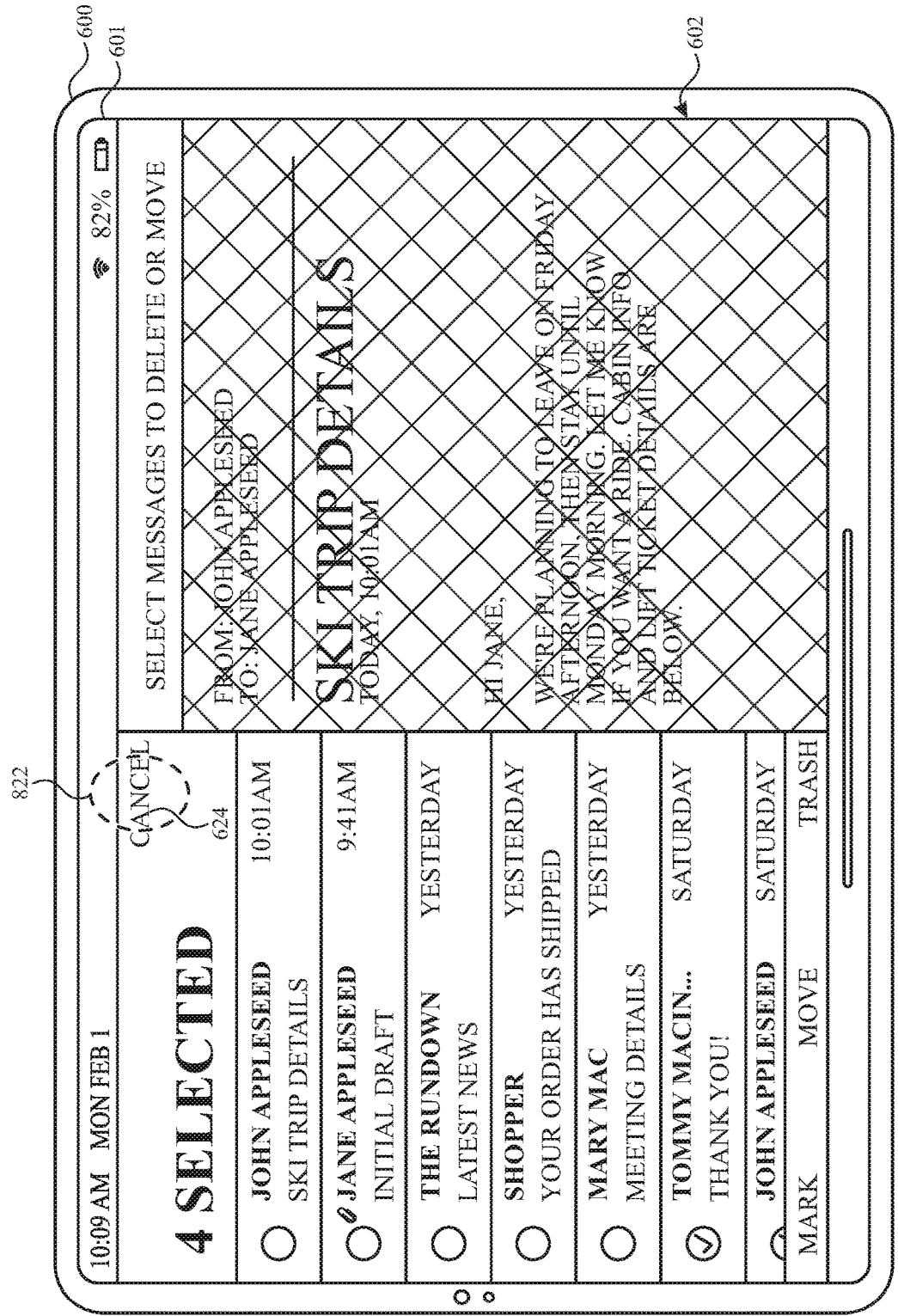

In FIG. 8P, electronic device 600 detects swipe gesture 820 on selection indicator affordances 622-5 through 622-3 and, in response, deselects items 608-5 through 608-3, as shown in FIG. 8Q.

In FIG. 8Q, electronic device 600 detects input 822 on cancel affordance 624 and, in response, exits edit mode, as shown in FIG. 8R.

FIG. 9 is a flow diagram illustrating a method for selecting and scrolling items using an electronic device in accordance with some embodiments. Method 900 is performed at a device (e.g., 100, 300, 500, 600) with a display and a touch-sensitive surface. Some operations in method 900 are, optionally, combined, the orders of some operations are, optionally, changed and some operations are, optionally, omitted.

As described below, method 900 provides an intuitive way for selecting or deselecting items while scrolling items in a user interface. The method reduces the cognitive burden on a user for selecting or deselecting items, thereby creating a more efficient human-machine interface. For battery-operated computing devices, enabling a user to select or deselect items faster and more efficiently conserves power and increases the time between battery charges.

An electronic device (e.g., 600) with a display (e.g., 601) and a touch-sensitive surface (e.g., 601) (e.g., 112) displays (902), via the display, a user interface (602) that includes a plurality of items (608) (e.g., a listing of graphical objects such as, for example, messages (e.g., emails, text messages), pictures, files, etc.).

The electronic device detects (904) a first input (e.g., 808) (e.g., a touch input; a touch-and-hold input; a touch-and-drag input; a swipe gesture) at a location on the display corresponding to a first item (e.g., 608-6) in the plurality of items. In some embodiments, the first input is a stationary input. In some embodiments, the first input is an input that has one point of contact on the display. In some embodiments, the electronic device detects a user holding their finger on a selection affordance (e.g., 622-6). In some embodiments, the electronic device detects a touch-and-drag or swipe gesture that originates on the selection affordance.

In some embodiments, the first input is a stationary input (e.g., the first input remains stationary during scrolling). In some embodiments, the content (e.g., items 608) displayed on the display (e.g., 601) moves with respect to the position of the first input on the touch-sensitive surface. For example, the first input (e.g., 808) is continuous contact at a single contact point on the touch-sensitive surface, and the displayed listing scrolls along the display (e.g., under the contact on the display), while the contact of the first input remains stationary (e.g., see FIGS. 8H-8J).

In response to detecting the first input (e.g., 808) at the location on the display corresponding to the first item (e.g., 608-6), the electronic device changes (906) the selection state of the first item (e.g., see deselection of item 608-6 (and selection indicator affordance 622-6) in FIGS. 8G and 8H) (e.g., changing the first item from an unselected state to a selected state, or from a selected state to a deselected (unselected) state).

In some embodiments, changing the selection state of the first item (e.g., 608-6) includes: in accordance with a determination that the selection state of the first item is a selected state, changing the selection state of the first item to an unselected state, and in accordance with a determination that the selection state of the first item is an unselected state, changing the selection state of the first item to a selected state.

In some embodiments, prior to detecting the second input (e.g., 810) and further in response to detecting the first input (e.g., 808 or 806): in accordance with a determination that the first input is maintained for greater than a predetermined period of time (e.g., maintained at a same location for the predetermined period of time) (e.g., maintained for greater than a threshold amount of time for detecting (e.g., classifying; validating) a touch input of a first type (e.g., a tap input; a swipe gesture)) (e.g., maintained for an amount of time required to classify a detected input as a particular gesture (e.g., a valid gesture)) and/or maintained for an amount of time required to exclude the detected input from being an invalid gesture (e.g., an accidental contact, noise)) and in accordance with a determination that the first item (e.g., 608-6) is at an end (e.g., top or bottom) of the displayed plurality of items (e.g., 608) in the user interface (e.g., see FIG. 8D), the electronic device (e.g., 600) scrolls (e.g., automatically, without the need for further user input) the plurality of items (e.g., 608) after changing the selection state of the first item (e.g., scrolling the plurality of items while continuing to detect the first input) (e.g., see FIGS. 8D-8F). In some embodiments, when the first item is at an end of a displayed listing of items, the electronic device automatically scrolls the listing of items after the first item is selected/deselected. Scrolling the items after changing the selection state of the first item when the first input is on an item at an end of the displayed items and is maintained for a threshold amount of time allows a user to automatically scroll the list of items without having to select additional user interface objects, thereby reducing the number of inputs needed to perform a scrolling operation. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, scrolling the plurality of items after changing the selection state of the first item includes: displaying one or more new items (e.g., items 608-7 through 608-10 are displayed as items 608 scroll in FIGS. 8D-8F) in the plurality of items (e.g., displaying new items as the plurality of items is scrolled) and changing the selection state of the one or more new items in the plurality of items (e.g., selecting or deselecting the new items as they are displayed while the plurality of items is scrolled). In some embodiments, as the first input is maintained, new items are displayed as the list of items automatically scrolls, and the new items are selected/deselected as they are displayed. Displaying new items and changing the selection state of the new items while scrolling allows a user to automatically select items without having to select additional user interface objects to select or scroll the new items, thereby reducing the number of inputs needed to select items. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while scrolling the plurality of items after changing the selection state of the first item (e.g., and while continuing to detect the first input (e.g., 806)): in accordance with a determination that a last item in the plurality of items (e.g., 608) is selected, the electronic device (e.g., 600) ceases scrolling the plurality of items. In some embodiments, while scrolling the plurality of items after changing the selection state of the first item: in accordance with a determination that the first input (e.g., 806) is terminated, the electronic device ceases scrolling the plurality of items. In some embodiments, as the first input (e.g., 806) is maintained, the list of items continues to scroll until the first input is terminated or the last item in the plurality of items (e.g., an item at an end of a list of items) is selected.

After changing the selection state of the first item (e.g., 608-6 in FIG. 8H), the electronic device detects (908) a second input (e.g., 810) that corresponds to a request to scroll the user interface (e.g., the plurality of items 608). In some embodiments, the second input that corresponds to the request to scroll the plurality of items is a touch input distinct from the first input (e.g., a touch gesture separate from the first input) (e.g., a touch and drag gesture; a swipe gesture).

In response (910) to detecting the second input (e.g., 810): in accordance with a determination that the first input (e.g., 808) is maintained on the display (e.g., 601), the electronic device changes (912) the selection state of one or more items (e.g., items 608-4 and 608-5 in FIG. 8I) (e.g., one or more items that pass under the first input) while scrolling the plurality of items. Changing the selection state of one or more items while scrolling when the first input is maintained on the display allows a user to quickly and easily select multiple items with few gestures, and without having to select a series of user interface objects, thereby reducing the number of inputs needed to select multiple items. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the second input (e.g., 810): in accordance with a determination that a respective one (or more than one) of the scrolling items (e.g., 608-3) has a same state as the changed selection state of the first item (e.g., 608-6), the electronic device (e.g., 600) foregoes changing the selection state of the respective one of the scrolling items. For example, in FIG. 8H, item 608-6 changes to an unselected state in response to input 808. While items 608 scroll in response to input 810 in FIGS. 8H-8J, item 608-3 scrolls under input 808, Because item 608-3 has the same state (e.g., unselected) as the changed selection state of item 608-6, device 600 does not change the selection state of item 608-3, and item 608-3 remains unselected as shown in FIG. 8J. Foregoing changing the selection state of the scrolling item, when it has the same state as the changed state of the first item, allows a user to quickly scroll a list of items to set a selection state of all scrolled items without having to select additional user interface objects, thereby reducing the number of inputs needed to set a selection state of items while scrolling. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after changing the selection state of the one or more items while scrolling the plurality of items, the electronic device detects a third input (e.g., 814) (e.g., a stationary input; e.g., a touch-and-hold input) on a third item in the plurality of items (e.g., item 608-6 is selected with input 814 in FIG. 8L). In some embodiments, the third item is separated from the second item (e.g., item 608-3 in FIG. 8L) in the plurality of items by one or more intervening items (e.g., thins 608-4 and 608-5 in FIG. 8L) in the plurality of items.

In some embodiments, in response to detecting the third input (e.g., 814) and in accordance with a determination that the third input satisfies a first set of criteria (e.g., the third input is maintained for a threshold amount of time), the electronic device displays an intervening selection user interface object (e.g., 816-2 of 816) (e.g., an affordance including an option for selecting/deselecting the third item and the one or more intervening items) that, when selected, changes a selection state of the third item and the one or more intervening items in the plurality of items (e.g., selecting/deselecting the third item and intervening items). In some embodiments, the intervening selection affordance is selected in response to detecting an input (e.g., 818) (e.g., a touch input; e.g., a tap input) on the intervening selection affordance (e.g., 816-2). In some embodiments, the intervening selection affordance displays a number corresponding to the number of items to be selected/deselected in response to selecting the intervening selection affordance. Displaying an intervening selection user interface object for changing a selection state of an item and intervening items allows a user to quickly select an intervening section of items without having to individually select the items, thereby reducing the number of inputs needed to select the subset of items. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in response to detecting the third input (e.g., 814) and in accordance with the determination that the third input satisfies the first set of criteria, the electronic device displays, for each of the third item (e.g., 608-6) and the one or more intervening items (e.g., 608-4 and 608-5) (e.g., without displaying on other items in the plurality of items), a selection user interface object (e.g., 622-4; 622-5; 622-6) (e.g., a selection indicator affordance)

having a preselected state (e.g., an appearance that indicates that the respective item is marked for potential selection (e.g., as shown in FIGS. 8M and 8N). In some embodiments, displaying the selection indicator affordances having the preselected state includes providing an indication (e.g., shading in selection indicator affordances 622-4 through 622-6) to the user of the items to be selected in response to a selection of the intervening selection affordance.

In some embodiments, displaying the intervening selection user interface object (e.g., 816) further includes displaying a select-all user interface object (e.g., 816-1) (e.g., a select-all affordance; e.g., a deselect-all affordance) that, when selected, sets the selection state of all items (e.g., 608) in the plurality of items to a selection state associated with the select-all user interface object (e.g., setting all items to a selected/deselected state).

In response (910) to detecting the second input (e.g., 810): in accordance with a determination that the first input is not maintained on the display, the electronic device scrolls (914) the plurality of items (e.g., 608) without changing the selection state of the one or more items in the plurality of items. Scrolling the items without changing the selection state of the items when the first input is not maintained on the display allows a user to selectively scroll items with or without selecting them simply by controlling whether or not they maintain the first input on the display, and without having to select a series of user interface objects, thereby reducing the number of inputs needed to perform the scroll with selective item selection. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIG. 9) are also applicable in an analogous manner to the methods described above and below. For example, methods 700 and 1100 optionally include one or more of the characteristics of the various methods described above with reference to method 900. For example, in response to being selected or deselected, the selection state of items in the user interface change from a selected state to an unselected state, or from an unselected state to a selected state, depending upon the current selection state of the item when selected/deselected. For brevity, these details are not repeated.

FIGS. 10A-10W illustrate exemplary user interfaces for scrolling items, in accordance with some embodiments. The user interfaces in these figures are used to illustrate the processes described below, including the processes in FIG. 11.

In some embodiments, user interface 602 has a first scrolling mode in which scrolling movement of items 608 in list 604 mirrors movement of an input on items 608, as illustrated in 10A-10G. In some embodiments, user interface 602 has a second scrolling mode in which items 608 in list 604 are scrolled in response to movement of an input on a scroll progress indicator moving a position of scroll bar 614, activating an indexed scrubbing indicator 1018). Various embodiments of the second scrolling mode are illustrated in FIGS. 10H-10W. In some embodiments, electronic device 600 transitions from the first scrolling mode to the second scrolling mode in response to detecting a stationary input on scroll bar 614 for at least a threshold amount of time (e.g., a non-zero threshold that is greater than an amount of time for detecting a tap gesture or other touch gesture such as a swipe). Once electronic device 600 transitions to the second scrolling mode, the list of items is scrolled in response to movement of the input on scroll bar 614 that caused electronic device 600 to transition to the second scrolling mode. In other words, after transitioning to the second mode, the stationary input on scroll bar 614 can be moved to control scrolling in the second mode.

As shown in FIG. 10A, list 604 includes items 608, and preview pane 606 displays preview content 607-1 of selected item 608-1. Electronic device 600 detects scroll input 1002 (e.g., a single-input swipe gesture in an upward direction) on items 608. In response, electronic device 600 scrolls items 608 based on the direction and magnitude of scroll input 1002 and displays scroll bar 614, as shown in FIG. 10B. Specifically, scroll input 1002 is a swipe gesture in an upward direction on display 601. Because user interface 602 is in the first scrolling mode, list 604 scrolls down (e.g., items 608 move in an upward direction on display 601), as shown in FIG. 10B.

Referring now to FIG. 10B, scroll bar 614 is displayed alongside list 604. The scroll bar has a scrollable position alongside items 608 in list 604, extending from top edge 1004, to bottom edge 1006. When list 604 is scrolled to the top item (e.g., item 608-1 is fully displayed as shown in FIG. 10A), scroll bar 614 is positioned adjacent top edge 1004. When list 604 is scrolled to the bottom item (e.g., the last item in list 604 is fully displayed), scroll bar 614 is positioned adjacent bottom edge 1006. Thus, in some embodiments, the length of the displayed portion of list 604 (e.g., between top edge 1004 and bottom edge 1006) represents the scrollable range (e.g., the length) of the list of items, and a relative position of scroll bar 614 between top edge 1004 and bottom edge 1006 is representative of a scrolled position of items 608 in list 604. Accordingly, the number of items 608 scrolled for a given magnitude of movement of the scroll bar (e.g., when scrolling in the second mode) is proportional to the length of the list. For example, when the scrolling gesture moves scroll bar 25% of the length of the distance between edges 1004 and 1006, the number of items scrolled is greater when the list is longer, and less when the list is shorter. Thus, one of the benefits of the second scrolling method (when compared to the first scrolling method) is the ability to quickly scroll large lists with reduced effort and inputs, as discussed in greater detail below.

In some embodiments, scroll bar 614 has a size that is generally proportional to the total length of the list of items (e.g., the scroll bar is smaller when the list is longer and is larger when the list is shorter). In some embodiments, header region 605 expands and contracts with scrolling movement. For example, when list 604 is scrolled to the top, header region 605 has an expanded appearance as shown in FIG. 10A (in some instances, such as when displaying a rubber banding animation, the header region is expanded even farther). When list 604 is scrolled to a position other than the top of the list, header region 605 has a contracted appearance as shown in FIG. 10B.

In some embodiments, scroll bar 614 is temporarily displayed in response to a scroll command (e.g., scroll input 1002), and disappears after a predetermined period of time if electronic device 600 detects no further input on items 608. For example, in FIG. 10B, electronic device 600 detects no further input after scroll input 1002. Accordingly, electronic device 600 ceases to display scroll bar 614 after the predetermined period of time, as shown in FIG. 10C.

Figure 10D:
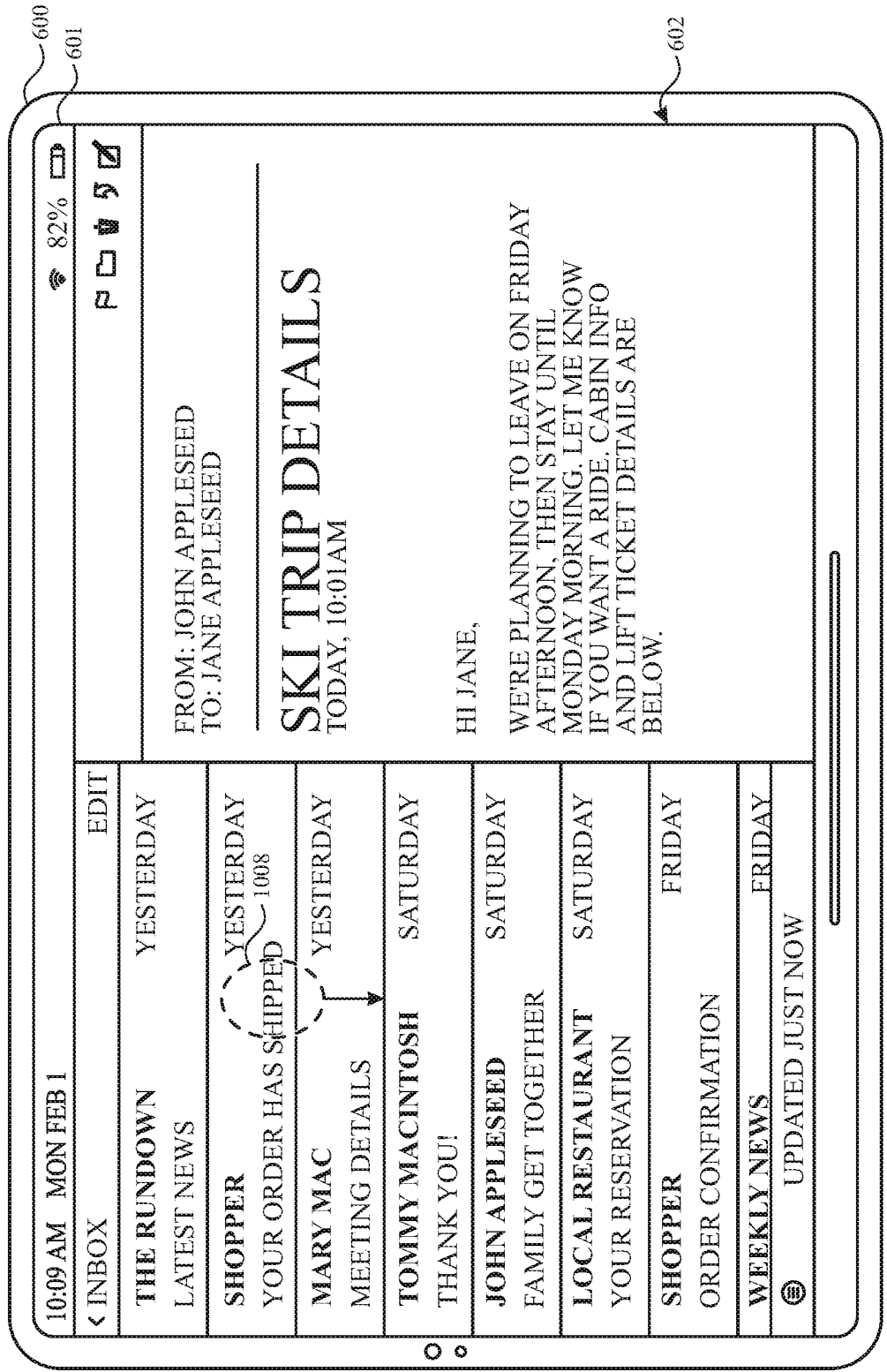
Figure 10E:
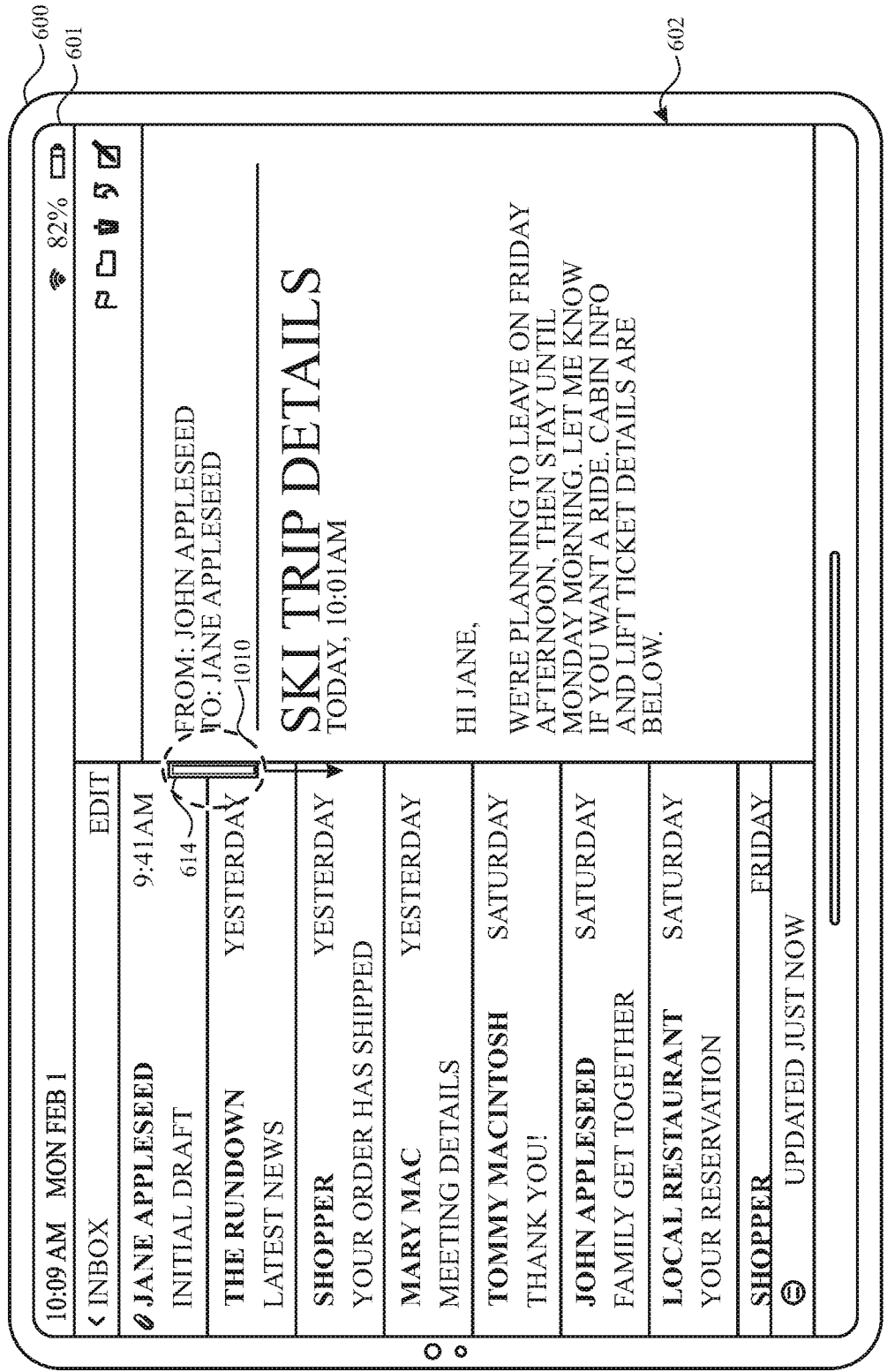

In FIG. 10D, electronic device 600 detects scroll input 1008 on items 608. In response, electronic device 600 displays scroll bar 614 and scrolls list 604, as shown in FIG. 10E. Specifically, scroll input 1008 is a swipe gesture in a downward direction on display 601. Because user interface 602 is in the first scrolling mode, list 604 scrolls up (e.g., items 608 move in a downward direction on display 601). Furthermore, scroll input 1008 is a short scroll gesture, thus, electronic device 600 scrolls list 604 a short distance, as shown in FIG. 10E.

Figure 10F:
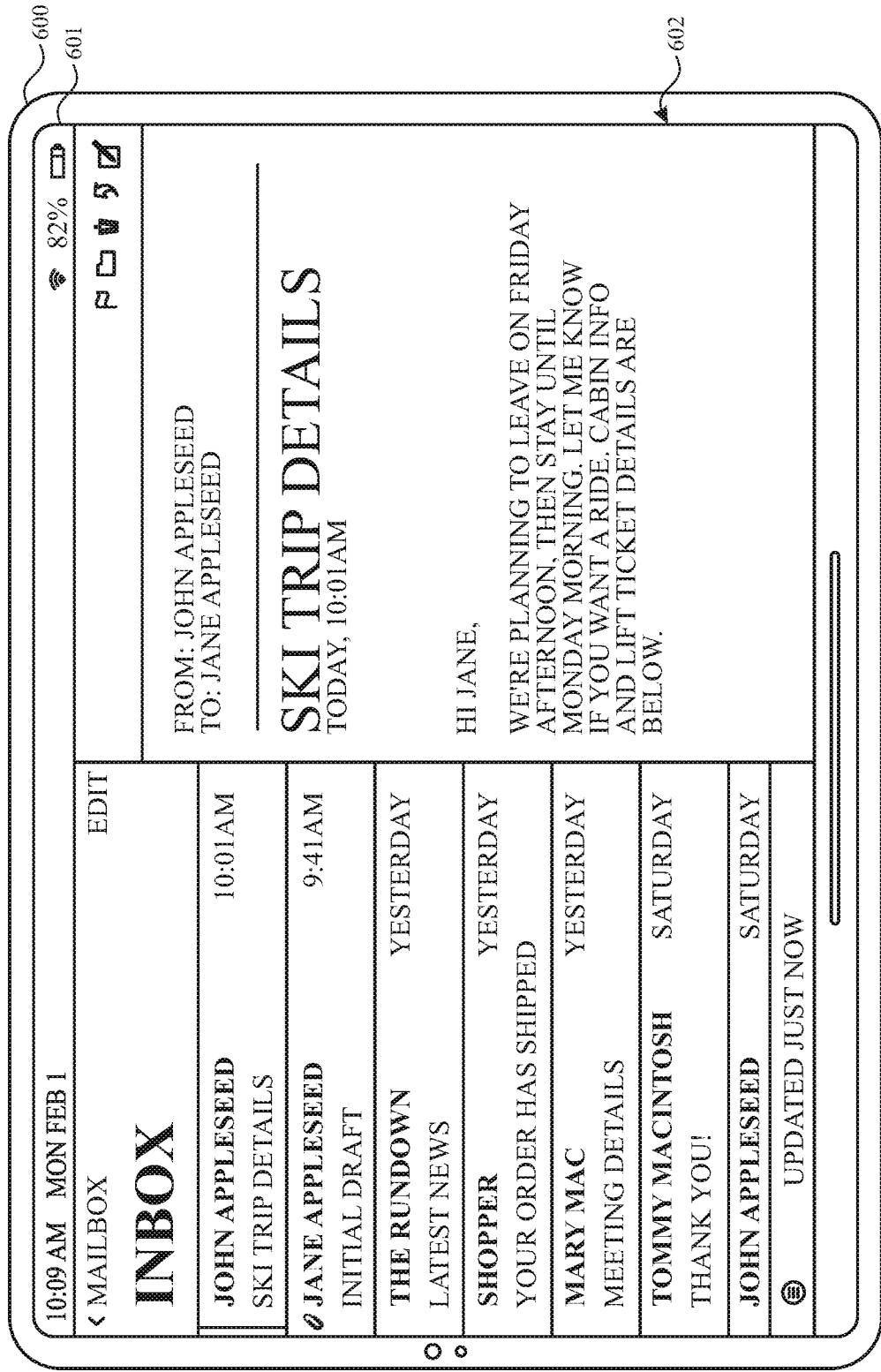

FIGS. 10E and 10F show an example embodiment in which an input on scroll bar 614 does not trigger a transition to the second scroll mode (e.g., the input does not include a stationary component, or the stationary component is too short to trigger the transition). As a result, the gesture causes electronic device 600 to scroll in the first mode, rather than the second mode.

In FIG. 10E, before scroll bar 614 disappears, electronic device 600 detects input 1010 on scroll bar 614. Input 1010 is insufficient to transition from the first scrolling mode to the second scrolling mode. For example, the user touches scroll bar 614 and drags down without waiting for scroll bar 614 to become interactive (e.g., input 1010 either does not include a stationary portion, or the stationary portion is less than a threshold amount of time needed to activate the second scrolling mode). Because input 1010 does not remain stationary on scroll bar 614 for the threshold amount of time, the electronic device remains in the first scrolling mode, and the result of input 1010 is a normal scroll gesture as shown in FIG. 10F. That is, electronic device 600 scrolls list 604 based on the magnitude and direction of movement of input 1010 by scrolling up in the list of items 608 (e.g., items 608 move in an upward direction on display 601). In FIG. 10F, electronic device 600 displays list 604 scrolled to the top, and having ceased displaying scroll bar 614.

Figure 10G:
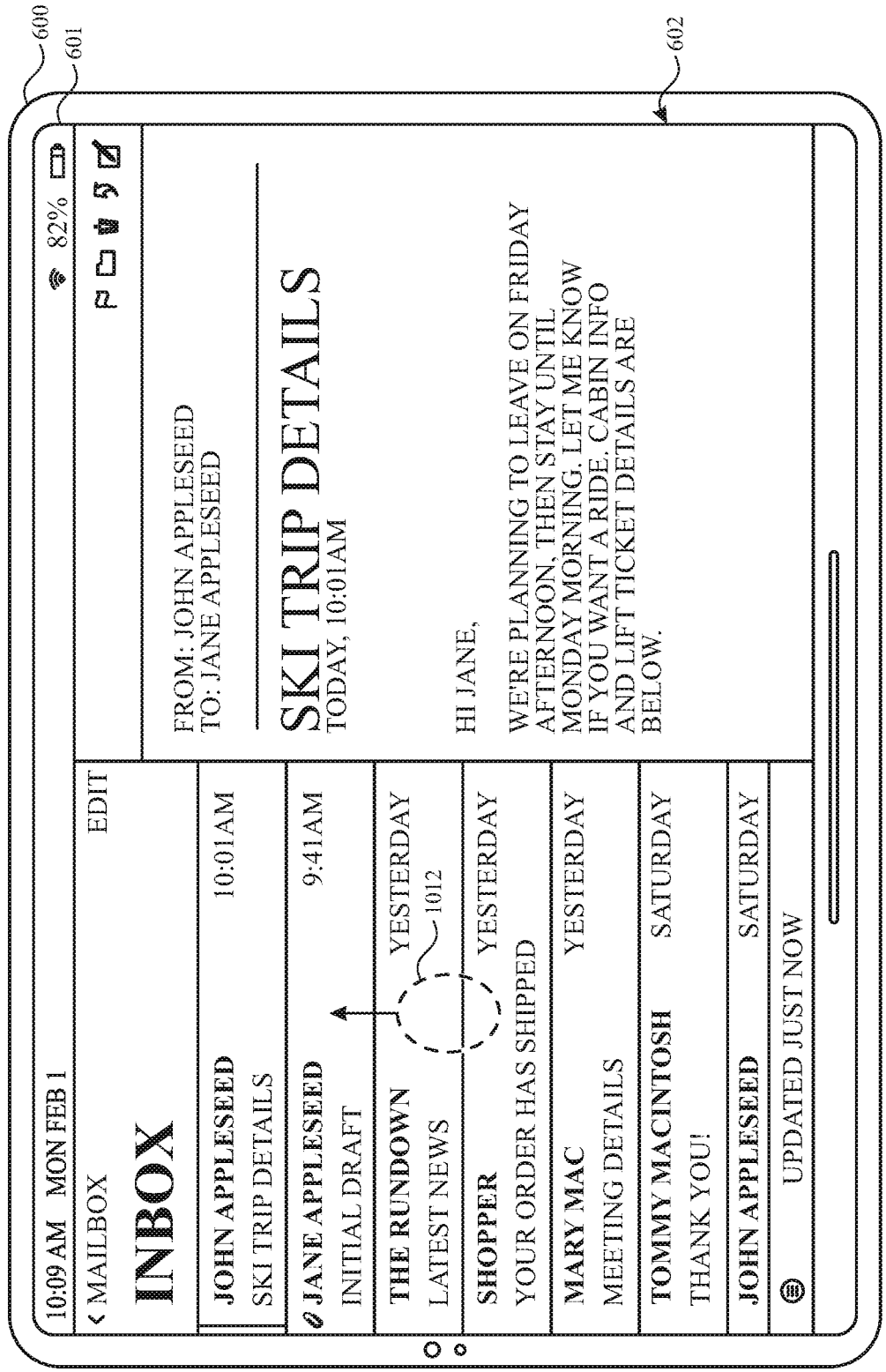
Figure 10H:
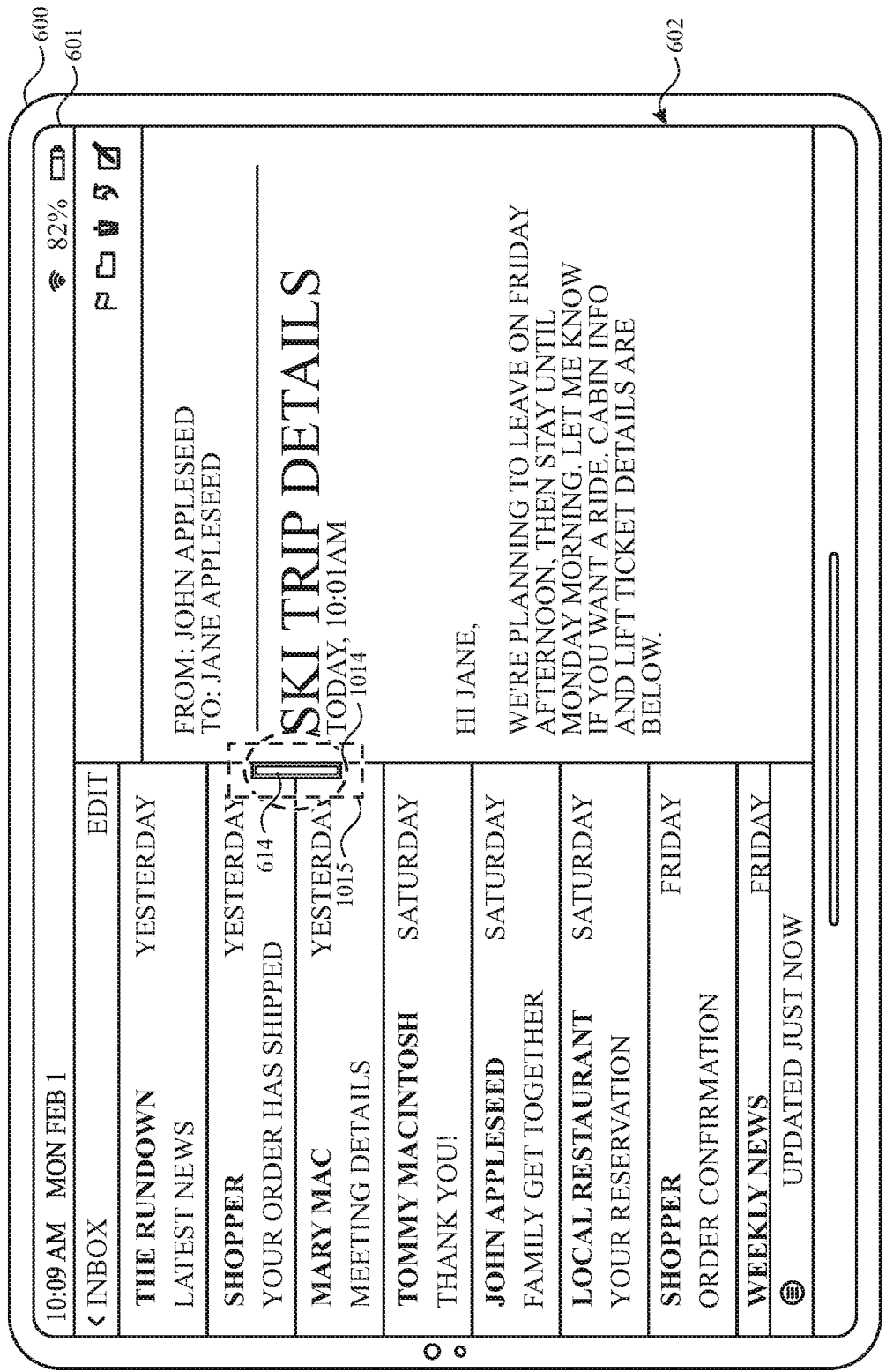
Figure 10I:
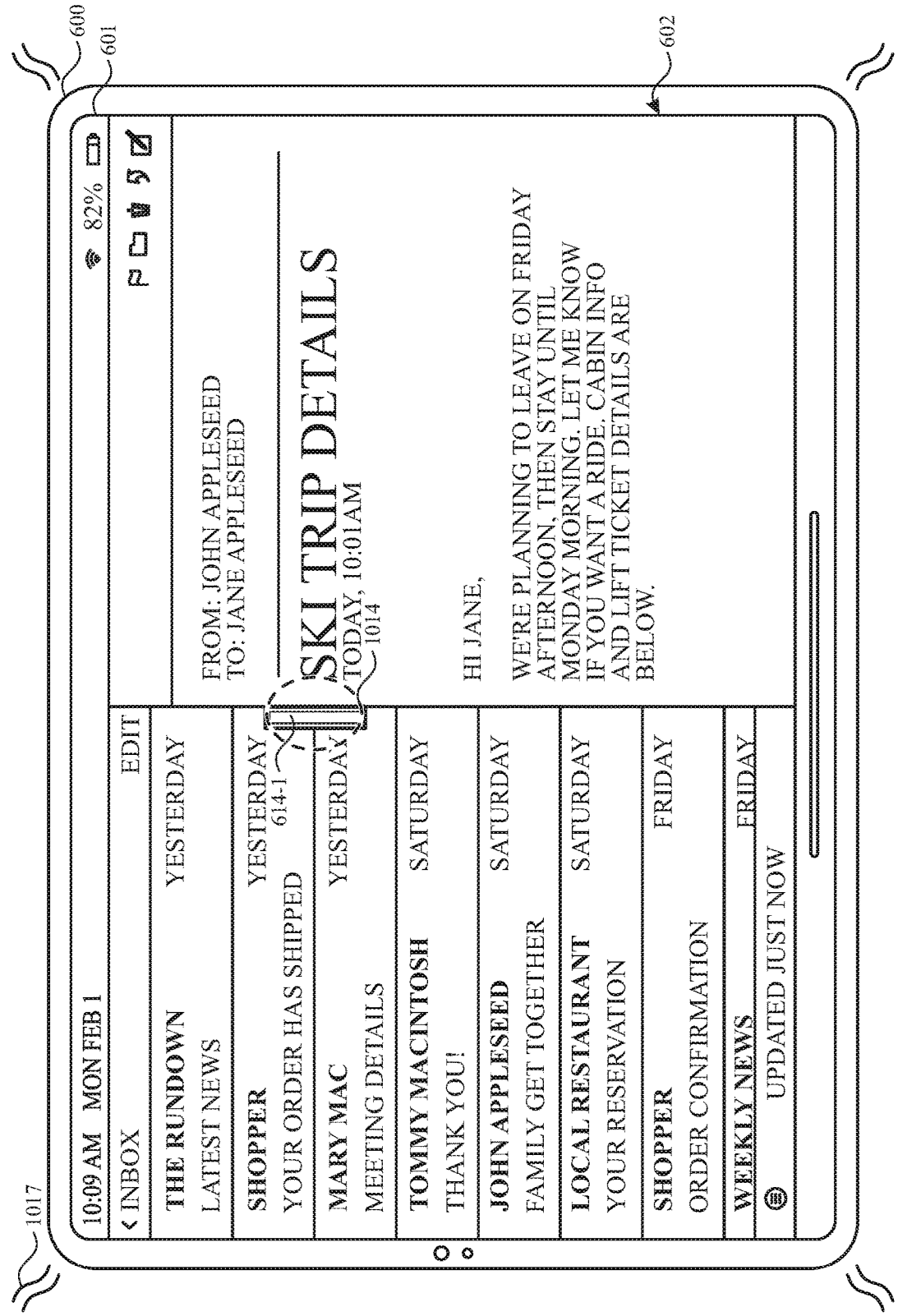

As discussed above, electronic device 600 transitions from the first scrolling mode to the second scrolling mode in response to detecting a stationary input on scroll bar 614 for at least a threshold amount of time e.g., a non-zero threshold that is greater than an amount of time for detecting a tap gesture or other touch gesture such as a swipe (e.g., input 1010)). Once electronic device 600 transitions to the second scrolling mode, the list of items is scrolled in response to movement of the input on scroll bar 614. In other words, after transitioning to the second mode, the input on scroll bar 614 is maintained and can then be moved to control scrolling in the second mode. FIGS. 10G-10I illustrate a series of inputs for causing electronic device 600 to transition from the first scrolling mode to the second scrolling mode.

For example, in FIG. 10G, electronic device 600 detects scroll input 1012 and, in response, scrolls list 604 and displays scroll bar 614. In FIG. 10H, electronic device 600 detects input 1014 on scroll bar 614. In this embodiment, input 1014 is located on scroll bar 614 (e.g., within detection region 1015), and is stationary for at least the threshold amount of time to activate the second scrolling mode. In response, the electronic device enters a second scrolling mode in which items in the list are scrolled by moving the input on scroll bar 614 (e.g., moving input 1014). In some embodiments, when the second scrolling mode is activated, electronic device 600 displays an animation in which scroll bar 614 increases in size (e.g., width and, optionally, length) as shown by enlarged scroll bar 614-1 in FIG. 10I. The animation is a visual confirmation to the user that the device is now operating in the second scrolling mode. Because the second scrolling mode is controlled by the user's continued finger placement on the scroll bar, the enlarged size of the scroll bar allows a user to more easily see the scroll bar while the user's finger is positioned on the scroll bar. In some embodiments, electronic device 600 generates tactile output 1017 (e.g., a haptic response) (e.g., a tactile output with or without an audio output) when it transitions to the second scrolling mode.

In some embodiment, when the electronic device transitions to the second scrolling mode, the electronic device displays scroll bar 614 having an appearance of a scroll bar that includes a thumb portion that is displayed positioned in a trough portion (e.g., the trough portion extends between edges 1004 and 1006). In such embodiments, the list is scrolled by dragging the thumb within the trough.

As briefly mentioned above, in some embodiments, when electronic device 600 detects inputs within detection region 1015 around scroll bar 614, the electronic device considers the input to be located on the scroll bar. In some embodiments, the size of detection region 1015 is dynamic. In other words, when the scroll bar has a smaller size, the detection region is smaller in size, and when the scroll bar is larger, the detection region is larger. In some embodiments, detection region 1015 is always larger than the size of scroll bar 614.

FIGS. 10I-10O illustrate an example embodiment in which list 604 is scrolled in the second scrolling mode.

Figure 10J:
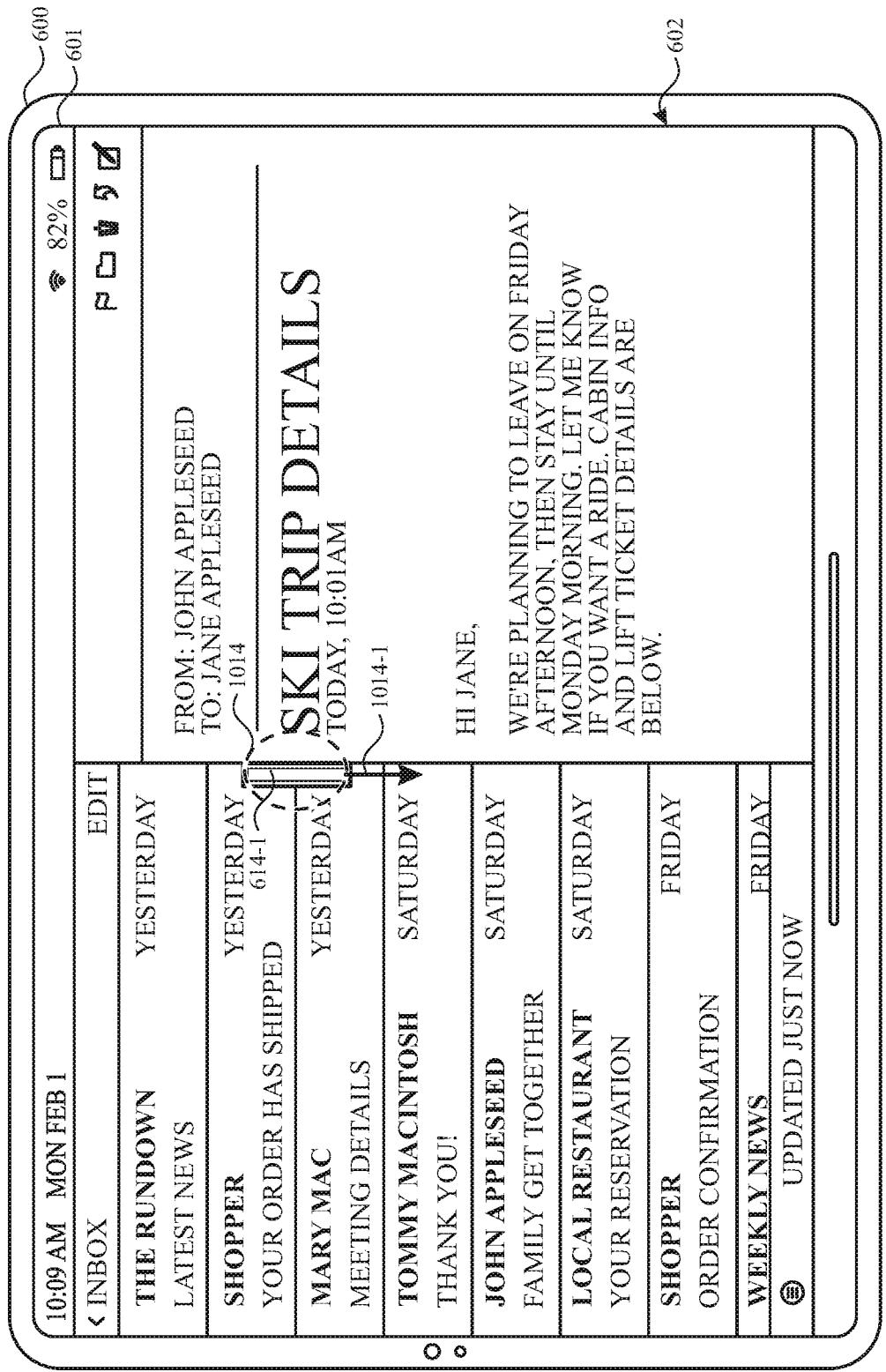
Figure 10K:
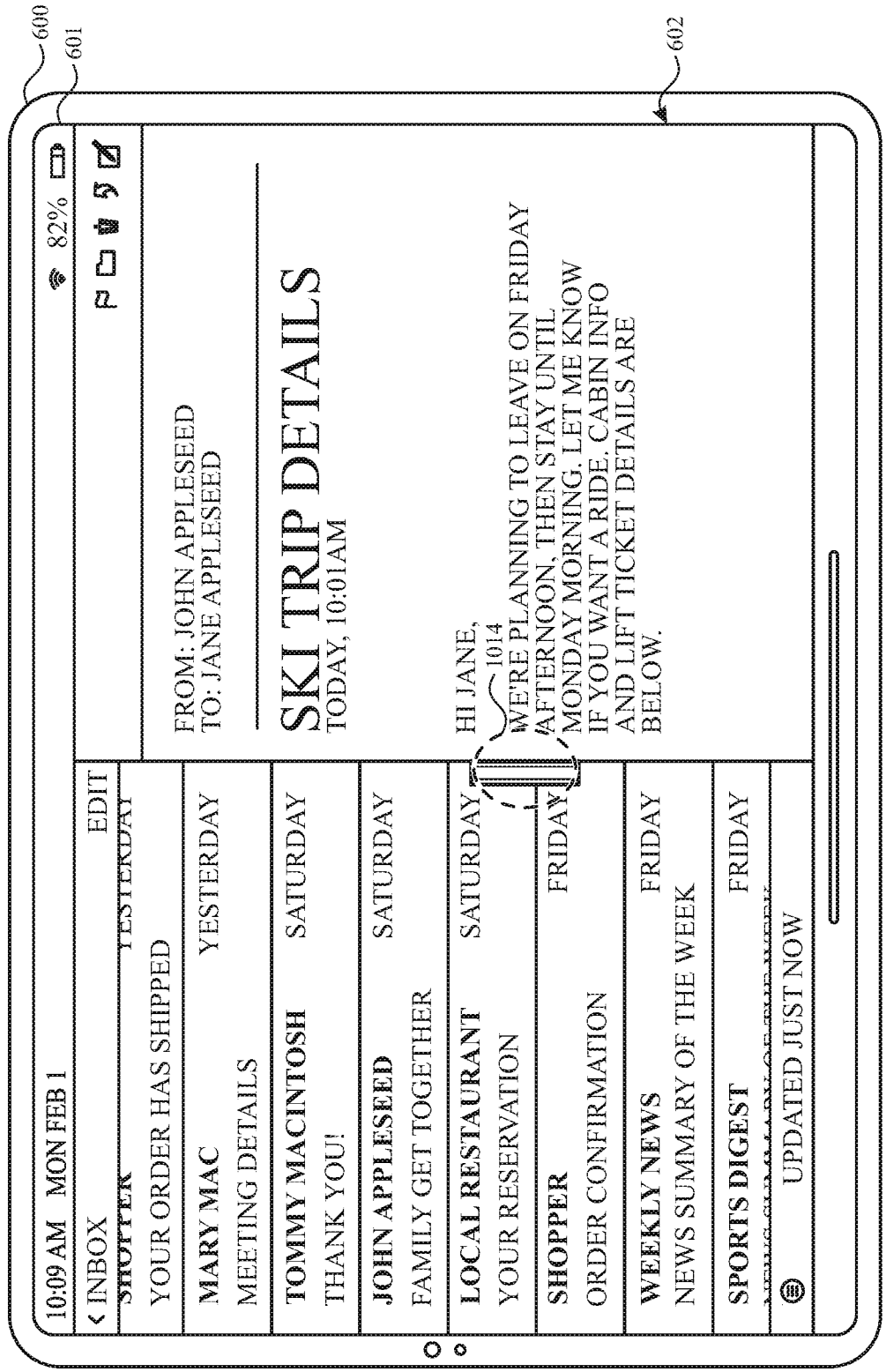

In FIG. 10I, electronic device 600 is in the second scrolling mode (e.g., as indicated by enlarged scroll bar 614-1) and continues to detect input 1014 maintained on enlarged scroll bar 614-1. In FIG. 10J, the electronic device detects movement 1014-1 of input 1014 (e.g., a downward drag) and, in response, scrolls list 604 in response to detected movement 1014-1 of input 1014. Because the electronic device is in the second scrolling mode, the list is scrolled in the direction of movement 1014-1. For example, list 604 is scrolled down with movement 1014-1 (e.g., items 608 move in an upward direction), as shown in FIG. 10K. It should be appreciated that list 604 can be scrolled in an opposite direction (e.g., up) by a drag gesture in an upward direction. For comparison, if electronic device was in the first scrolling mode, downward movement 1014-1 would have instead caused the list to scroll up (e.g., items 608 would have moved in a downward direction).

FIGS. 10L-10O demonstrate another scrolling response of electronic device 600 while in the second scrolling mode. In this example, a user continues the input on the scroll bar then flicks their finger in an upward direction (e.g., towards the top of display 601). In response, the electronic device causes the user interface to jump to the beginning of the list. It should be understand that a flick in a downward direction (e.g., towards the bottom of display 601) would cause the electronic device to jump to the end of the list.

Figure 10L:
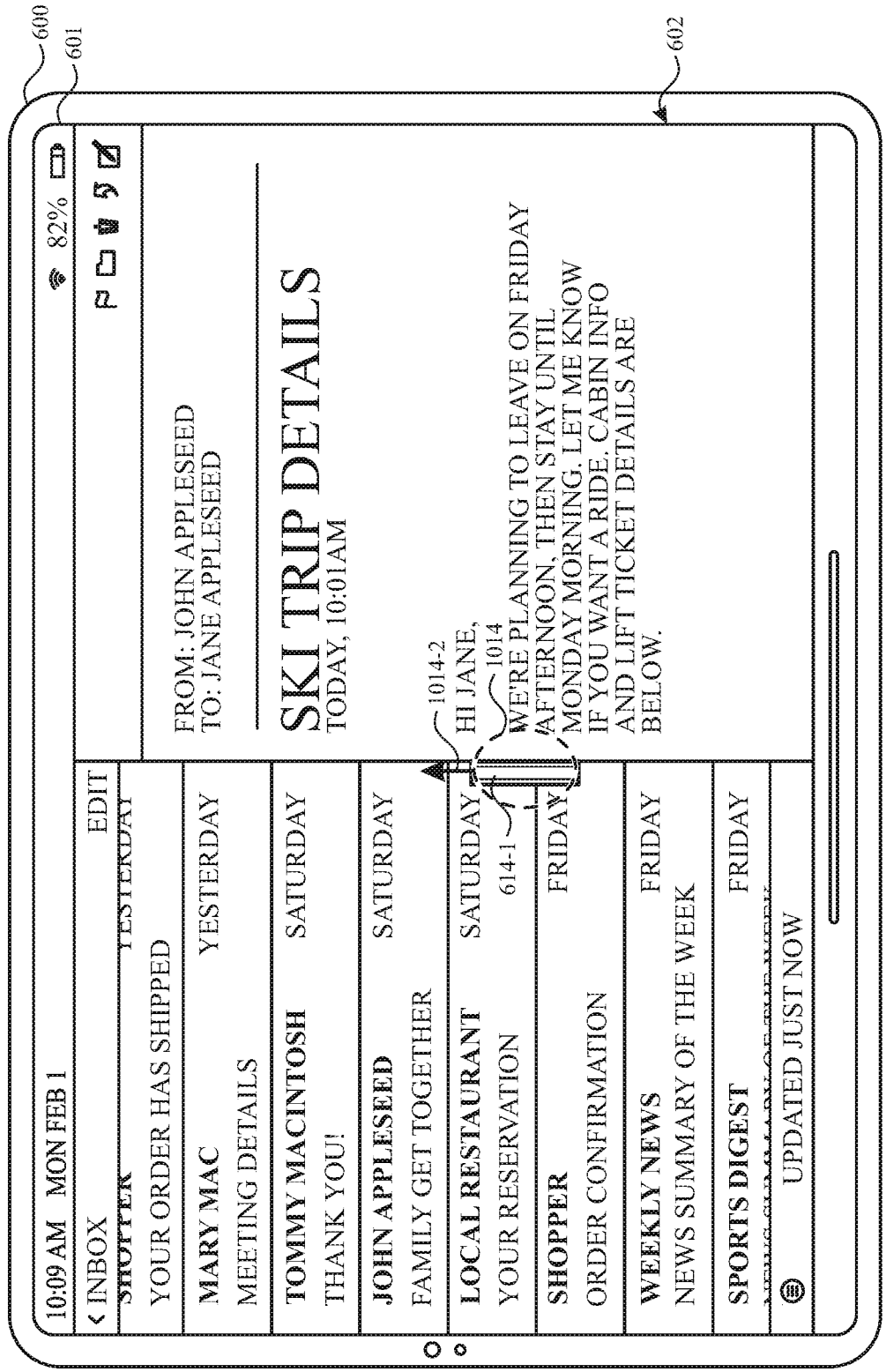
Figure 10M:
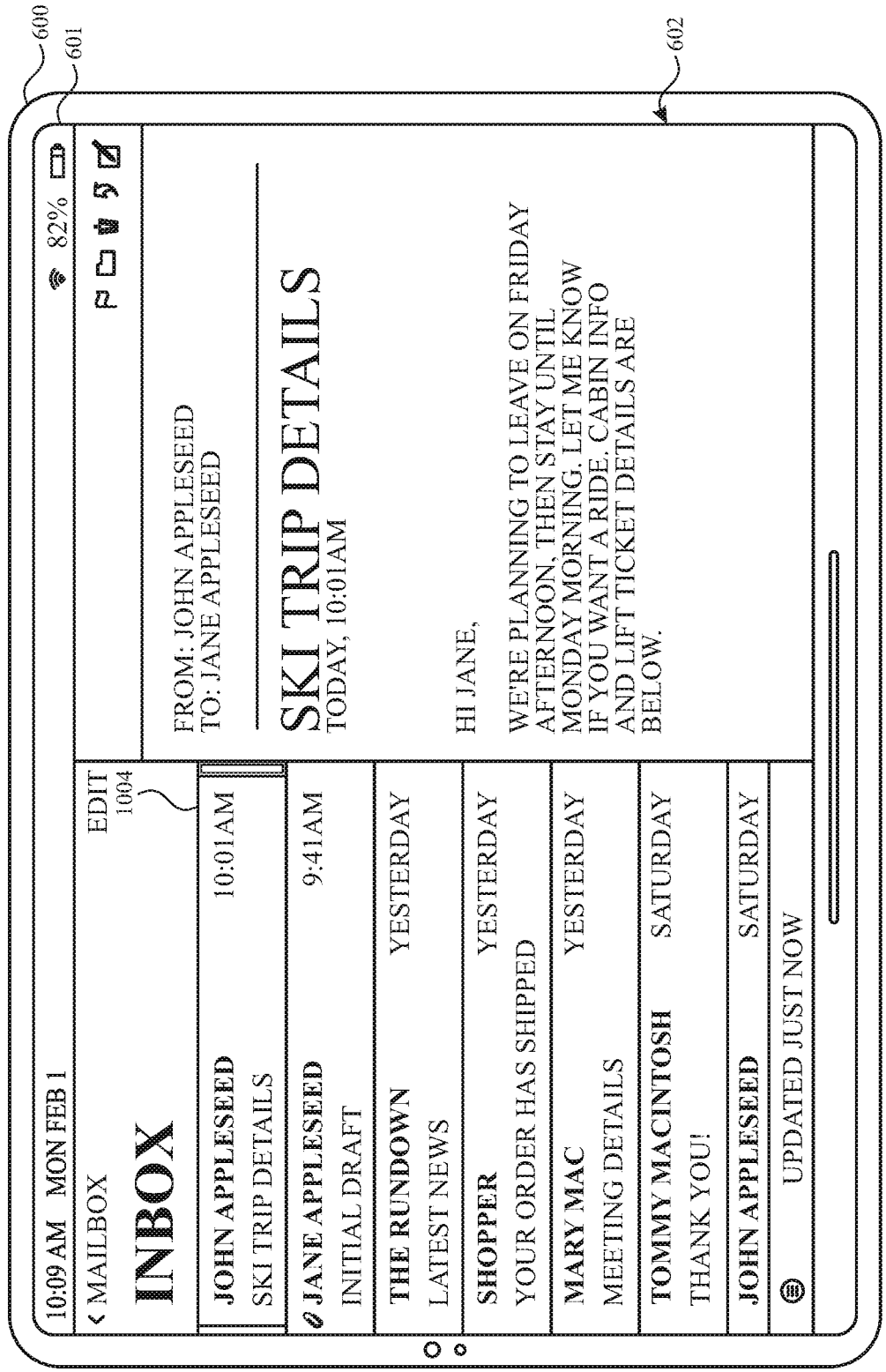

In FIG. 10L, electronic device 600 continues to detect input 1014 on enlarged scroll bar 614-1 and detects subsequent movement 1014-2, which is a flick gesture (e.g., a short movement followed by termination of input 1014) in an upward direction (e.g., towards the top of list 604). In response, the electronic device jumps (e.g., scrolls quickly) to the beginning of list 604. In some embodiments, the jump to the beginning of the list includes displaying the list scrolling quickly to the beginning of the list. In some embodiments, the jump to the beginning of the list is instantaneous (e.g., the list is not shown scrolling). Scroll bar 614 moves to edge 1004 and returns to the original appearance (e.g., thinner and, optionally, shorter), as shown in FIG. 10M.

Figure 10N:
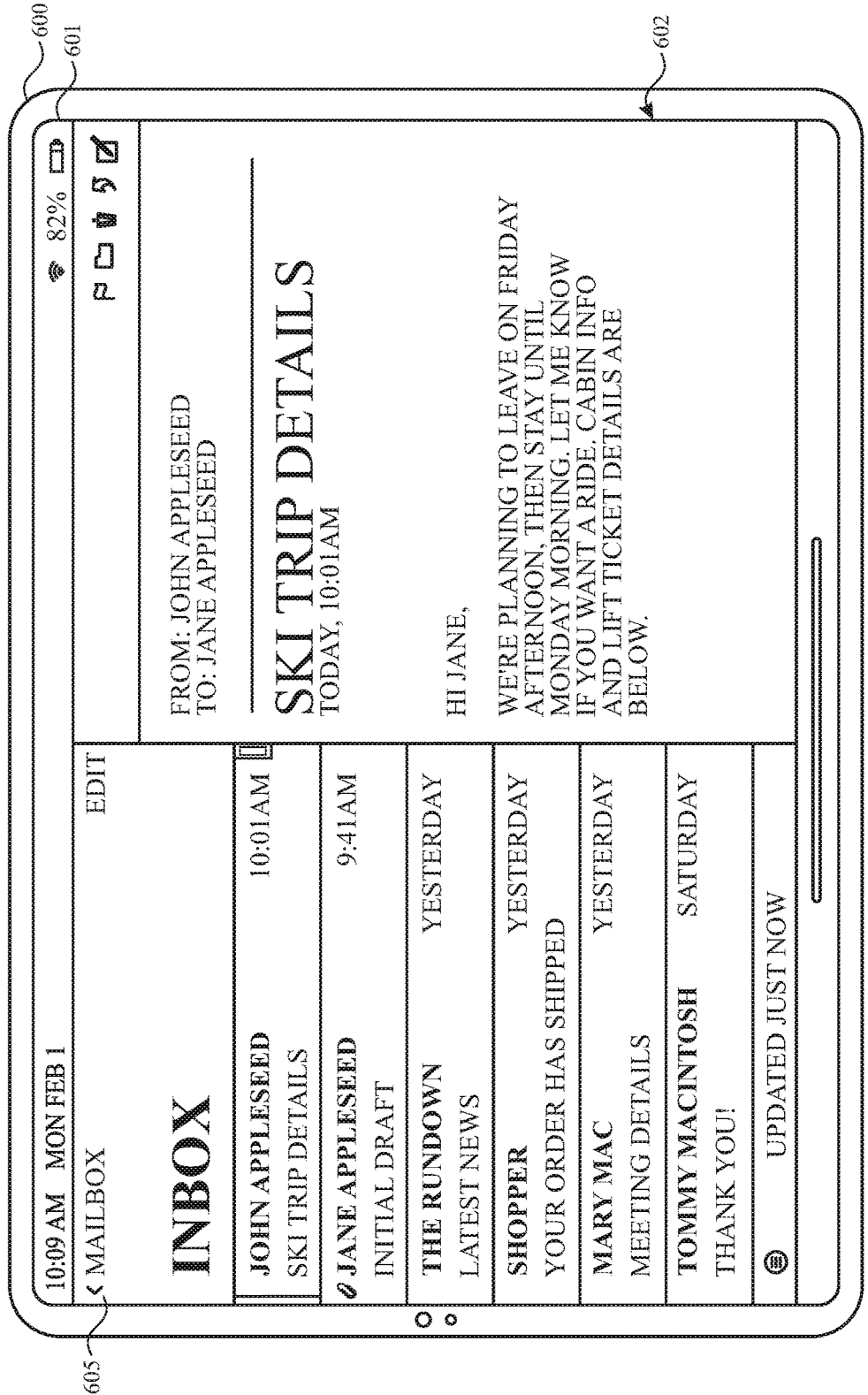
Figure 10O:
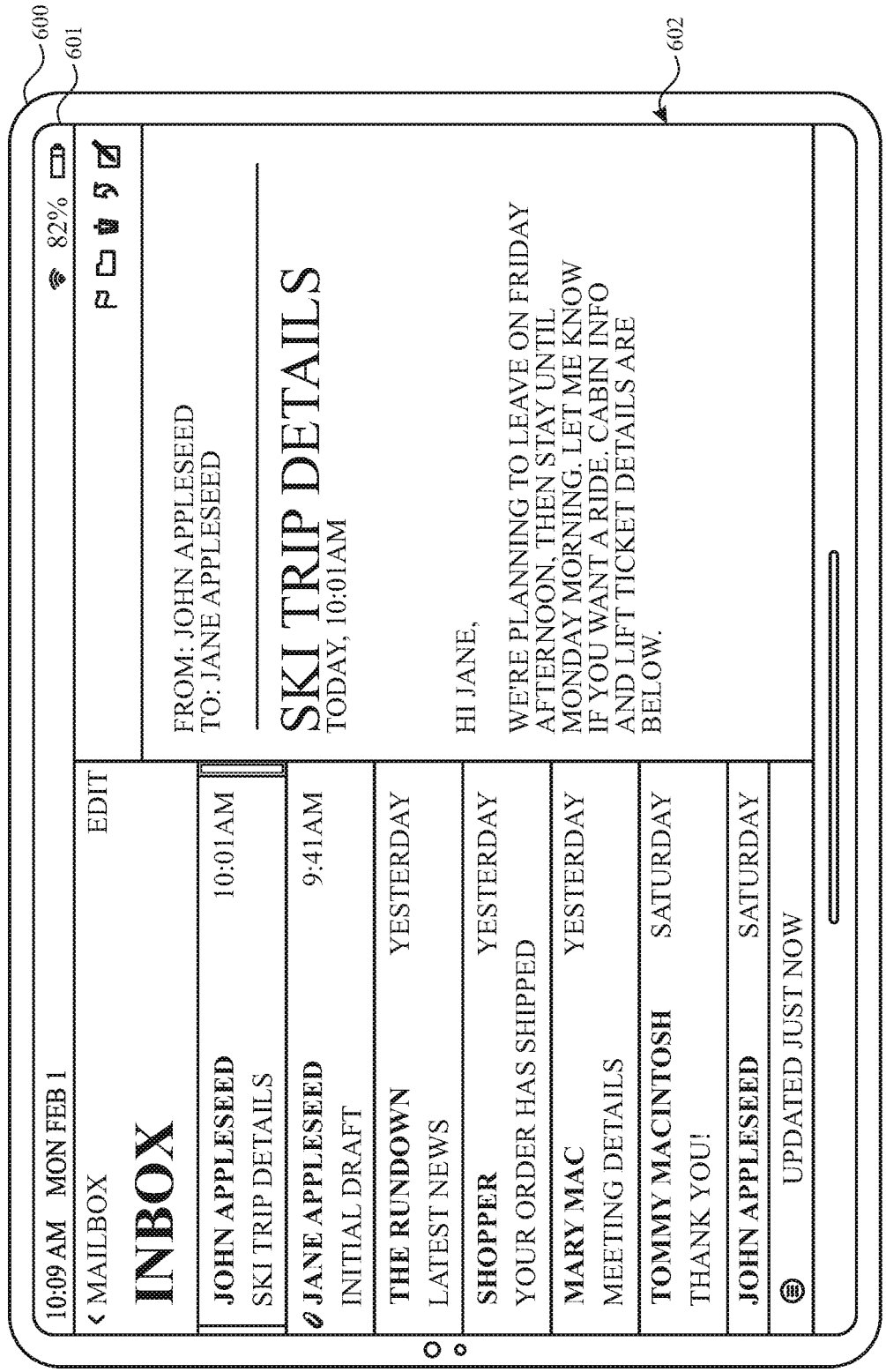

In some embodiments, the flick operation is displayed with a "rubber banding" animation shown in FIGS. 10N and 10O. In the rubber banding operation, header region 605 stretches downward and scroll bar 614 compresses when it reaches edge 1004, as shown in FIG. 10N. Header region 605 then returns to its previous appearance and scroll bar 614 decompresses back to its previous size, as shown in FIG. 10O. This rubber banding animation gives the appearance of scroll bar 614 having been briefly compressed due to the inertia of moving quickly to the top of the list by the flick gesture. It should be appreciated that the flick gesture can be performed in the opposite direction to scroll to the opposite end of the list. For example, if the user flicks the scroll bar to the bottom of display 601 (e.g., a downward flick), the list of items is scrolled to the end of the list in a manner analogous to that described above with respect to an upward flick.

FIGS. 11P-10W illustrate various embodiments in which the second mode of scrolling is performed using an indexed scrubbing indicator. FIGS. 10P-10T show an embodiment in which the indexed scrubbing indicator is displayed centered at the location of the input that initiates the transition to the second scrolling mode. FIGS. 10U-10V show an embodiment in which the indexed scrubbing indicator is displayed at a center region of the displayed list. FIG. 10W shows an embodiment in which the indexed scrubbing indicator is displayed adjacent the input that initiates the transition to the second scrolling mode. In some embodiments, the indexed scrubbing indicator is displayed in response to an input on the scroll bar. In some embodiments, the indexed scrubbing indicator is displayed when the user touches the edge of list 604 (e.g., in are region where the scroll bar is typically displayed), even when the scroll bar is not displayed.

Figure 10P:
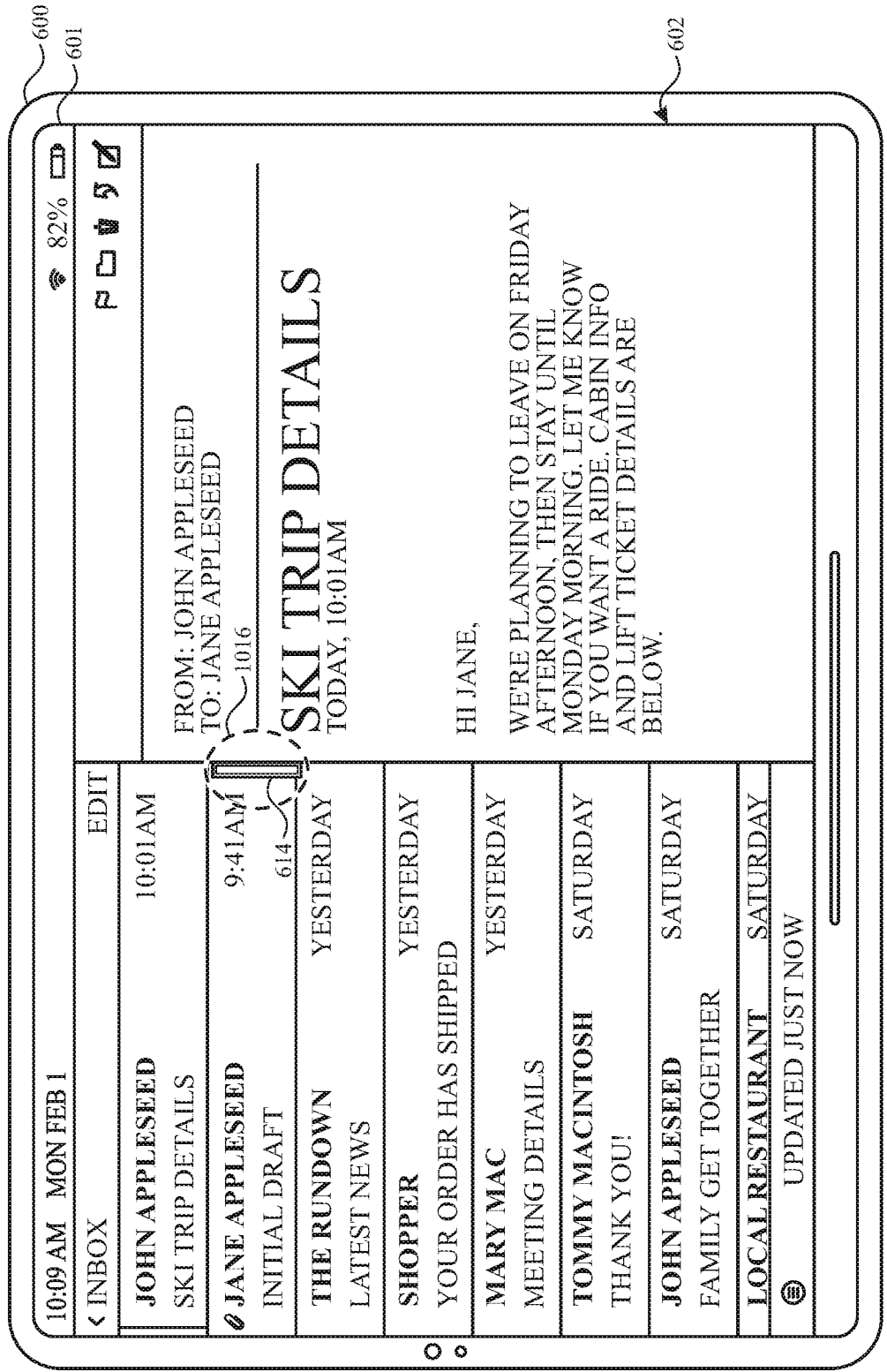
Figure 10Q:
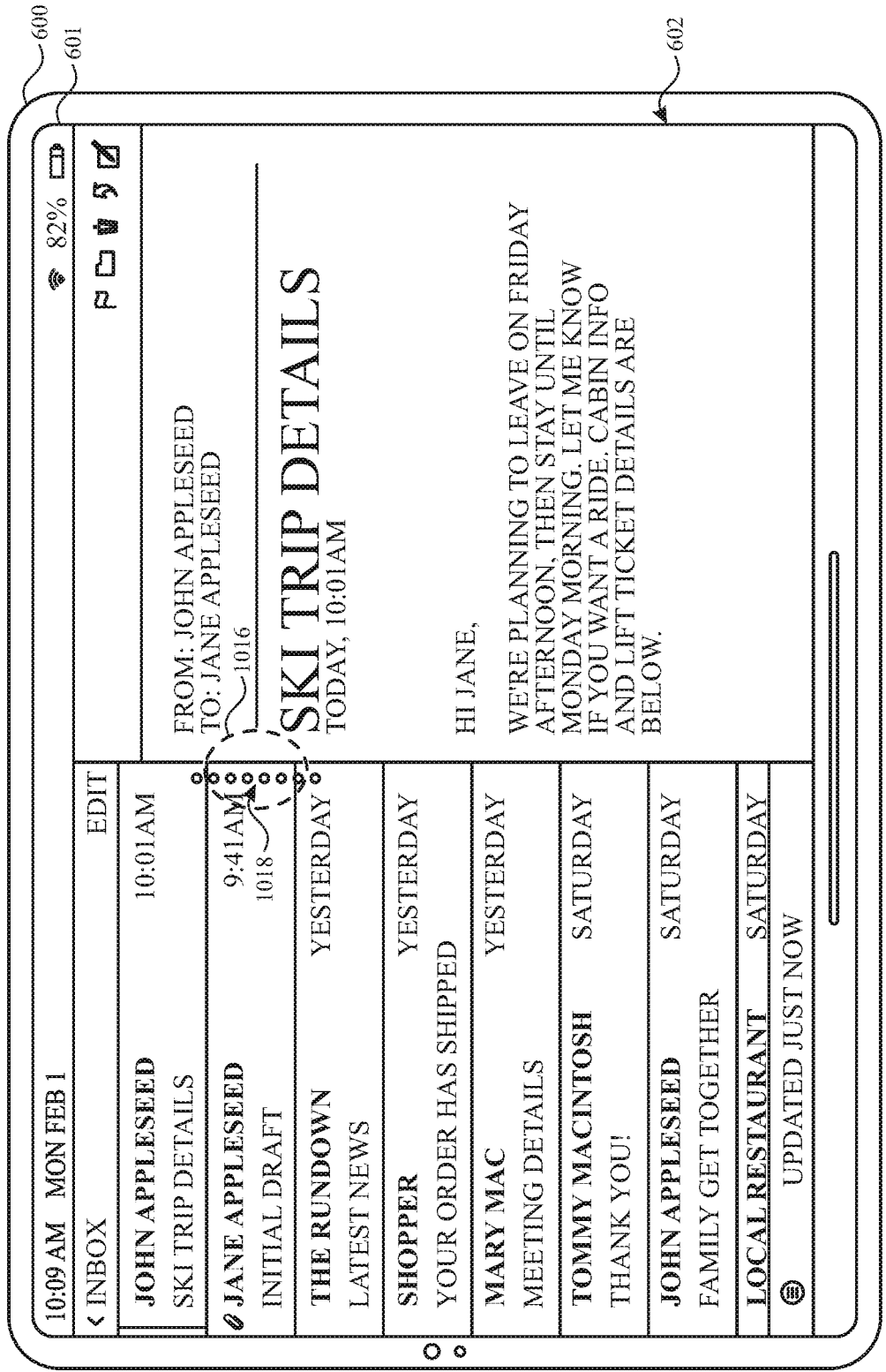
Figure 10R:
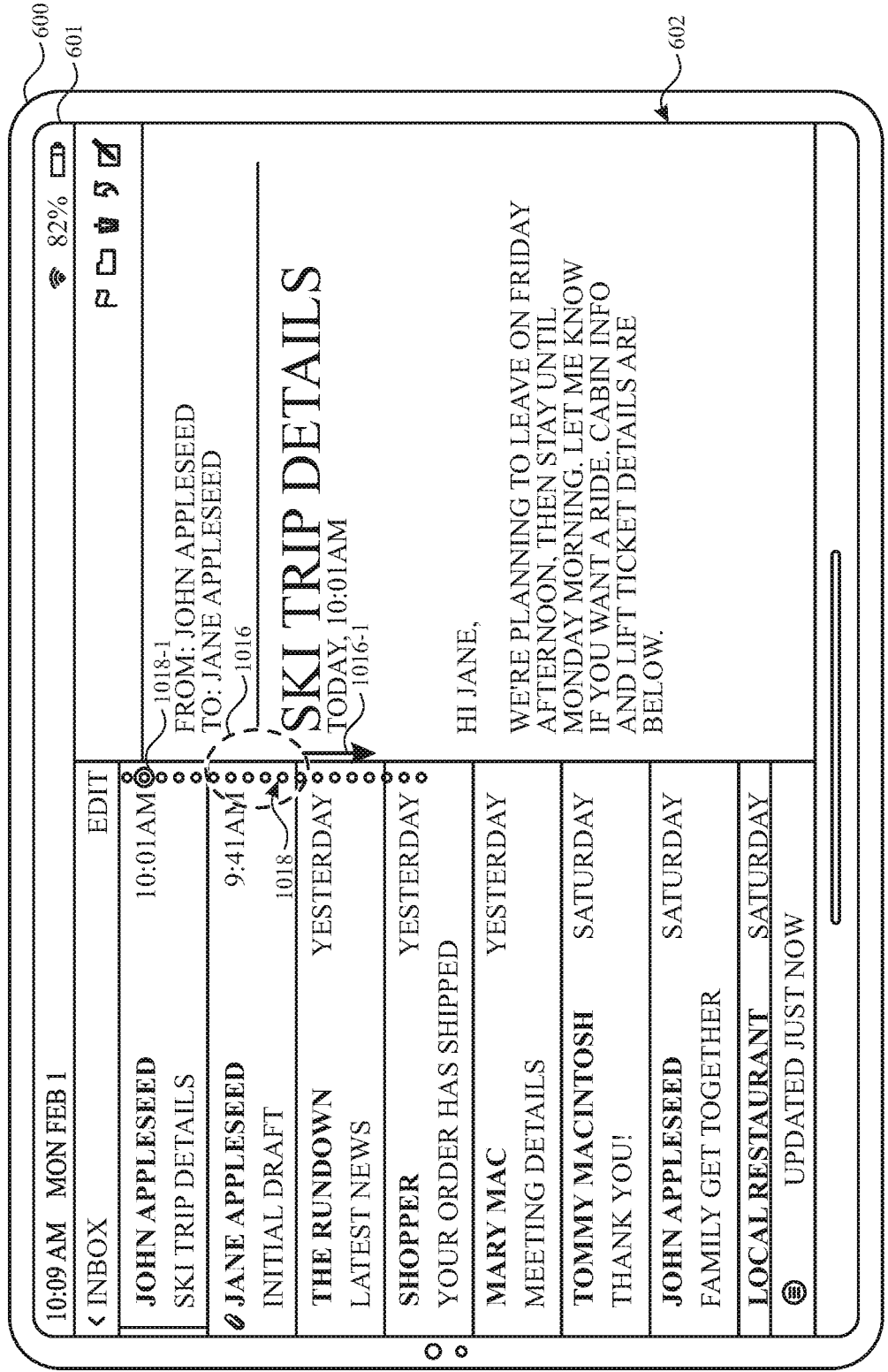

FIG. 10P shows user input 1016 detected on scroll bar 614, causing the electronic device to transition from the first scrolling mode to the second scrolling mode. Scroll bar 614 is positioned towards the top of list 604. As input 1016 is maintained, the electronic device replaces scroll bar 614 with indexed scrubbing indicator 1018. In FIGS. 10Q and 10R, indexed scrubbing indicator 1018 is displayed in an animation in which the indexed scrubbing indicator appears at the location of input 1016, and expands from the location of input 1016, but having a position that is centered at the location of input 1016. In some embodiments, indexed scrubbing indicator 1018 is displayed without the expanding animation.

Figure 10S:
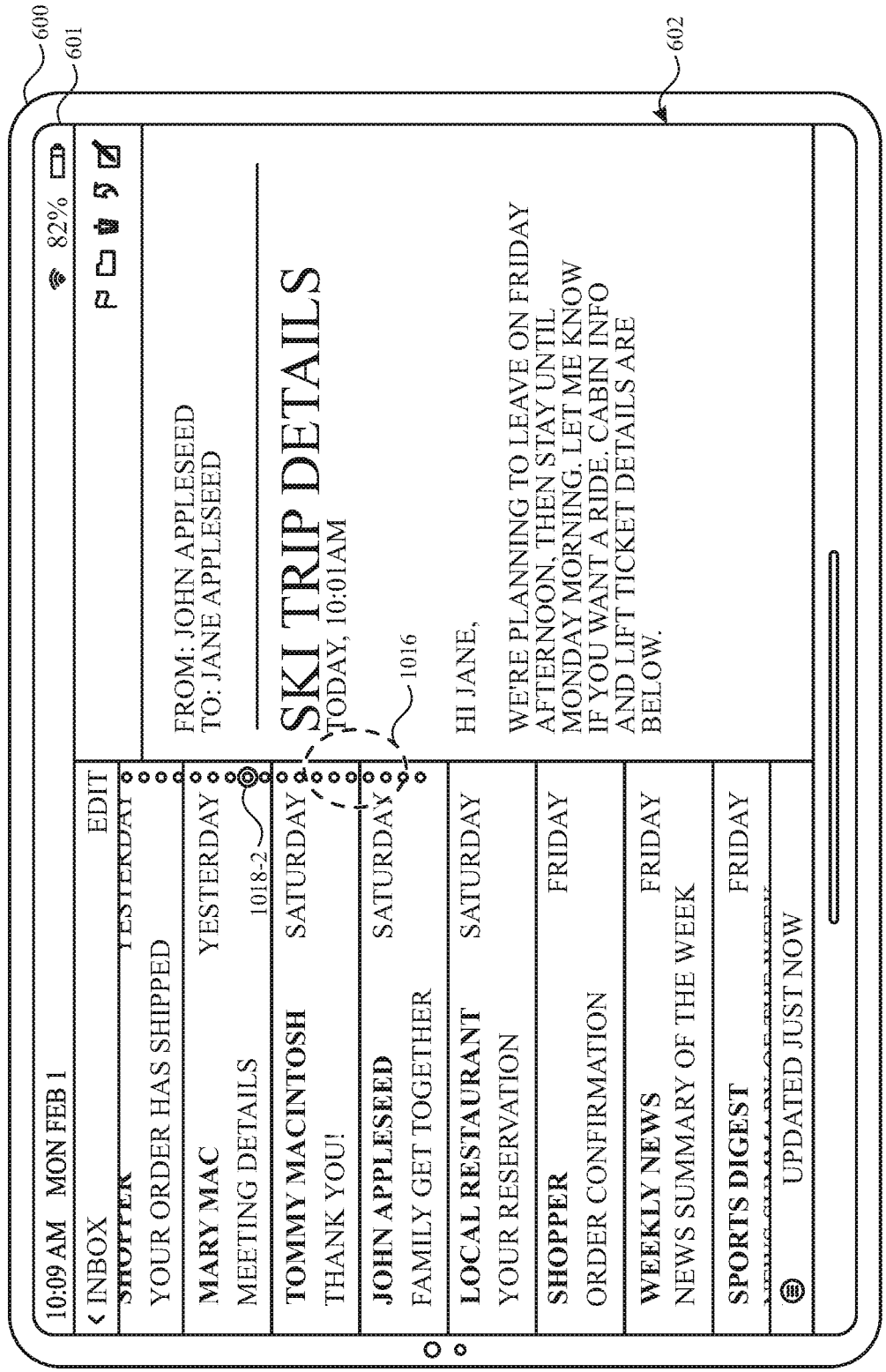

In FIG. 10R, input 1016 is maintained, and indexed scrubbing indicator 1018 is displayed having a series of index points corresponding to relative scrollable positions in list 604. As shown in FIG. 10R, index point 1018-1 is selected, indicating the current scrollable position in the index of scrollable positions represented by indexed scrubbing indicator 1018. Electronic device 600 detects movement 1016-1 of input 1016 in a downward direction and, in response, scrolls list 604 to the indexed scrolling position corresponding to the movement of input 1016, as shown in FIG. 10S. Index point 1018-2 is selected in FIG. 10S to indicate the updated scrolled position of list 604 relative to the index of scrollable positions represented by indexed scrubbing indicator 1018.

Figure 10T:
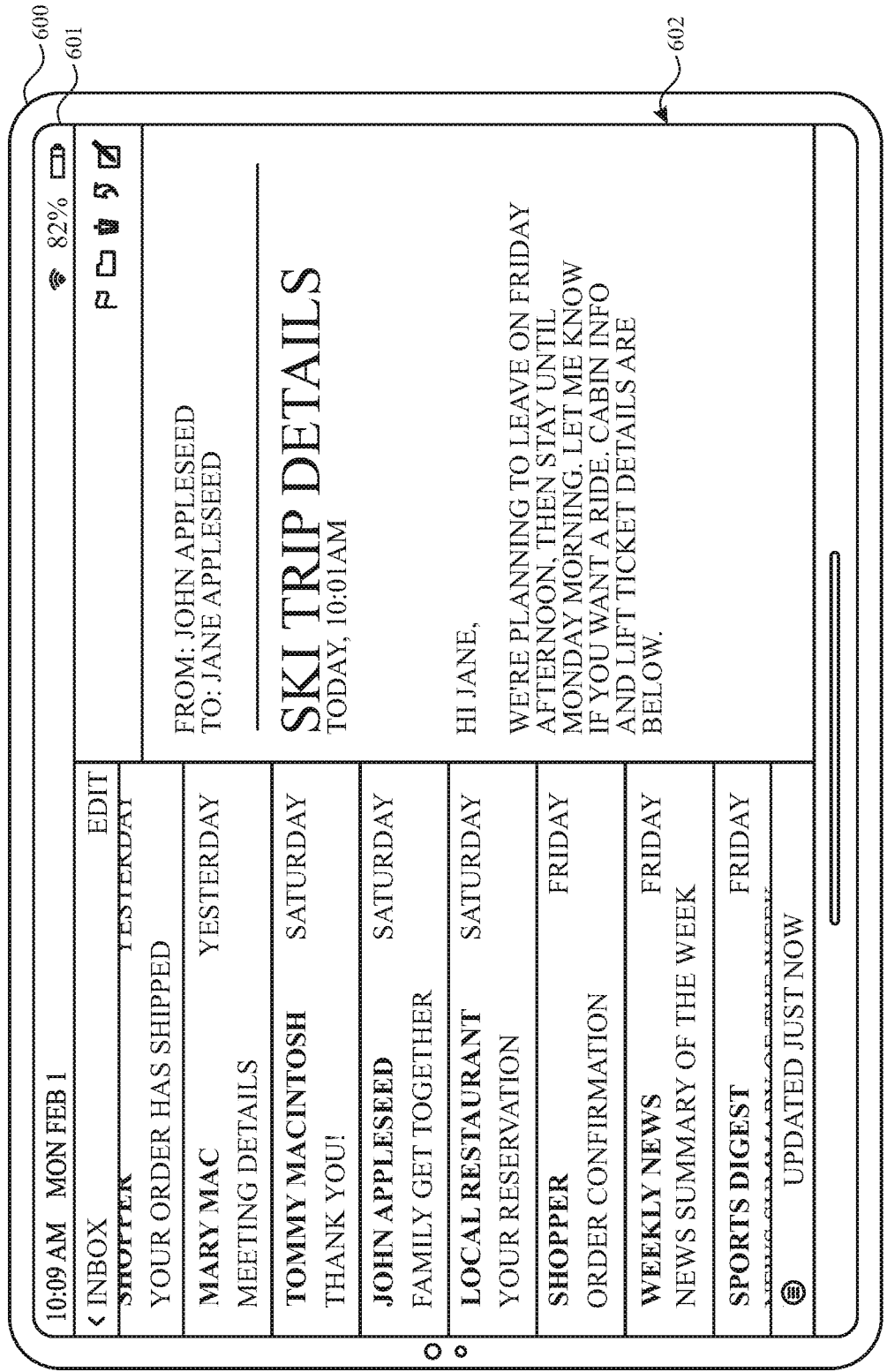
Figure 10U:
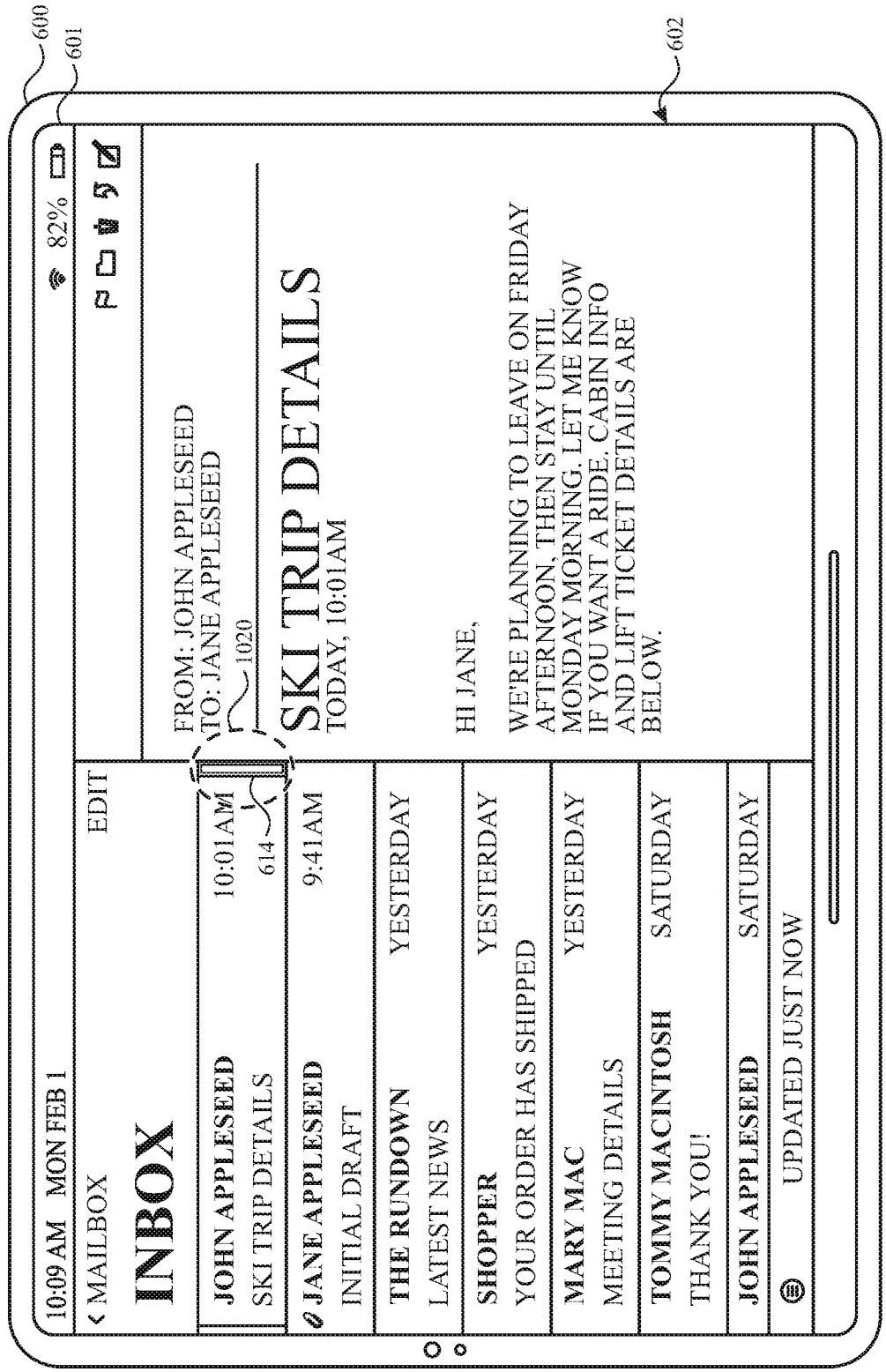
Figure 10V:
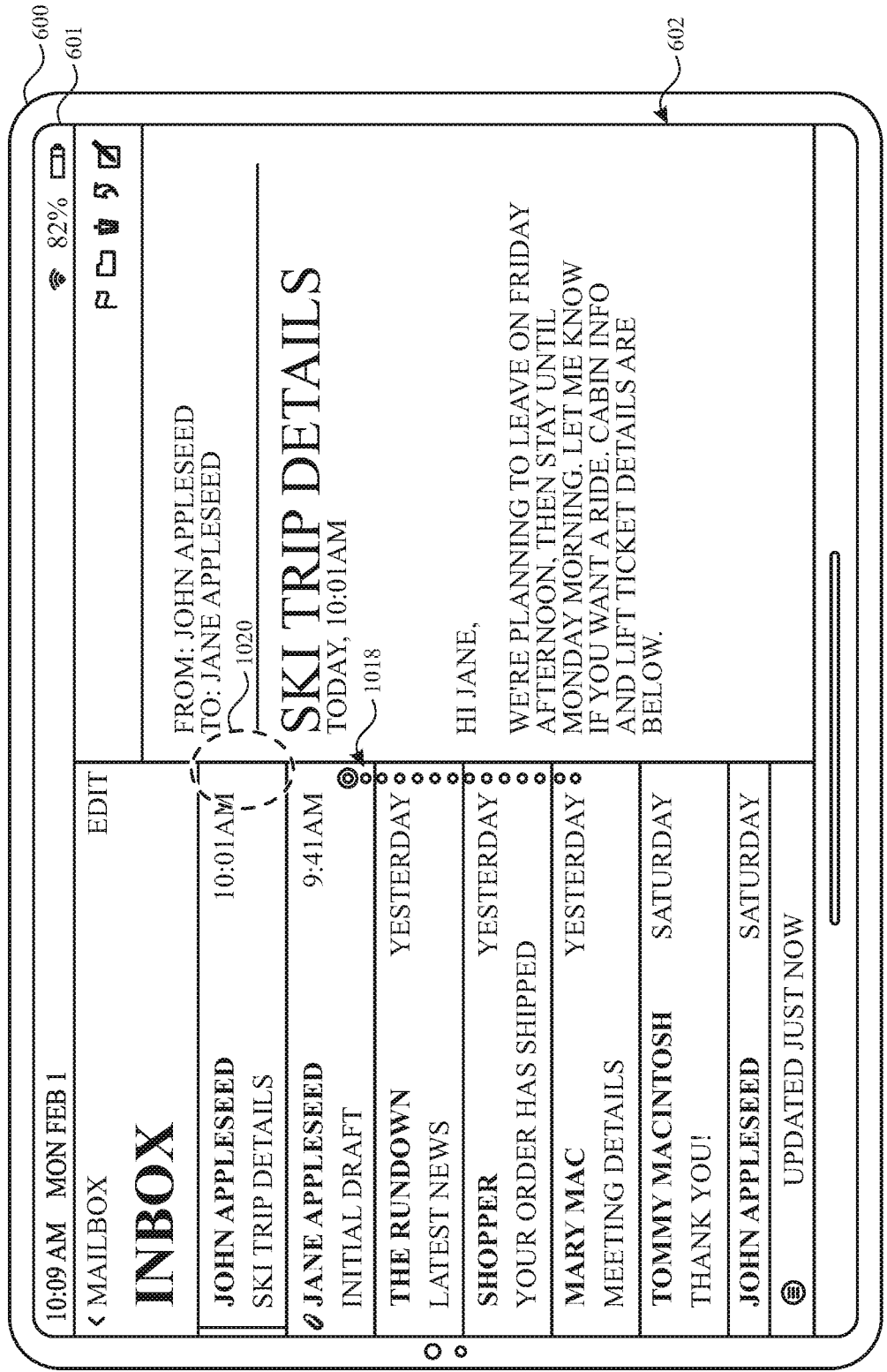

In FIG. 10T, electronic device 600 detects termination of input 1016 and, in response, ceases displaying indexed scrubbing indicator 1018 and transitions back to the first scrolling mode.

FIGS. 10U-10W illustrate alternate embodiments in which the indexed scrubbing indictor is displayed at different locations. In FIGS. 10U and 10V, indexed scrubbing indicator 1018 is displayed at approximately a center location of list 604. In FIG. 10U, electronic device detects input 1020 at scroll bar 614 (or, optionally, at a side edge of list 604 when scroll bar 614 is not displayed), causing electronic device to transition to the second scrolling mode and display indexed scrubbing indicator 1020 at a center location of list 604, as shown in FIG. 10V.

In FIG. 10W, electronic device 600 detects input 1022 on list 604 and displays indexed scrubbing indicator 1018 at a location adjacent input 1022. This embodiment can be implemented when the input is located at or near an edge of list 604 (e.g., edge 1004 or edge 1006) (rather than the embodiment in which indexed scrubbing indicator 1018 is displayed centered on contact). In such situations, the indexed scrubbing indicator is displayed on a side of the input that is opposite the nearby edge. For example, if the input is located at or near top edge 1004, indexed scrubbing indicator 1018 is displayed at and below the input. Conversely, if the input is located at or near bottom edge 1006, indexed scrubbing indicator 1018 displayed at and above the input. This embodiment can be implemented in an analogous manner when the contact is located at or near an edge of display 601.

Indexed scrubbing indicators 1018 displayed in FIGS. 10V and 10W behave in the same manner as indexed scrubbing indicator 1018 displayed in FIGS. 10R and 10S described above.

The embodiments discussed above offer benefits over traditional scrolling methods, such as those that persistently display a scroll bar and, optionally, a scroll track, and those that use a cursor or mouse to interact with the scroll bar. For instance, the foregoing embodiments allow for aggressive scrolling of many items without requiring the display of additional UI components, such as a cursor for selecting a scroll bar. Accordingly, the embodiments described above allow for a more streamlined and simplified scrolling user interface that, due to its decluttered nature, can be implemented on devices with smaller form factors such as wearable devices and mobile devices.

FIG. 11 is a flow diagram illustrating a method for selecting and scrolling items using an electronic device in accordance with some embodiments. Method 1100 is performed at a device (e.g., 100, 300, 500, 600) with a display and a touch-sensitive surface. Some operations in method 1100 are, optionally, combined, the orders of some operations are, optionally, changed, and some operations are, optionally, omitted.

As described below, method 1100 provides an intuitive way for scrolling a user interface. The method reduces the cognitive burden on a user for navigating user interfaces are various rates, thereby creating a more efficient human-machine interface. For battery-operated computing devices, enabling a user to scroll user interfaces faster and more efficiently conserves power and increases the time between battery charges.

An electronic device (e.g., 600) with a display (e.g., 601) and a touch-sensitive surface (e.g., 601) (e.g., 112) displays (1102), via the display, a user interface (e.g., 602) that includes a plurality of items e.g., 608) (e.g., a listing of graphical objects such as, for example, messages (e.g., emails, text messages), pictures, files, etc.).

The electronic device detects (1104) a first input (e.g., 1012) that corresponds to a request to scroll the user interface.

In response to detecting the first input 1012), the electronic device scrolls (1106) the user interface and displays (1106) (e.g., temporarily displays; initially displays; introduces display of the scroll progress indicator; e.g., the scroll progress indicator is not displayed prior to scrolling) a scroll progress indicator (e.g., 614) (e.g., a graphical object that includes a scroll track (e.g., trough/gutter) (e.g., a distance between edges 1004 and 1006) representing the scrollable range of the user interface (e.g., 604) and a scroll bar (e.g., 614) (e.g., thumb) that represents the position of the displayed portion of the user interface in the context of the entire scrollable range of the user interface). In some embodiments, the electronic device displays the scroll progress indicator for a predetermined amount of time, unless contact is detected on the scroll progress indicator, in which case the time for displaying the scroll progress indicator is, optionally, extended.

In some embodiments, the scroll progress indicator includes a scroll bar (e.g., 614) (e.g., a thumb). In some embodiments, the scroll bar is positioned within a scroll track (e.g., between edges 1004 and 1006) (e.g., trough) and moves within the scroll track in response to the movement of the second portion of the second input.

In some embodiments, while the scroll progress indicator is displayed, and in accordance with a determination that an input is not detected on the user interface for a predetermined amount of time, the electronic device ceases to display the scroll progress indicator.

While the scroll progress indicator is displayed before the device ceases to display the scroll progress indicator), the electronic device (e.g., 600) detects (1108) a second input (e.g., 1014) (e.g., a touch-and-hold input that remains stationary on the touch-sensitive surface) that includes a first portion (e.g., a first component; a stationary component) that is substantially stationary (e.g., stationary) followed by a second portion (e.g., a second component; a component including a movement) that includes movement in a first direction.

In some embodiments, the first portion of the second input is directed to the scroll progress indicator when the first portion of the second input is detected within a region (e.g., 1015) (e.g., a detection region) surrounding a scroll bar (e.g., 614) (e.g., thumb) portion of the scroll progress indicator (e.g., the detection region includes the thumb portion and a region that extends beyond the displayed size of the thumb portion) (e.g., the detection region is centered at the thumb portion and is slightly larger than the thumb portion). In some embodiments, the scroll bar portion of the scroll progress indicator is displayed having a first size when the user interface has a first scrollable length (e.g., the detection region is a size that is slightly larger than the first size of the thumb portion of the scroll progress indicator). In some embodiments, the scroll bar portion of the scroll progress indicator is displayed having a second size different from the first size when the user interface has a second scrollable length different from the first scrollable length (e.g., the detection region is a second size that is slightly larger than the second size of the thumb portion of the scroll progress indicator). In some embodiments, the scroll bar and corresponding detection region have a dynamic size that is based on the scrollable length of the user interface. For example, when the user interface is a shorter scrollable length, the scroll bar and corresponding detection region are larger, and when the user interface is a longer scrollable length, the scroll bar and corresponding detection region are smaller. In some embodiments, making the detection region larger than the scroll bar makes it easier for a user to select the scroll bar, thereby increasing usability of the scroll bar and reducing the likelihood of unsuccessful input attempts to select the scroll bar, particularly when the scroll bar is a smaller size (e.g., when the scrollable user interface is long). This enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response (1110) to detecting the second input (e.g., 1010): in accordance with a determination that the first portion of the second input was directed to the scroll progress indicator (e.g., 614) (e.g., the first portion of the second input occurred at a location corresponding to the location of the scroll progress indicator) and does not satisfy first criteria (e.g., the second input does not include continuous, stationary contact (e.g., on the scroll progress indicator (e.g., on the scroll bar)) that exceeds a threshold amount of time prior to moving), the electronic device scrolls (1112) the user interface (e.g., 602) in a first manner e.g, a manner in which scrolling movement of the user interface directly corresponds to (e.g., mirrors) movement of the scroll command on the user interface (e.g., if the scroll command is a touch input that moves in an upward direction by 300 pixels, the user interface moves in the upward direction by 300 pixels)) based on the movement of the contact in the second portion of the second input. In some embodiments, scrolling the user interface in the first manner includes scrolling the user interface to a first scrolled position that is determined based on a direction and magnitude of the movement of the second portion of the second input. In some embodiments, scrolling in the first manner includes scrolling the user interface in a second direction different (e.g., opposite) from the first direction of movement of the second portion of the second input. For example, if the first direction of movement is a substantially downward direction, the user interface scrolls in an upward direction (e.g., items in a list move in a downward direction in order to scroll up in the list). For example, in FIG. 10E, input 1010 fails to satisfy the first criteria. As a result, device 602 scrolls list 604 in the first manner as shown in FIG. 10F. Scrolling the user interface in the first manner based on movement of the contact in the second portion of the second input, when the first portion of the second input is directed to the scroll progress indicator and does not satisfy the first criteria, allows the user to selectively control when to scroll in the first or second manner by controlling the duration of the first portion of the second contact on the scroll progress indicator, thereby reducing the number of inputs needed to switch between scrolling modes. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first criteria includes a criterion that is satisfied when the first portion of the second input is stationary for at least a first threshold amount of time (e.g., continuous, stationary contact on the scroll progress indicator (e.g., on the scroll bar)).

In some embodiments, the first threshold amount of time is greater (e.g., 1.5 times the amount of time; 2 times the amount of time) than a threshold amount of time for detecting (e.g., classifying; validating) a touch input of a first type (e.g., a tap input; a swipe gesture) (e.g., an amount of time required to classify a detected input as a particular gesture (e.g., a valid gesture), an amount of time required to exclude the detected input from being an invalid gesture (e.g., an accidental contact; noise). In some embodiments, setting the first criteria to include a requirement that the input is stationary for a threshold amount of time that is greater than a threshold time for detecting a touch input of a first type prevents the device from inadvertently scrolling in the second manner when the user intends to scroll in the first manner using an input at a location proximate the scroll progress indicator (e.g., by preventing the user from accidentally engaging the scroll progress indicator (e.g., the scroll bar) to scroll in the second manner). This provides additional control options for maintaining scrolling in the first manner without cluttering the user interface with additional displayed controls, which enhances the operability of the device and makes the user-device interface more efficient by helping the user to provide proper inputs and reducing user mistakes when operating/interacting with the device) which, additionally, reduces power usage and improves battery life of the device by enabling the user to use the device more quickly and efficiently.

In response (1110) to detecting the second input (e.g., 1014): in accordance with a determination that the first portion of the second input was directed to the scroll progress indicator (e.g., 614) and satisfies the first criteria (e.g., the second input includes continuous, stationary contact (e.g., on the scroll progress indicator (e.g., on the scroll bar)) that exceeds a threshold amount of time prior to moving), the electronic device (e.g., 600) scrolls (1114) the user interface in a second manner that is different from the first manner (e.g., a manner that is based on movement of the scroll bar within the scroll track (e.g., between edges 1004 and 1006), where movement of the scroll bar directly corresponds to (e.g., mirrors) movement of the scroll command (e.g., the second portion of the second input) on the scroll bar) and is based on the movement of the contact in the second portion of the second input. In some embodiments, scrolling the user interface in a second manner includes scrolling the user interface to a second scrolled position different from the first scrolled position (e.g., a different scrolled position in the user interface that is determined based on the direction and magnitude of the movement of the second portion of the second input on a scroll bar portion of the scroll progress indicator. In some embodiments, scrolling in the second manner includes scrolling the user interface in the first direction. For example, if the first direction of movement is a substantially downward direction, the user interface scrolls in a downward direction (e.g., items in a list move in an upward direction in order to scroll down in the list). In some embodiments, scrolling in the second manner includes scrolling the user interface at a different rate (e.g., depending on the length of the user interface—the greater the length of the user interface, the greater the scrolling rate when scrolling in the second manner) than scrolling in the first manner. For example, when the second portion of the second input has a first magnitude of movement, scrolling in the first manner results in the user interface being scrolled by a first amount of scrolling, and scrolling in the second manner results in the user interface being scrolled by a second amount of scrolling that is different from (e.g., greater than) the first amount. This allows a user to scroll a larger user interface at a greater rate (e.g., a greater magnitude of scrolling for a given magnitude of the second portion of the second input) when scrolling in the second manner, as compared to scrolling in the first manner, thereby reducing the number of inputs needed to scroll the items. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Scrolling the user interface in the second manner based on movement of the contact in the second portion of the second input, when the first portion of the second input is directed to the scroll progress indicator and satisfies the first criteria, allows the user to selectively control when to scroll in the first or second manner by controlling the duration of the first portion of the second contact on the scroll progress indicator, thereby reducing the number of inputs needed to switch between scrolling modes. Additionally, this provides the user with additional control options without having to clutter the user interface with additional displayed controls. These benefits enhance the operability of the device and make the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, scrolling the user interface in the first manner includes scrolling the user interface in a direction different (e.g., opposite) from the first direction of movement of the second portion of the second input. In some embodiments, scrolling the user interface in the second manner includes scrolling the user interface in a same direction (e.g., substantially same direction) as the first direction of movement of the second portion of the second input.

In some embodiments, scrolling the user interface in the second manner includes: in accordance with a determination that the second portion of the second input includes a magnitude of movement that is greater than a threshold magnitude e.g., a non-zero threshold), scrolling the user interface in the first direction by an amount that corresponds to the magnitude of movement of the second portion of the second input (e.g., the user interface is scrolled by an amount that mirrors the magnitude of movement of the second portion of the second input). In some embodiments, scrolling the user interface in the second manner includes: in accordance with a determination that the second portion of the second input includes a magnitude of movement that is less than the threshold magnitude, scrolling the user interface in the first direction to an end of the user interface (e.g., a top or bottom of the user interface). In some embodiments, the user interface is scrolled to an end of the user interface, regardless of the actual magnitude of the second portion of the second input and regardless of the length of the user interface, so long as the magnitude of the second portion is less than a threshold magnitude. For example, when the second portion of the second input is a short motion such as a flick gesture (e.g., 1014-2), the electronic device scrolls the user interface to an end of the user interface (e.g., in the direction of the flick), regardless of the length of the user interface. Conversely, when the magnitude of the second portion of the second input is greater than the threshold magnitude, the user interface is scrolled in the first direction by an amount that corresponds to the magnitude of the second portion of the second input. For example, if the second portion is a first magnitude greater than the threshold magnitude, the user interface is scrolled in the first direction by a first amount that corresponds to the first magnitude, and if the second portion is a second magnitude greater than the threshold magnitude, the user interface is scrolled in the first direction by a second amount that corresponds to the second magnitude.

In some embodiments, further in response to detecting the second input (e.g., 1014): in accordance with a determination that the first portion of the second input was directed to the scroll progress indicator (e.g., 614) and satisfies the first criteria, the electronic device generates (e.g., using haptic feedback module 133, haptic feedback controller 161, and tactile output generator 167) a first tactile output (e.g., 1017) (e.g., a haptic response) (e.g., a tactile output and/or an audio output (e.g., a non-visual feedback)). In some embodiments, the first tactile output includes an auditory output generated when the electronic device changes from a first scrolling behavior in which scrolling is performed in the first manner to a second scrolling behavior in which scrolling is performed in the second manner. In some embodiments, generating the first tactile output provides a tactile and/or auditory indication to a user that the electronic device has transitioned from a first scrolling behavior to a second scrolling behavior, where the first tactile output provides a tactile and/or audio feedback of the transition that can be sensed by the user's sense of touch and/or hearing. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in response to detecting the second input (e.g., 1010): in accordance with a determination that the first portion of the second input was directed to the scroll progress indicator (e.g., 614) and does not satisfy the first criteria, the electronic device scrolls the user interface in the first manner based on the movement of the contact in the second portion of the second input without generating the first tactile output. In some embodiments, a tactile output is not generated unless the electronic device transitions from the first scrolling behavior to the second scrolling behavior. Scrolling the user interface in the first manner without generating the first tactile output provides feedback to the user that the electronic device is not transitioned from the first scrolling behavior to the second scrolling behavior. Providing improved feedback enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, after generating the first tactile output, the electronic device detects termination of the second input (e.g., with or without scrolling the user interface) and in response to detecting termination of the second input, generates (e.g., using haptic feedback module 133, haptic feedback controller 161, and tactile output generator 167) a second tactile output (e.g., a haptic response) (e.g., a tactile output and/or an audio output (e.g., a non-visual feedback)). In some embodiments, the second tactile output includes an auditory output generated when the electronic device changes from the second scrolling behavior in which scrolling is performed in the second manner to the first scrolling behavior in which scrolling is performed in the first manner). In some embodiments, generating the second tactile output provides a tactile and/or auditory indication to a user that the electronic device has reverted from the second scrolling behavior back to the first scrolling behavior, where the second tactile output provides a tactile and/or auditory feedback of the transition that can be sensed by the user's sense of touch and/or sound, Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in response to detecting the second input (e.g., 1014): in accordance with a determination that the first portion of the second input was directed to the scroll progress indicator and satisfies the first criteria, the electronic device changes an appearance of the scroll progress indicator from a first appearance (e.g., 614) to a second appearance (e.g., 614-1) (e.g., widening the appearance of the scroll bar portion of the scroll progress indicator (e.g., displaying the scroll bar portion of the scroll progress indicator transitioning from a first thickness to a second thickness greater than the first thickness). In some embodiments, changing the appearance of the scroll progress indicator includes generating a haptic response. In some embodiments, changing the appearance of the scroll progress indicator from the first appearance to the second appearance provides a visual feedback to a user that the electronic device has transitioned from a first scrolling behavior to a second scrolling behavior. The increased size of the scroll bar allows the user to see the scroll bar when the user's finger is positioned over the scroll bar, thereby increasing usability of the scroll bar and providing a more easily perceived indication of the current scroll position to the user within the scrollable range of the user interface (e.g., indicated by the scroll track). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the scroll progress indicator has the second appearance, the electronic device detects termination of the second input (e.g., with or without scrolling the user interface). In some embodiments, in response to detecting termination of the second input, the electronic device changes the appearance of the scroll progress indicator from the second appearance to the first appearance (e.g., narrowing the appearance of the scroll bar portion of the scroll progress indicator (e.g., displaying the scroll bar portion of the scroll progress indicator transitioning from the second thickness to the first thickness that is less than the second thickness)). In some embodiments, changing the appearance of the scroll progress indicator includes generating a haptic response. In some embodiments, changing the appearance of the scroll progress indicator from the second appearance to the first appearance provides a visual feedback to a user that the electronic device has reverted from the second scrolling behavior back to the first scrolling behavior. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in response to detecting the second input (e.g., 1014): in accordance with a determination that the first portion of the second input was directed to the scroll progress indicator (e.g., 614) and satisfies the first criteria, the electronic device changes an appearance of the scroll progress indicator to include an indexed scrubbing indicator (e.g., 1018) positioned on the user interface at a location proximate to a location of the first portion of the second input (e.g., the indexed scrubbing indicator is centered about the location of the first portion of the second input) (e.g., FIGS. 10Q and 10R show indexed scrubbing indicator centered at location of input 1016). In some embodiments, the indexed scrubbing indicator corresponds to an index of relative scrollable positions in the user interface. In some embodiments, when the indexed scrubbing indicator is displayed, the device detects movement of the second portion of the second input, and scrolls to an indexed position within the scrollable user interface that corresponds to the position of the input with respect to the indexed scrubbing indicator (e.g., see FIGS. 10R-1.0T). In some embodiments, the electronic device (e.g., 600) displays the indexed scrubbing indicator (e.g., 1018) at other displayed locations on the user interface (e.g., 602) (e.g., see FIGS. 10U-10W) For example, in some embodiments, when the location of the first portion of the second input is adjacent an edge region of the user interface, the indexed scrubbing indicator is displayed adjacent the first portion of the second input opposite from the edge region of the user interface (e.g., see FIG. 10W).

In some embodiments, further in response to detecting the second input (e.g., 1014): in accordance with a determination that the first portion of the second input was directed to the scroll progress indicator (e.g., 614) and satisfies the first criteria, the electronic device changes an appearance of the scroll progress indicator to include an indexed scrubbing indicator (e.g., 1018) positioned on the user interface at a location centered on the user interface (e.g., centered in the displayed list (e.g., centered at a side edge of the displayed list) (e.g., a location centered between edges 1004 and 1006 as shown in FIG. 10V).

In some embodiments, further in response to detecting the second input: in accordance with a determination that the first portion of the second input was not directed to the scroll progress indicator, the electronic device scrolls the user interface in the first manner based on the movement of the contact in the second portion of the second input without regard to whether or not the first portion of the second input met the first criteria (e.g., scrolling the user interface in the first manner if the second portion of the second input meets the first criteria and scrolling the user interface in the first manner if the second portion of the second input does not meet the first criteria). In some embodiments, when the first portion of the second input is not located at the scroll progress indicator, the UI is scrolled in the first manner based on the second portion of the second contact regardless of whether or not the first portion of the second input meets the first criteria (e.g., even if the first portion of the second contact otherwise meets the first criteria).

In some embodiments, while the scroll progress indicator is displayed, the electronic device detects a third input (e.g., 1010) that includes movement in a respective direction (e.g., a swipe gesture). In some embodiments, in response to detecting the third input, the electronic device scrolls the user interface in the first manner based on the movement of the third input.

Note that details of the processes described above with respect to method 1100 (e.g., FIG. 11) are also applicable in an analogous manner to the methods described above. For example, methods 700 and 900 optionally include one or more of the characteristics of the various methods described above with reference to method 1100. For example, a scroll progress indicator can be displayed and selected to scroll the items in the user interface. For brevity, these details are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources display items for scrolling and selection. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted items that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
   a display;
   a touch-sensitive surface;
   one or more processors; and
   memory storing one or more programs configured to be executed by the one or more processors, the one or more programs including instructions for:
      displaying, via the display, a user interface that includes a plurality of items;
      detecting a first touch input at a location on the display corresponding to a first item in the plurality of items;
      in response to detecting the first touch input at the location on the display corresponding to the first item, changing a selection state of the first item to a second selection state;
      after changing the selection state of the first item, detecting a second touch input that corresponds to a request to scroll the user interface and that is distinct from the first touch input;
      in response to detecting the second touch input:
         in accordance with a determination that the first touch input is maintained on the display, changing the selection state of one or more items that pass under the location of the first touch input while scrolling the plurality of items, including moving the plurality of items with respect to the location at which the first touch input was detected, wherein:
            a respective item of the one or more items that pass under the location of the first touch input is in the second selection state before passing under the location of the first touch input; and
            the one or more programs further include instructions for forgoing changing a selection state of the respective item of the one or more items that pass under the location of the first touch input while scrolling the plurality of items and while the first touch input is maintained on the display; and
         in accordance with a determination that the first touch input is not maintained on the display, scrolling the plurality of items, including moving the plurality of items with respect to the location at which the first touch input was detected, without changing the selection state of the one or more items in the plurality of items;
      after changing the selection state of the one or more items while scrolling the plurality of items detecting a third input on a third item in the plurality of items, wherein the third item is separated from a second item in the plurality of items by one or more intervening items in the plurality of items; and
      in response to detecting the third input and in accordance with a determination that the third input satisfies a first set of criteria, displaying an intervening selection user interface object that, when selected, changes a selection state of the third item and the one or more intervening items in the plurality of items.

2. The electronic device of claim 1, the one or more programs further including instructions for:
   prior to detecting the second input, and further in response to detecting the first touch input:
      in accordance with a determination that the first touch input is maintained for greater than a predetermined period of time and in accordance with a determination that the first item is at an end of the displayed plurality of items in the user interface, scrolling the plurality of items after changing the selection state of the first item.

3. The electronic device of claim 2, wherein scrolling the plurality of items after changing the selection state of the first item includes:
   displaying one or more new items in the plurality of items; and
   changing the selection state of the one or more new items in the plurality of items.

4. The electronic device of claim 2, the one or more programs further including instructions for:
  while scrolling the plurality of items after changing the selection state of the first item:
    in accordance with a determination that a last item in the plurality of items is selected, ceasing to scroll the plurality of items; and
    in accordance with a determination that the first touch input is terminated, ceasing to scroll the plurality of items.

5. The electronic device of claim 1, wherein the first touch input is a stationary input.

6. The electronic device of claim 1, the one or more programs further including instructions for further in response to detecting the third input and in accordance with the determination that the third input satisfies the first set of criteria:
  displaying, for each of the third item and the one or more intervening items, a selection user interface object having a preselected state.

7. The electronic device of claim 1, wherein displaying the intervening selection user interface object further includes displaying a select-all user interface object that, when selected, sets the selection state of all items in the plurality of items to a selection state associated with the select-all user interface object.

8. The electronic device of claim 1, wherein changing the selection state of the first item includes:
  in accordance with a determination that the selection state of the first item is a selected state, changing the selection state of the first item to an unselected state; and
  in accordance with a determination that the selection state of the first item is an unselected state, changing the selection state of the first item to a selected state.

9. The electronic device of claim 1, wherein scrolling the plurality of items includes scrolling the first item.

10. A non-transitory computer-readable storage medium storing one or more programs configured to be executed by one or more processors of an electronic device with a display and a touch-sensitive surface; the one or more programs including instructions for:
  displaying, via the display, a user interface that includes a plurality of items;
  detecting a first touch input at a location on the display corresponding to a first item in the plurality of items;
  in response to detecting the first touch input at the location on the display corresponding to the first item, changing a selection state of the first item to a second selection state;
  after changing the selection state of the first item, detecting a second touch input that corresponds to a request to scroll the user interface and that is distinct from the first touch input;
  in response to detecting the second touch input:
    in accordance with a determination that the first touch input is maintained on the display, changing the selection state of one or more items that pass under the location of the first touch input while scrolling the plurality of items, including moving the plurality of items with respect to the location at which the first touch input was detected, wherein:
      a respective item of the one or more items that pass under the location of the first touch input is in the second selection state before passing under the location of the first touch input; and
      the one or more programs further include instructions for forgoing changing a selection state of the respective item of the one or more items that pass under the location of the first touch input while scrolling the plurality of items and while the first touch input is maintained on the display; and
    in accordance with a determination that the first touch input is not maintained on the display, scrolling the plurality of items, including moving the plurality of items with respect to the location at which the first touch input was detected without changing the selection state of the one or more items in the plurality of items;
  after changing the selection state of the one or more items while scrolling the plurality of items, detecting a third input on a third item in the plurality of items, wherein the third item is separated from a second item in the plurality of items by one or more intervening items in the plurality of items; and
  in response to detecting the third input and in accordance with a determination that the third input satisfies a first set of criteria, displaying an intervening selection user interface object that, when selected, changes a selection state of the third item and the one or more intervening items in the plurality of items.

11. The non-transitory computer-readable storage medium of claim 10, the one or more programs further including instructions for:
  prior to detecting the second input, and further in response to detecting the first touch input:
    in accordance with a determination that the first touch input is maintained for greater than a predetermined period of time and in accordance with a determination that the first item is at an end of the displayed plurality of items in the user interface, scrolling the plurality of items after changing the selection state of the first item.

12. The non-transitory computer-readable storage medium of claim 11, wherein scrolling the plurality of items after changing the selection state of the first item includes:
  displaying one or more new items in the plurality of items; and
  changing the selection state of the one or more new items in the plurality of items.

13. The nontransitory computer-readable storage medium of claim 11, the one or more programs further including instructions for:
  while scrolling the plurality of items after changing the selection state of the first item:
    in accordance with a determination that a last item in the plurality of items is selected, ceasing to scroll the plurality of items; and
    in accordance with a determination that the first touch input is terminated, ceasing to scroll the plurality of items.

14. The non-transitory computer-readable storage medium of claim 10, wherein the first touch input is a stationary input.

15. The non-transitory computer-readable storage medium of claim 10, the one or more programs further including instructions for further in response to detecting the third input and in accordance with the determination that the third input satisfies the first set of criteria:
  displaying, for each of the third item and the one or more intervening items, a selection user interface object having a preselected state.

16. The non-transitory computer-readable storage medium of claim 10, wherein displaying the intervening selection user interface object further includes displaying a select-all user interface object that, when selected, sets the selection state of all items in the plurality of items to a selection state associated with the select-all user interface object.

17. The non-transitory computer-readable storage medium of claim 10, wherein changing the selection state of the first item includes:
in accordance with a determination that the selection state of the first item is a selected state, changing the selection state of the first item to an unselected state; and
in accordance with a determination that the selection state of the first item is an unselected state, changing the selection state of the first item to a selected state.

18. The non-transitory computer-readable storage medium of claim 10, wherein scrolling the plurality of items includes scrolling the first item.

19. A method comprising:
at an electronic device with a display and a touch-sensitive surface:
displaying, via the display, a user interface that includes a plurality of items;
detecting a first touch input at a location on the display corresponding to a first item in the plurality of items;
in response to detecting the first touch input at the location on the display corresponding to the first item, changing a selection state of the first item to a second selection state;
after changing the selection state of the first item, detecting a second touch input that corresponds to a request to scroll the user interface and that is distinct from the first touch input;
in response to detecting the second touch input:
in accordance with a determination that the first touch input is maintained on the display, changing the selection state of one or more items that pass under the location of the first touch input while scrolling the plurality of items, including moving the plurality of items with respect to the location at which the first touch input was detected, wherein:
a respective item of the one or more items that pass under the location of the first touch input is in the second selection state before passing under the location of the first touch input; and
the method further comprises forgoing changing a selection state of the respective item of the one or more items that pass under the location of the first touch input while scrolling the plurality of items and while the first touch input is maintained on the display; and
in accordance with a determination that the first touch input is not maintained on the display, scrolling the plurality of items, including moving the plurality of items with respect to the location at which the first touch input was detected, without changing the selection state of the one or more items in the plurality of items;
after changing the selection state of the one or more items while scrolling the plurality of items detecting a third input on a third item in the plurality of items, wherein the third item is separated from a second item in the plurality of items by one or more intervening items in the plurality of items; and
in response to detecting the third input and in accordance with a determination that the third input satisfies a first set of criteria, displaying an intervening selection user interface object that, when selected, changes a selection state of the third item and the one or more intervening items in the plurality of items.

20. The method of claim 19, the one or more programs further including instructions for:
prior to detecting the second input, and further in response to detecting the first touch input:
in accordance with a determination that the first touch input is maintained for greater than a predetermined period of time and in accordance with a determination that the first item is at an end of the displayed plurality of items in the user interface, scrolling the plurality of items after changing the selection state of the first item.

21. The method of claim 20, wherein scrolling the plurality of items after changing the selection state of the first item includes:
displaying one or more new items in the plurality of items; and
changing the selection state of the one or more new items in the plurality of items.

22. The method of claim 20, the one or more programs further including instructions for:
while scrolling the plurality of items after changing the selection state of the first item:
in accordance with a determination that a last item in the plurality of items is selected, ceasing to scroll the plurality of items; and
in accordance with a determination that the first touch input is terminated, ceasing to scroll the plurality of items.

23. The method of claim 19, wherein the first touch input is a stationary input.

24. The method of claim 19, the one or more programs further including instructions for further in response to detecting the third input and in accordance with the determination that the third input satisfies the first set of criteria:
displaying, for each of the third item and the one or more intervening items, a selection user interface object having a preselected state.

25. The method of claim 19, wherein displaying the intervening selection user interface object further includes displaying a select-all user interface object that, when selected, sets the selection state of all items in the plurality of items to a selection state associated with the select-all user interface object.

26. The method of claim 19, wherein changing the selection state of the first item includes:
in accordance with a determination that the selection state of the first item is a selected state, changing the selection state of the first item to an unselected state; and
in accordance with a determination that the selection state of the first item is an unselected state, changing the selection state of the first item to a selected state.

27. The method of claim 19, wherein scrolling the plurality of items includes scrolling the first item.

* * * * *

UNITED STATES PATENT AND TRADEMARK OFFICE
CERTIFICATE OF CORRECTION

PATENT NO. : 11,620,042 B2  
APPLICATION NO. : 16/573849  
DATED : April 4, 2023  
INVENTOR(S) : Marcos Alonso et al.

Page 1 of 1

It is certified that error appears in the above-identified patent and that said Letters Patent is hereby corrected as shown below:

In the Claims

Column 66, Line 39, Claim 1, delete "items" and add --items,--.

Column 67, Line 42, Claim 10, delete "surface;" and add --surface,--.

Column 68, Line 46, Claim 13, delete "nontransitory" and add --non-transitory--.

Column 69, Line 63, Claim 19, delete "items" and add --items,--.

Signed and Sealed this  
Thirteenth Day of May, 2025

Coke Morgan Stewart  
*Acting Director of the United States Patent and Trademark Office*